US012770211B2

(12) United States Patent
Demirci et al.

(10) Patent No.: US 12,770,211 B2
(45) Date of Patent: Oct. 20, 2026

(54) METHODS AND SYSTEMS FOR PERFORMING A SPARSE SUBMANIFOLD CONVOLUTION ON A GPU

(71) Applicant: Imagination Technologies Limited, Kings Langley (GB)

(72) Inventors: Gunduz Vehbi Demirci, Hertfordshire (GB); Cagatay Dikici, Hertfordshire (GB); Grant Michael Stevens, Hertfordshire (GB); Le Yang, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 289 days.

(21) Appl. No.: 18/591,092

(22) Filed: Feb. 29, 2024

(65) Prior Publication Data

US 2024/0320778 A1 Sep. 26, 2024

(30) Foreign Application Priority Data

Mar. 2, 2023 (GB) ...................................... 2303116
Mar. 2, 2023 (GB) ...................................... 2303117
(Continued)

(51) Int. Cl.
*G06T 1/20* (2006.01)
*G06F 17/16* (2006.01)
(Continued)

(52) U.S. Cl.
CPC ................ *G06T 1/20* (2013.01); *G06F 17/16* (2013.01); *G06V 10/82* (2022.01); *G06V 10/94* (2022.01)

(58) Field of Classification Search
CPC .......... G06T 1/20; G06N 3/045; G06N 3/063; G06V 10/82; G06V 10/94; G06F 17/153; G06F 17/16
(Continued)

(56) References Cited

U.S. PATENT DOCUMENTS

2018/0046906 A1 2/2018 Dally et al.
2019/0156206 A1* 5/2019 Graham ................. G06N 3/045
(Continued)

FOREIGN PATENT DOCUMENTS

CN 110349146 A 10/2019
CN 111401554 A 7/2020
(Continued)

OTHER PUBLICATIONS

Vipin Sharma, "Sparse SubManifold Convolutions," Aug. 27, 2021, 23 pages, https://medium.com/geekculture/3d-sparse-sabmanifold-convolutions-eaa427b3a196.*
(Continued)

*Primary Examiner* — Jacinta M Crawford
(74) *Attorney, Agent, or Firm* — Potomac Law Group, PLLC; Vincent M DeLuca

(57) ABSTRACT

Methods of implementing a sparse submanifold convolution on a graphics processing unit. The methods include: receiving, at the graphics processing unit, an input tensor in a dense format; identifying, at the graphics processing unit, active positions of the input tensor; performing, at the graphics processing unit, an indexed unfold operation on the input tensor based on the identified active positions to generate an input matrix comprising elements of the input tensor in each active window of the input tensor; and performing, at the graphics processing unit, a matrix multiplication between a weight matrix and the input matrix to generate an output matrix that comprises elements of an
(Continued)

output tensor of the sparse submanifold convolution based on the active windows. The methods may further comprise performing, at the graphics processing unit, an indexed fold operation on the output matrix based on the active windows to generate an output tensor in a dense format.

20 Claims, 48 Drawing Sheets

(30) Foreign Application Priority Data

| | | |
|---|---|---|
| Mar. 2, 2023 | (GB) | 2303118 |
| Mar. 2, 2023 | (GB) | 2303119 |
| Mar. 2, 2023 | (GB) | 2303120 |

(51) Int. Cl.
*G06V 10/82* (2022.01)
*G06V 10/94* (2022.01)

(58) Field of Classification Search
USPC .......... 345/501
See application file for complete search history.

(56) References Cited

U.S. PATENT DOCUMENTS

| | | | |
|---|---|---|---|
| 2020/0301994 | A1 | 9/2020 | Dikici et al. |
| 2021/0110187 | A1 | 4/2021 | Pillai et al. |
| 2022/0058450 | A1 | 2/2022 | Lin et al. |

FOREIGN PATENT DOCUMENTS

| | | | |
|---|---|---|---|
| CN | 114119377 | A | 3/2022 |
| CN | 115600662 | A | 1/2023 |
| GB | 2582352 | A | 9/2020 |
| KR | 20220114435 | A | 8/2022 |

OTHER PUBLICATIONS

Wang et al; "An Efficient FPGA Accelerator for Point Cloud"; IEEE 35th International System-On-Chip Conference; Sep. 5, 2022; pp. 1-6.

Graham et al; "3D Semantic Segmentation with Submanifold Sparse Convolutional Networks"; 2018 IEEE/CVF Conference on Computer Vision and Pattern Recognition; Jun. 18, 2018; pp. 9224-9232.

Zhou; "How does sparse convolution work?"; Retrieved from the Internet: URL: https :/ /towardsdatascience.com/how-does-sparse-convolution•-work-3257a0a8f d1; Dec. 27, 2020; 11 pages.

Graham et al; "Sparse 3D convolutional neural networks"; URL:https://arxiv.org/abs/1505.02890; Aug. 25, 2015; pp. 1-11.

Sharma, "Sparse Submanifold Convolutions," Aug. 27, 2021, https://medium.com/geekculture/3d-sparse-sabmanifold-convolutions-eaa427b3a196.

Liu et al, 2020, "Deep Adaptive Inference Networks for Single Image Super-Resolution", [online], Available from: https://arxiv.org/abs/2004. 03915.

Park et al, 2017, "Faster CNNs with Direct Sparse Convolutions and Guided Pruning", International Conference on Learning Representations, [online], Available from: https://arxiv.org/pdf/1608.01409.pdf.

* cited by examiner

METHODS AND SYSTEMS FOR PERFORMING A SPARSE SUBMANIFOLD CONVOLUTION ON A GPU

CROSS-REFERENCE TO RELATED APPLICATIONS AND CLAIM OF PRIORITY

This application claims foreign priority under 35 U.S.C. 119 from United Kingdom patent application Nos. 2303116.4, 2303117.2, 2303118.0, 2303119.8, and 2303120.6, all filed on 2 Mar. 2023, the contents of which are incorporated by reference herein in their entirety.

TECHNICAL FIELD

This application is directed to methods and systems for performing a sparse submanifold convolution on a graphics processing unit (GPU).

BACKGROUND

As is known to those of skill in the art, a point cloud is a set of individual data points plotted in two-dimensional (2D) or three-dimensional (3D) space. For example, each point in a 3D point cloud may represent a measurement at a particular x, y and z location. A point cloud may be used to represent an object in space. Point clouds may by generated by a sensor, such as, but not limited to, a LiDAR scanner or a depth camera. As is known to those of skill in the art, a LIDAR scanner uses light in the form of a pulsed laser to measure distances. As point clouds do not typically have a point for each possible co-ordinate, point clouds are considered to be sparse datasets.

There are a wide range of real-world artificial intelligence applications which point clouds can be used in, such as augmented/virtual reality (e.g. layout detection for interior scenes) and autonomous driving (e.g. to extract the driveable regions). As a result, performing deep learning tasks on point clouds has received significant attention from both academia and industry and artificial neural networks (referred to herein simply as neural networks) have been developed to process point clouds, which may be referred to herein as a point cloud neural networks. As is known to those of skill in the art, a neural network comprises one or more interconnected layers that can be used for machine learning applications. In particular, a neural network can be used in signal processing applications, including, but not limited to, image processing and computer vision applications.

FIG. 1 illustrates an example neural network 100 that comprises a plurality of layers 102, 104, 106. Each layer 102, 104, 106 receives input data, and processes the input data in accordance with the layer to produce output data. The output data is either provided to another layer as the input data or is output as the final output data of the neural network. For example, in the neural network 100 of FIG. 1, the first layer 102 receives the original input data 108 to the neural network 100 and processes the input data in accordance with the first layer 102 to produce output data 110. The output data 110 of the first layer 102 becomes the input data to the second layer 104, and the second layer 104 processes the input data 110 in accordance with the second layer 104 to produce output data 112. The output data 112 of the second layer 104 becomes the input data to the third layer 106, and the third layer 106 processes the input data 112 in accordance with the third layer 106 to produce output data 114. The output data 114 of the third layer 106 is then output as the final output data of the neural network. Where the neural network is used for classification, the final output data may be a vector of length A, wherein A is the number of classes and each value in the vector represents the probability of a certain class.

The data input to and output from a layer of a neural network can be described as a tensor. As is known to those of skill in the art, a tensor is a generalization of vectors and matrices and can be considered an n-dimensional array. A vector is a one-dimensional tensor, and a matrix is a two-dimensional tensor. The tensors in a neural network are often, but are not necessarily, four-dimensional. Reference is made to FIG. 2 which illustrates an example four-dimensional (4D) tensor 200 in which one dimension (e.g. corresponding to the batch size) has been suppressed for visualisation purposes. The 4D tensor 200 may be described as comprising one or more 3D tensors, wherein each 3D tensor comprises C planes of data. Each plane has a height H and a width W. Each plane may be referred to as a channel of the tensor. The number of 3D tensors may be referred to as the batch size. In a traditional neural network each 3D tensor may be, for example, an image. An element of a tensor may be referred to as a tensel, akin to how an element of a picture is referred to as a pixel.

The processing that is performed on the input tensor to a layer depends on the type of layer. For example, each layer of a neural network may be one of a plurality of different types. Common neural network layer types include, but are not limited to, a convolution layer, an activation layer, a normalisation layer, a pooling layer, a fully connected layer, and a batch normalisation layer. It will be evident to a person of skill in the art that these are only example neural network layer types and there may be other neural network layer types.

A convolution layer convolves the input tensor with weights associated with the layer Specifically, each convolution layer is associated with a plurality of weights $w_1 \ldots w_g$, which may also be referred to as filter weights or coefficients. The weights are grouped to form one or more filters. Each filter is moved or slid across the input tensor in one or more dimensions in accordance with the stride in that dimension, and the dot-product of the input data and the weights of that filter is calculated at each filter location. The elements of the input tensor that are applied to the filter weights at a particular filter location are referred to as a window of the input tensor. There may be a bias per filter which is added to the result of the corresponding dot products.

There are many different types of convolution layers. Traditional neural networks often have one or more 2D or 3D convolution layers. In a 2D convolution (which may be referred to herein as a standard 2D convolution), each filter has a dimension $K_H \times K_W \times C_{in}$ (i.e., each filter may comprise a set of $K_H \times K_W \times C_{in}$ weights w) wherein $C_{in}$ is the number of channels of the input tensor such that each filter generates a channel of the output. Each filter channel may be described as a kernel of size $K_H \times K_W$. Accordingly, depending on the number of channels, a filter may comprise one or more kernels. Each filter is slid across the input tensor in steps $s_H$ and $s_W$ in the H and W dimensions respectively, which are referred to as the strides of the convolution.

Reference is now made to FIG. 3 which illustrates an example 2D convolution with strides of 1 (i.e., $s_H = s_W = 1$) between an input tensor 302 with a height H, width W, and one channel (i.e. C=1) and a set of weights that form one filter 304 with kernel size $K_H \times K_W$, and one channel. The filter 304 is convolved with the input tensor 302 to produce one channel, or one plane, of the output tensor 306. Specifically, the filter 304 is slid over the input tensor 302 in the width dimension W and the height dimension H one element at a time and the dot product of the input elements and the weights is generated at each filter position. In this example, the first position of the filter with respect to the input tensor 302 is when the centre of the filter w(0,0) is aligned with x(1,1) such that the first element of the output y(0,0) is equal to the dot product of the input elements in the window 308 and the weights of the filter 304. Similarly, the last position of the filter with respect to the input tensor 302 is when the centre of the filter w(0,0) is aligned with x(3,3), such that the last element of the output tensor y(2,2) is equal to the dot product of the input elements in the window 310 and the weights of the filter 304. A 3D convolution is similar to a 2D convolution except the filters are also slid across the input tensor in a third (e.g. z or channel) dimension.

Point cloud neural networks, however, may comprise one or more 2D or 3D sparse submanifold convolutions layers. A 2D/3D sparse submanifold convolution is the same as its corresponding standard 2D/3D convolution except that the output elements are only calculated for positions of the filter in which one or more predetermined elements of the filter kernel is/are aligned with an active position of the input tensor. An active position of the input tensor is a height and width position of the input tensor in which at least one channel of the input tensor has a non-zero value or element at that position. The one or more predetermined elements of the filter kernel may comprise the centre element of the filter kernel and/or one or more elements close to the centre of the filter kernel. In the examples described herein there is a single predetermined element of the filter kernel that is the centre element of the filter kernel. However, it will be evident to a person of skill in the art that this is an example only. A sparse submanifold convolution is designed to work on a sparse input tensor.

Reference is now made to FIG. 4 which illustrates an example 2D sparse submanifold convolution with strides of 1 (i.e., $s_H=s_W=1$) between an input tensor 402 with a height H, width W, and one channel (i.e., C=1) and a set of weights that form one filter 404 with a kernel size of $K_H \times K_W$, and one channel, wherein the one or more predetermined elements of the filter kernel comprises the element at the centre of the filter kernel (i.e. w(0,0)). The input tensor 402 only has three non-zero elements, thus the input tensor 402 has three active positions—p1, p2, p3. Accordingly, there are only three positions of the filter with respect to the input tensor 402 (or three windows of the input tensor), denoted 406, 408, 410, in which the centre of the filter 404 is aligned with an active position (which will be referred to herein as the active windows of the input tensor). Thus, only three elements q1, q2, q3 of the output tensor 412 are generated. Output element q1 is equal to the dot product of the elements in the first active window 406 and the weights of the filter 404, output element q2 is equal to the dot product of the elements the second active window 408 and the weights of the filter 404, and output element q3 is equal to the dot product of the elements of the third active window 410 and the weights of the filter 404. A 3D sparse submanifold convolution is similar to a 2D sparse submanifold convolution except the filters are also slid across the input tensor in a third (e.g. z) dimension.

As sparse submanifold convolution layers are becoming more popular in neural networks it is important to be able to implement sparse submanifold convolutions in a hardware efficient manner (e.g., in a manner that requires less silicon area and/or less processing power).

The embodiments described below are provided by way of example only and are not limiting of implementations which solve any or all of the disadvantages of known methods and systems for implementing a sparse submanifold convolution.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described herein are methods of implementing a sparse submanifold convolution on a graphics processing unit. The methods include: receiving, at the graphics processing unit, an input tensor in a dense format; identifying, at the graphics processing unit, active positions of the input tensor; performing, at the graphics processing unit, an indexed unfold operation on the input tensor based on the identified active positions to generate an input matrix comprising elements of the input tensor in each active window of the input tensor; and performing, at the graphics processing unit, a matrix multiplication between a weight matrix and the input matrix to generate an output matrix that comprises elements of an output tensor of the sparse submanifold convolution based on the active windows. The methods may further comprise performing, at the graphics processing unit, an indexed fold operation on the output matrix based on the active windows to generate an output tensor in a dense format.

A first aspect provides a method of implementing a sparse submanifold convolution on a graphics processing unit, the method comprises: receiving, at the graphics processing unit, an input tensor in a dense format; identifying, at the graphics processing unit, active positions of the input tensor; performing, at the graphics processing unit, an indexed unfold operation on the input tensor based on the identified active positions of the input tensor to generate an input matrix comprising elements of the input tensor in each active window of the input tensor; and performing, at the graphics processing unit, a matrix multiplication between a weight matrix and the input matrix to generate an output matrix that comprises elements of an output tensor of the sparse submanifold convolution based on the active windows.

The input tensor may have at least a height dimension, a width dimension and a channel dimension and an active position of the input tensor may be a height and width position in which at least one channel of the input tensor has a non-zero element.

Identifying the active positions of the input tensor may comprise: identifying a height, width, and channel position of each non-zero element in the input tensor; identifying unique height and width pairs from the identified height, width and channel positions; and identifying the unique height and width pairs as the active positions.

An active window of the input tensor may be a window of the input tensor, used to generate an element of the output tensor of the sparse submanifold convolution, wherein one or more predetermined positions within the window are active positions.

The one or more predetermined positions within a window may comprise a centre position of the window.

Performing the indexed unfold operation on the input tensor may comprise identifying, from the identified active positions and one or more parameters of the sparse submanifold convolution, the active windows of the input tensor.

Identifying, from the identified active positions and the one or more parameters of the sparse submanifold convolution, the active windows of the input tensor may comprise, for each identified active position: determining if the active position is at a predetermined position within a window of the input tensor for the sparse submanifold convolution; and in response to determining that the active position is at the predetermined position within a window of the input tensor for the sparse submanifold convolution, identifying the window as an active window.

The active windows of the input tensor may be based on a version of the input tensor that is padded such that when the sparse submanifold convolution has a stride of one in each sparse submanifold convolution dimension there is an active window for each active position, and identifying, from the identified active positions and the one or more parameters of the sparse submanifold convolution, the active windows of the input tensor may comprise identifying the active window corresponding to each active position.

Performing the indexed unfold operation on the input tensor may comprise identifying the elements of the input tensor in each active window.

Identifying the elements of the input tensor in an active window may comprise implementing a series of nested loops, the series of nested loops comprising a loop for each dimension of an active window that loops from a predetermined position within the window through the elements of the active window in that dimension.

Performing the indexed unfold operation on the input tensor may comprise storing the elements of each active window in the input matrix.

The method may further comprise receiving a zeroed input matrix, and the elements of each active window of the input tensor are stored in the received input matrix.

The method may further comprise performing, at the graphics processing unit, an indexed fold operation on the output matrix based on the active windows to generate an output tensor in a dense format.

There may be an active window for each active position of the input tensor, and performing the indexed fold operation on the output matrix may comprise placing each element in the output matrix at the corresponding active position in a channel of the output tensor.

Performing the indexed fold operation on the output matrix may comprise, for each active window, looping through each channel of the output tensor and placing the element of the output matrix corresponding to that active position and that channel at the active position of that channel in the output tensor.

Performing the indexed fold operation on the output matrix may comprise identifying a position in the output tensor of each element in the output matrix, based on the active windows and one or more parameters of the sparse submanifold convolution, and placing each element of the output matrix in the corresponding identified position in the output tensor.

The method may further comprise receiving a zeroed output tensor, and the elements of the output matrix may be stored in the received output tensor.

Performing the indexed fold operation on the output matrix may further comprise storing zeroes at each position of the output tensor that does not comprise an element of the output matrix.

The input matrix may comprise a column for each active window of the input tensor and each column of the input matrix comprises the elements of the input tensor in the corresponding active window.

The weight matrix may comprise a row for each filter to be applied to the input tensor and each row of the weight matrix may comprise all weights forming the corresponding filter.

A second aspect provides a graphics processing unit configured to perform the method of the first aspect.

The graphics processing unit may be embodied in hardware on an integrated circuit.

A third aspect provides a method of implementing a sparse submanifold convolution using a neural network accelerator, the method comprising: receiving, at the neural network accelerator, an input tensor in a sparse format; performing at the neural network accelerator, for each position of a kernel of the sparse submanifold convolution, a 1×1 convolution between the received input tensor and weights of filters of the sparse submanifold convolution at that kernel position to generate a plurality of partial outputs; and combining appropriate partial outputs of the plurality of partial outputs to generate an output tensor of the sparse submanifold convolution in sparse format.

The input tensor in sparse format may comprise, for each active position of a corresponding input tensor in dense format, an element for each channel of the input tensor in dense format.

The input tensor in dense format may have at least a height dimension, a width dimension and a channel dimension and an active position of the input tensor in dense format may be a height and width position in which at least one channel of the input tensor in dense format has a non-zero element.

The neural network accelerator may comprise a convolution accelerator configured to accelerate convolution operations, and the 1×1 convolutions are performed by the convolution accelerator.

Each filter of the sparse submanifold convolution may comprise one or more kernels of size $K_H \times K_W$, where $K_H$ is a height of the kernel and $K_W$ is a width of the kernel, and each kernel comprises $K_H \times K_W$ weights, each at a different position of the kernel.

Each element of the output tensor in sparse format may be representable as a sum of one or more partial outputs of the plurality of partial outputs.

Combining the appropriate partial outputs of the plurality of partial outputs to generate the output tensor of the sparse submanifold convolution in sparse format may comprise: performing a matrix multiplication between each channel of each 1×1 convolution output tensor and a scatter matrix for the 1×1 convolution to group the partial outputs of the plurality of partial outputs that are relevant to each element of the output tensor in sparse format; and combining, via one or more addition operations, the grouped partial outputs.

The neural network accelerator may comprise an element-wise operations accelerator configured to accelerate performing element-wise operations on an input tensor, and the combining, via addition operations, may be performed by the element-wise operations accelerator.

The neural network accelerator may comprise a convolution accelerator configured to accelerate convolution operations and the matrix multiplications may be performed using the convolution accelerator.

The scatter matrix for a 1×1 convolution may identify partial outputs of an output tensor of that 1×1 convolution that are relevant to an element of the output tensor and, for each relevant partial output, identifies which element of the output tensor the partial output is relevant to.

The scatter matrix for a 1×1 convolution may be configured such that a result of multiplying that scatter matrix with a channel of an output tensor of that 1×1 convolution is a matrix that (i) comprises only the partial outputs of that channel relevant to an element of the output tensor and (ii) identifies which element of the output tensor each of those partial outputs is relevant to.

The scatter matrix for a 1×1 convolution may be configured such that a result of multiplying that scatter matrix with a channel of an output tensor of that 1×1 convolution is a matrix that comprises only the partial outputs of that channel relevant to an element of the output tensor and each relevant partial output is in a row or a column of the matrix that corresponds to the element of the output tensor that the partial output is relevant to.

A scatter matrix for a 1×1 convolution may comprise a row for each active position of the input tensor and a row for each active position of the output tensor, and the scatter matrix may comprise a first predetermined value in row B, column A if a partial output in row A of a channel of the 1×1 convolution output tensor is relevant to active position B of the output tensor and a second, different, predetermined value otherwise.

The first predetermined value may be one and the second predetermined value may be zero.

The method may further comprise generating the scatter matrices at a component external to the neural network accelerator based on active positions of the input tensor in dense format and one or more parameters of the sparse submanifold convolution.

Combining the appropriate partial outputs of the plurality of partial outputs to generate the output tensor of the sparse submanifold convolution in the sparse format may comprise performing a scatter-add operation on output tensors of the 1×1 convolutions.

Performing the scatter-add operation on the output tensors of the 1×1 convolutions may comprise: receiving information identifying which partial outputs of the plurality of partial outputs are relevant to each element of the output tensor in dense format; retrieving the partial outputs relevant to each element of the output tensor in dense format from the output tensors of the 1×1 convolutions; and combining the retrieved partial elements relevant to each element of the output tensor to generate that output element.

The neural network accelerator may comprise a processor and the scatter-add operation may be performed by the processor of the neural network accelerator.

The method may further comprise generating, at a component external to the neural network accelerator, the information identifying which partial outputs of the plurality of partial outputs are relevant to each element of the output tensor in dense format.

Each position of the kernel may be identified by a width coordinate and a height coordinate.

The output tensor of the sparse submanifold convolution in sparse format may comprise, for each active position of an output tensor in dense format, an element for each channel of the output tensor.

A fourth aspect provides a computer system comprising a neural network accelerator, the computer system configured to implement the method of the third aspect.

The neural network accelerator may be embodied in hardware on an integrated circuit.

A fifth aspect provides a computer readable medium having stored thereon computer readable code configured to cause a computer system comprising a neural network accelerator to perform the method of the third aspect when the code is run.

The method of the first aspect or the third aspect may be implemented as part of processing data in accordance with a neural network to perform a signal processing task.

The input tensor of the first aspect or the third aspect may comprise image data such that performing the sparse submanifold convolution comprises a method of processing image data.

The image data may comprise a point cloud data set generated by an image sensor.

The sparse submanifold convolution of the first aspect or the third aspect may be a 3D sparse submanifold convolution and the input tensor may comprise a 3D point cloud data set.

A sixth aspect provides a method of implementing a standard convolution on a central processing unit, the method comprising: receiving, at the central processing unit, an input tensor in a dense format; performing, at the central processing unit, an indexed unfold operation on the input tensor based on the identified active positions of the input tensor to generate an input matrix comprising elements of the input tensor in each non-zero window of the input tensor; and performing, at the central processing unit, a matrix multiplication between a weight matrix and the input matrix to generate an output matrix that comprises elements of an output tensor of the standard convolution based on the non-zero windows of the input tensor.

A seventh aspect provides a method of implementing a sequence of two sparse submanifold convolutions, the method comprising: receiving, at a graphics processing unit, an input tensor, in a dense format, to a first sparse submanifold convolution of the sequence; identifying, at the graphics processing unit, active positions of the input tensor; performing, at the graphics processing unit, an indexed unfold operation on the input tensor based on the identified active positions to generate an input matrix comprising elements of the input tensor in each active window of the input tensor; performing, at the graphics processing unit, a matrix multiplication between a weight matrix and the input matrix to generate an output matrix that comprises elements of an output tensor of the first sparse submanifold convolution based on the active windows; providing the output matrix to a neural network accelerator as an input tensor, in a sparse format, to a second sparse submanifold convolution of the sequence; performing, at the neural network accelerator, for each position of a kernel of the second sparse submanifold convolution, a 1×1 convolution between the received input matrix and weights of filters of the sparse submanifold convolution at that kernel position to generate a plurality of partial outputs; and combining appropriate partial outputs of the plurality of partial outputs to generate an output tensor, in sparse format, of the second sparse submanifold convolution.

The neural network accelerators, convolution processing units, convolution engines, and graphics processing units described herein may be embodied in hardware on an integrated circuit. There may be provided a method of manufacturing, at an integrated circuit manufacturing system, a neural network accelerator, convolution processing unit, convolution engine or graphics processing unit described herein. There may be provided an integrated circuit definition dataset that, when processed in an integrated circuit manufacturing system, configures the system to manufacture an integrated circuit that embodies a neural network accelerator, convolution processing unit, convolution engine or graphics processing unit described herein. There may be provided a non-transitory computer readable storage medium having stored thereon a computer readable description of a neural network accelerator, convolution processing unit, convolution engine or graphics processing unit that, when processed in an integrated circuit manufacturing system, causes the integrated circuit manufacturing system to manufacture an integrated circuit embodying the neural network accelerator, convolution processing unit, convolution engine or graphics processing unit.

There may be provided an integrated circuit manufacturing system comprising: a non-transitory computer readable storage medium having stored thereon a computer readable description of a neural network accelerator, convolution processing unit, convolution engine or graphics processing unit described herein; a layout processing system configured to process the computer readable description so as to generate a circuit layout description of an integrated circuit embodying the neural network accelerator, convolution processing unit, convolution engine or graphics processing unit; and an integrated circuit generation system configured to manufacture an integrated circuit embodying the neural network accelerator, convolution processing unit, convolution engine or graphics processing unit according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
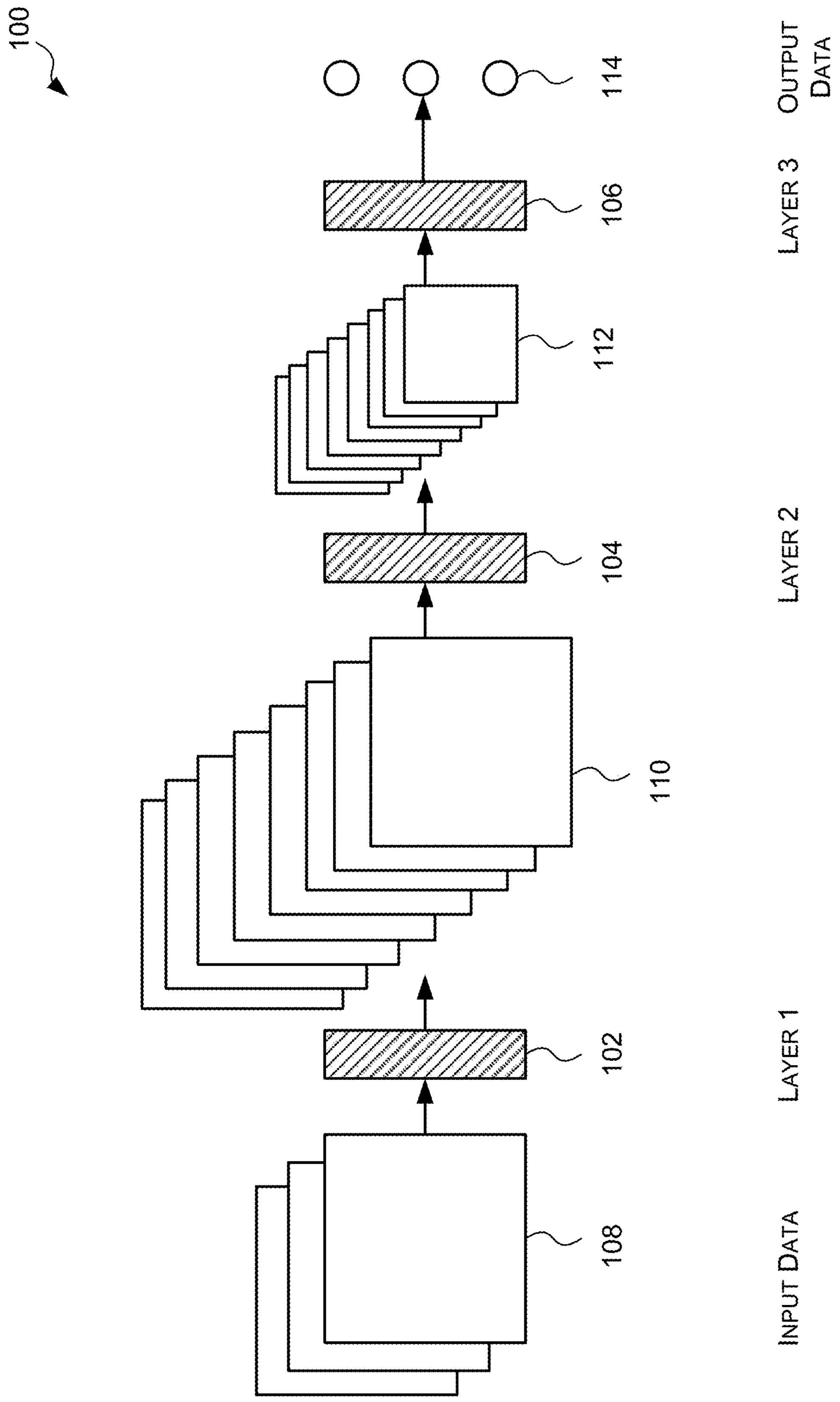
FIG. 1 is a schematic diagram of an example neural network.
Figure 2:
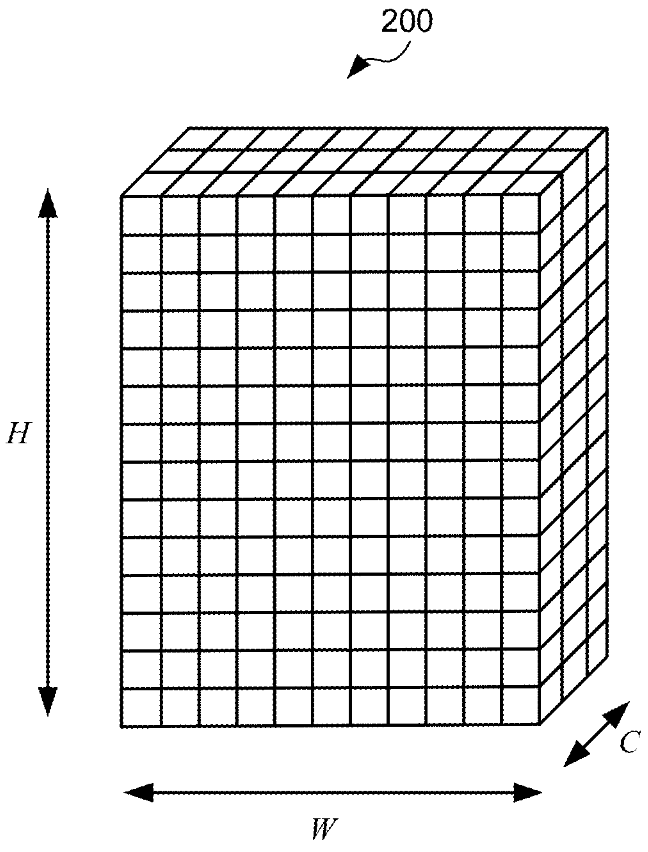
FIG. 2 is a schematic diagram illustrating an example tensor.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, as sparse submanifold convolution layers are becoming more popular in neural networks it is important to be able to implement sparse submanifold convolutions in a hardware efficient manner (e.g., in a manner that requires less silicon area or less processing power).

Methods which are known to the Applicant, which is not an admission that they are known outside of the Applicant company or that they are well-known, for implementing a sparse submanifold convolution on a GPU, such as those implemented by TorchSparse and SpConv, include performing a gather operation, a matrix multiply (MatMul) operation, and a scatter operation. Specifically, in GPU implementations: (1) the active points in the input tensor are determined; (2) a HashMap is then built to store the information of which (active) points need to be multiplied by each weight; (3) a gather operation is then used to generate, from the HashMap, an input data matrix (or a set of input data matrices) and a parameter/weight matrix (or a set of parameter matrices) so that each (active) point is multiplied by the relevant weight; (4) a matrix multiplication is performed between the input matrix/matrices and the parameter matrix/matrices to generate partial results; and (5) a scatter-add operation is then performed, based on the HashMap, to combine the partial results to generate the final outputs and put them in the correct location in the output tensor. However, the gather and scatter operations can be time and resource intensive to implement.

Accordingly, the inventors have developed methods for implementing a sparse submanifold convolution in a more hardware efficient manner, compared to the methods known to the Applicant, using a GPU and/or a neural network accelerator (NNA) which take advantage of the hardware features of GPUs and NNAs respectively. Specifically, the methods described herein for implementing a submanifold convolution are particularly adapted to take into consideration the internal functioning of a GPU and/or an NNA. In particular, as described in more detail below, the GPU-based methods are designed to take advantage of the parallel architecture (e.g. SIMD architecture) of GPUs and the NNA-based methods are designed to take advantage of the architecture of NNAs that enable convolution operations to be implemented in a hardware efficient (in terms of time and resources) manner.

GPU Implementations of Sparse Submanifold Convolution

The inventors have determined that a sparse submanifold convolution can be performed efficiently on a GPU by performing an indexed unfold operation on an input tensor in dense format to generate an input matrix of active windows of the input tensor, performing a matrix multiplication between a weight matrix and the input matrix, and, optionally, performing an indexed fold operation on the output of the matrix multiplication to generate an output tensor in dense format. GPUs are often implemented using a single instruction multiple data (SIMD) architecture. The inventors have determined that indexed unfold operations, matrix multiplications, and indexed fold operations can all be performed very efficiently in a parallelised manner using a SIMD architecture allowing a sparse submanifold convolution to be performed in a very hardware and resource efficient manner using the specific hardware structure of a GPU in the manner described herein.

Figure 5:
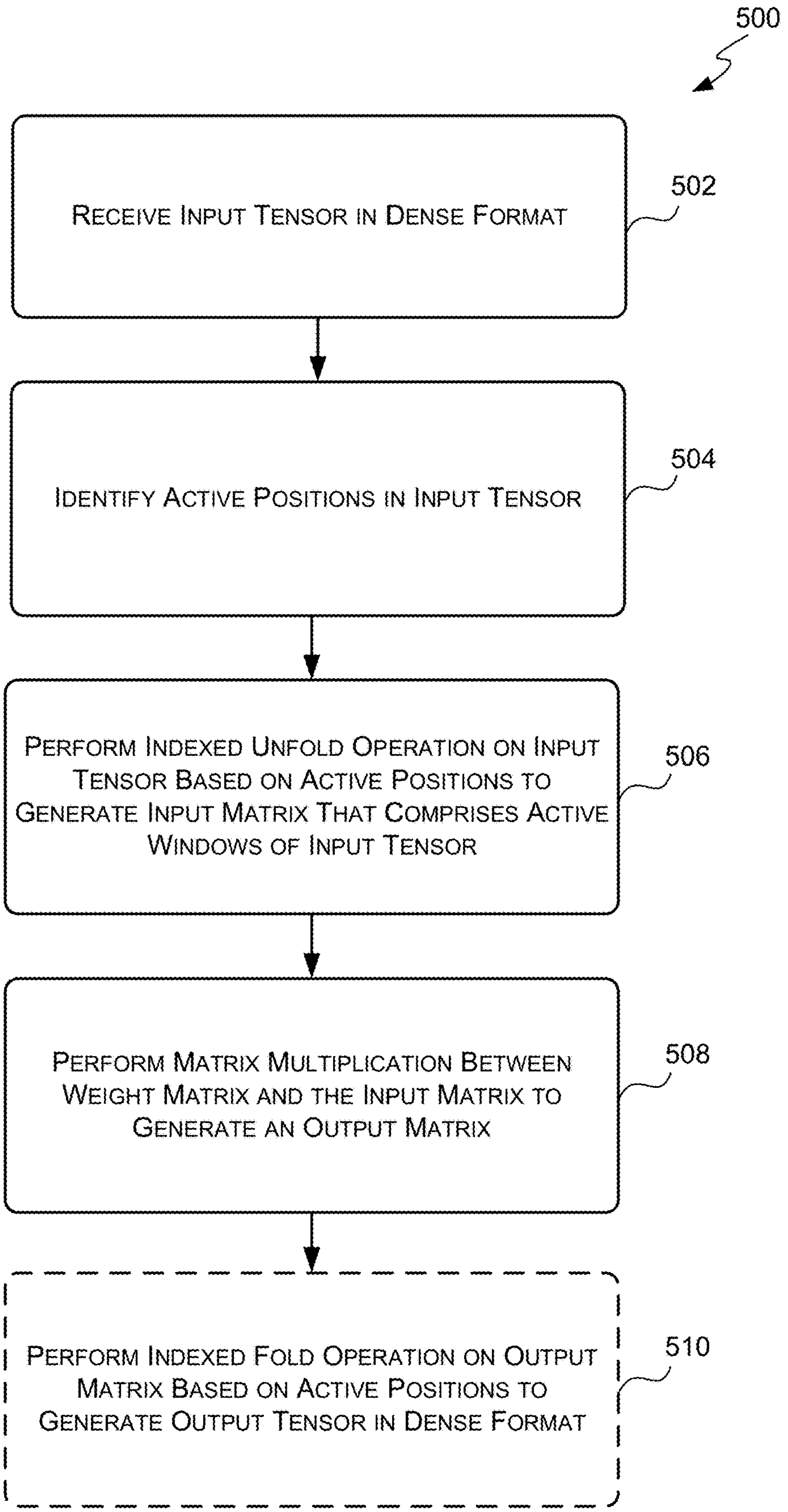
FIG. 5 is a flow diagram of an example method of performing a sparse submanifold convolution using a GPU.

Reference is now made to FIG. 5 which illustrates an example method 500 of implementing a sparse submanifold convolution using a GPU. The method 500 begins at block 502 where an input tensor in dense format is received at the GPU. An input tensor in dense format, which may also be referred to as a densified input tensor, comprises each possible element of the tensor regardless of whether the element is at an active position or not. As described above, an active location or position in an input tensor is a height and width position or location (which may also be referred to as an x,y position, a y,x position, a column and row position, or a row and column position) in which at least one channel of the input tensor has a non-zero value. For example, if the element at height and width position (1,2) of the first channel of an input tensor is non-zero, then that element is at an active position, and the elements at height and width position (1,2) of the other channels are also at an active position, regardless of whether they are non-zero. In contrast, an input tensor in sparse format includes only elements of the corresponding tensor in dense format that are at an active location or position. In other words, an input tensor in sparse format does not include the elements of the input tensor in dense format at non-active positions or locations. For example, if all of the elements at height and width position (1,1) of the input tensor in dense format are zero then the height and width position (1,1) is not an active position and thus the sparse version of that input tensor will not include any elements at height and width position (1,1) of the input tensor in dense format. Once the input tensor in dense format has been received, the method 500 proceeds to block 504.

At block 504, the GPU identifies the active locations or positions in the received input tensor. As noted above, an active location is a height and width position or location of the input tensor in which at least one channel of the input tensor has a non-zero value. Each active location or position may be identified with a set of indices-a height or row index, and a width or column index.

The active locations or positions in the received input tensor may be identified using any suitable technique. For example, there are available software modules, such as the nonzero function in PyTorch®, which can be run efficiently on a GPU, which, when provided with an input tensor will return a list of non-zero co-ordinates of that input tensor. This list will include the co-ordinates of every non-zero element in the input tensor. This means that if there are two channels that have non-zero elements at the same height and width position, then that height and width position will be identified twice, once for each channel. Since an active location is a height and width position in which at least one channel has a non-zero value, the list of co-ordinates generated by the nonzero function may be further processed to identify only the unique height and width positions or co-ordinates in the list. In other words, the list of the co-ordinates generated by the nonzero function may be further processed to eliminate duplicate height and width positions or co-ordinates. In another example, the active locations or positions in the received input tensor may be identified by first using SpConv's from_dense function (which relies on the PyTorch®'s to_sparse function) to generate a tensor in sparse format, in coordinate format, from the input tensor in dense format and then identifying the active locations from the tensor in sparse format.

Figure 6:
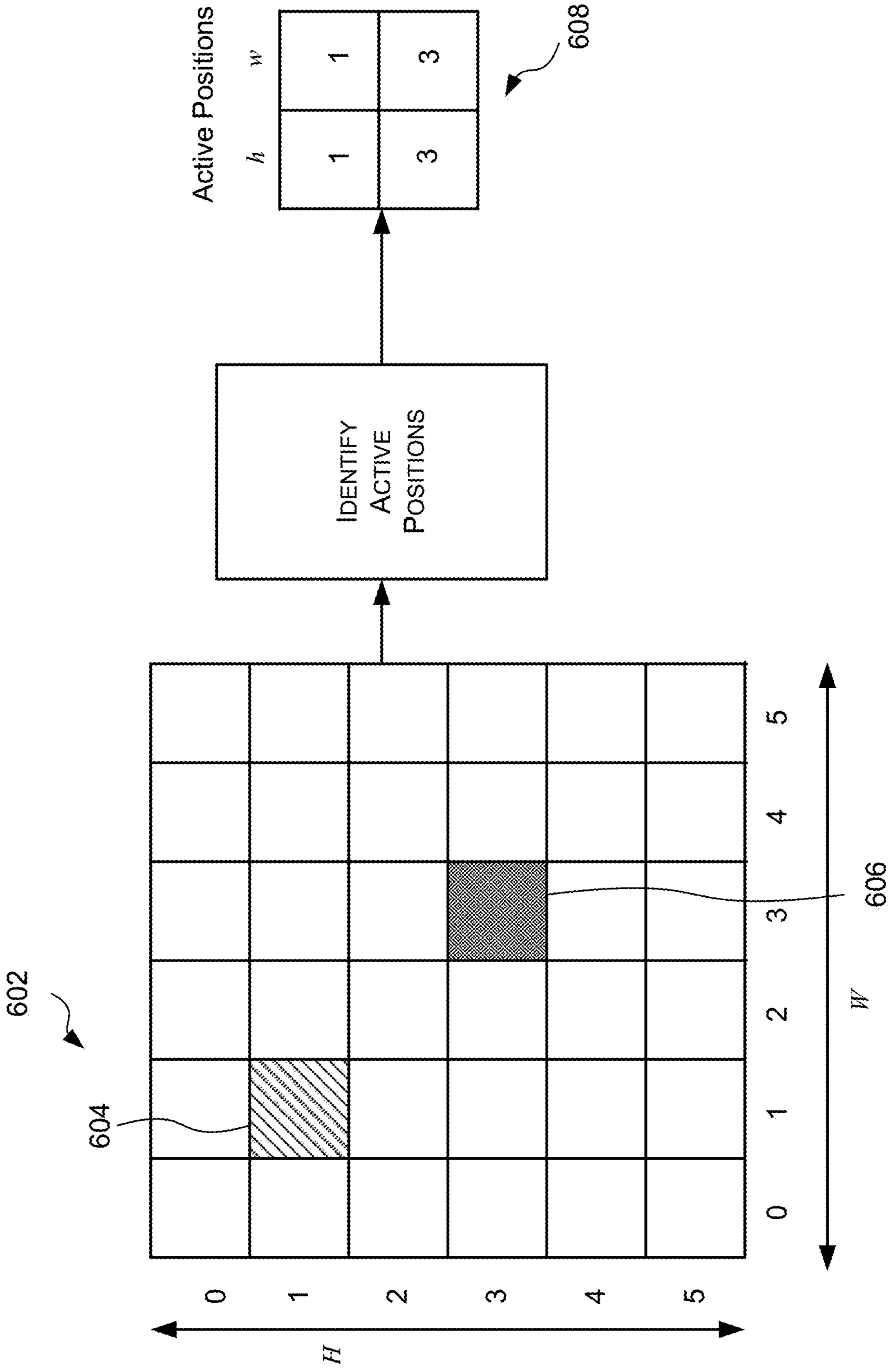
FIG. 6 is a schematic diagram illustrating an example method of generating a list of active positions for an example input tensor.

In some cases, the output of this block 504 may be a list of the height and width (or column and row) co-ordinates or indices of the active positions. For example, FIG. 6 shows an example 6×6 input tensor 602 with a single channel. The input tensor 602 has only two active positions 604, 606. Accordingly, the output of block 504 for this example input tensor 602 may be an active position list 608 that comprises the height and width co-ordinates or indices for each of the two active positions 604, 606. Specifically, the active position list 608 may comprise an entry for each active position that identifies a height (e.g. row) and width (e.g. column) location or position. For example, as shown in FIG. 6, the active position list 608 may comprise an entry for the first active position 604 that identifies its location as a height (row) of 1 and a width (column) of 1, and an entry for the second active position 606 that identifies its location as a height (row) of 3 and a width (column) of 3.

Once the active locations or positions in the received input tensor have been identified, the method 500 proceeds to block 506.

At block 506, the GPU performs an indexed unfold operation (which may also be referred to as a sparse unfold operation) on the received input tensor based on the active locations or positions identified in block 504 to generate an input matrix that comprises the elements of the active windows of the input tensor. In a standard unfold operation (which may also be referred to as an image to column (im2col) operation or a default unfold operation), the elements of the input tensor in each window are placed in a column of the input matrix. As described above, each window generates one output element per channel of the output tensor. Accordingly, if there are P elements in each channel of the output tensor (meaning there are P windows of the input tensor), there will be P columns in the input matrix of a standard unfold operation. An unfold operation can also be described as a flattening operation. A standard unfold operation will now be explained via an example.

Figure 7:
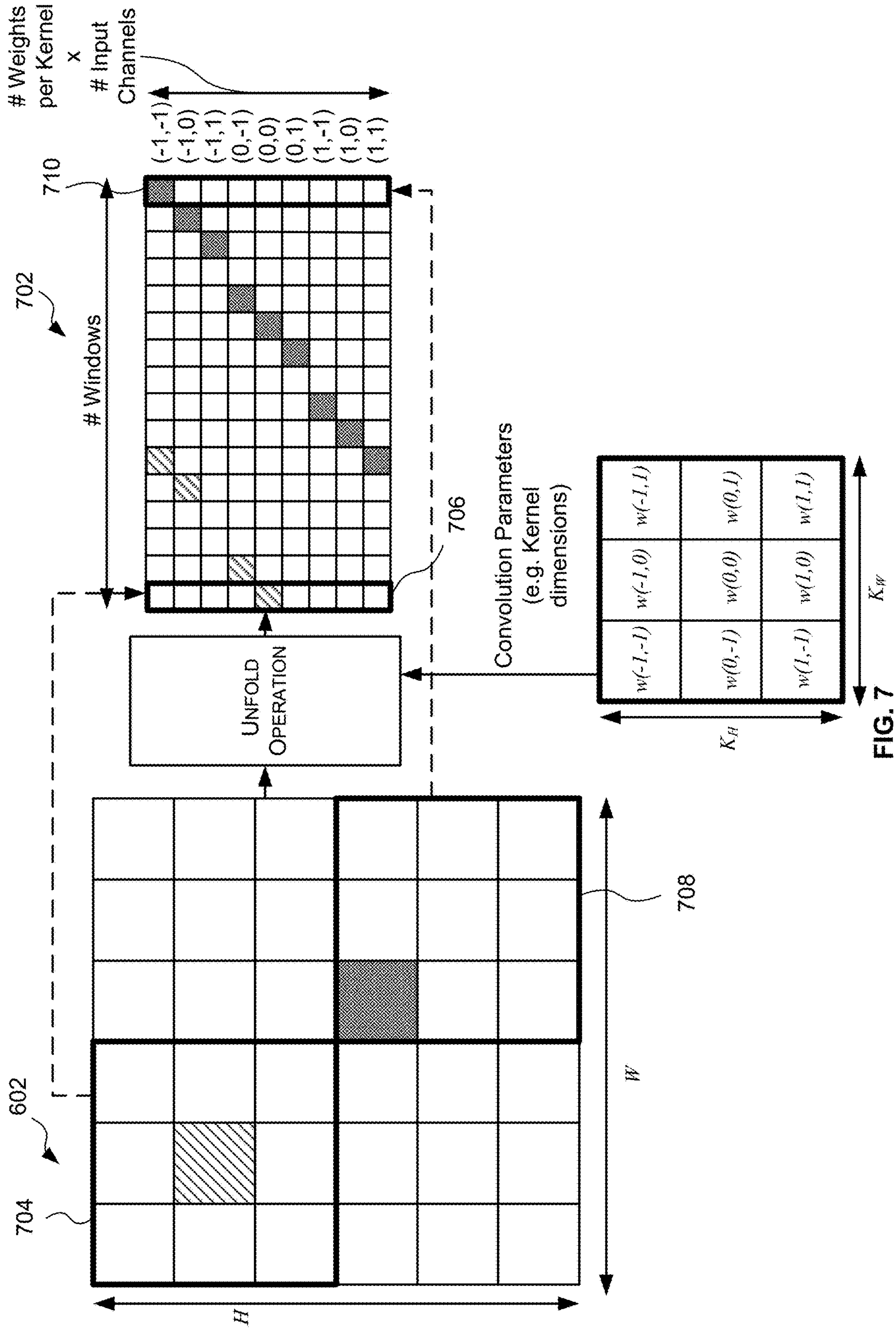
FIG. 7 is a schematic diagram illustrating an example unfold operation.

Reference is now made to FIG. 7 which illustrates a standard unfold operation performed on the example 6×6 input tensor 602 of FIG. 6 to perform a 2D convolution with filters with 3×3 kernels to generate an input matrix 702. In this example, each channel of the output tensor will be of size 4×4, therefore there are sixteen elements in each channel of the output tensor. Each element in a channel of the output tensor is generated from a different window of the input tensor 602. Since there are sixteen windows of the input tensor used to generate the output tensor, there are sixteen columns in the input matrix 702. Each column of the input matrix 702 comprises the elements of one window of the input tensor 602, wherein each element in a window is placed in a different row. In this example each window comprises a 3×3 block of elements in the input tensor 602 thus there are nine elements per window. As a result, the input matrix 702 has nine rows. Each row corresponds to a position in the window, and the elements of a window are placed in the rows in accordance with their position in the window. In the example shown in FIG. 7 the elements in a window are unrolled from left to right and top to bottom, such that the element in the top left corner of the window is placed in the first row, the element in the centre of the window is placed in the fifth row, and the element in the bottom right of the window is placed in the last or ninth row. For example, the elements in the first window 704 of the input tensor 602 are placed in the first column 706 of the input matrix 702 as shown in FIG. 7; and the elements in the last window 708 of the input tensor 602 are placed in the last column 710 of the input matrix 702 as shown in FIG. 7. However, it is evident that this is an example only and the elements of a window can be placed in the input matrix in any order so long as the elements of each window are placed in the same order (e.g. the elements of the first window are placed in a column in the same order as the elements of a second window are placed in a second column).

Although in the example of FIG. 7 the input tensor 602 only has one channel, it will be evident that a standard unfold operation can be equally applied to input tensors with more than one channel by adding n rows to the input matrix for each additional channel, where n is the number of elements in the filter kernel. For example, where each kernel is 3×3 such that each window comprises 9 elements of the input tensor per channel, then 9 rows are added to the input matrix for each additional channel of the input tensor.

However, as explained above, in a sparse submanifold convolution, elements of the output tensor are only generated for windows of the input tensor in which one or more predetermined elements (the centre element in this example) of the window is/are active (which may be referred to herein as the active windows). Therefore, only the columns of the input matrix 702 corresponding to active windows are used in a sparse submanifold convolution. As a result, there are lot of columns in an input matrix generated by a standard unfold operation that are not required for a sparse submanifold convolution.

Figure 8:
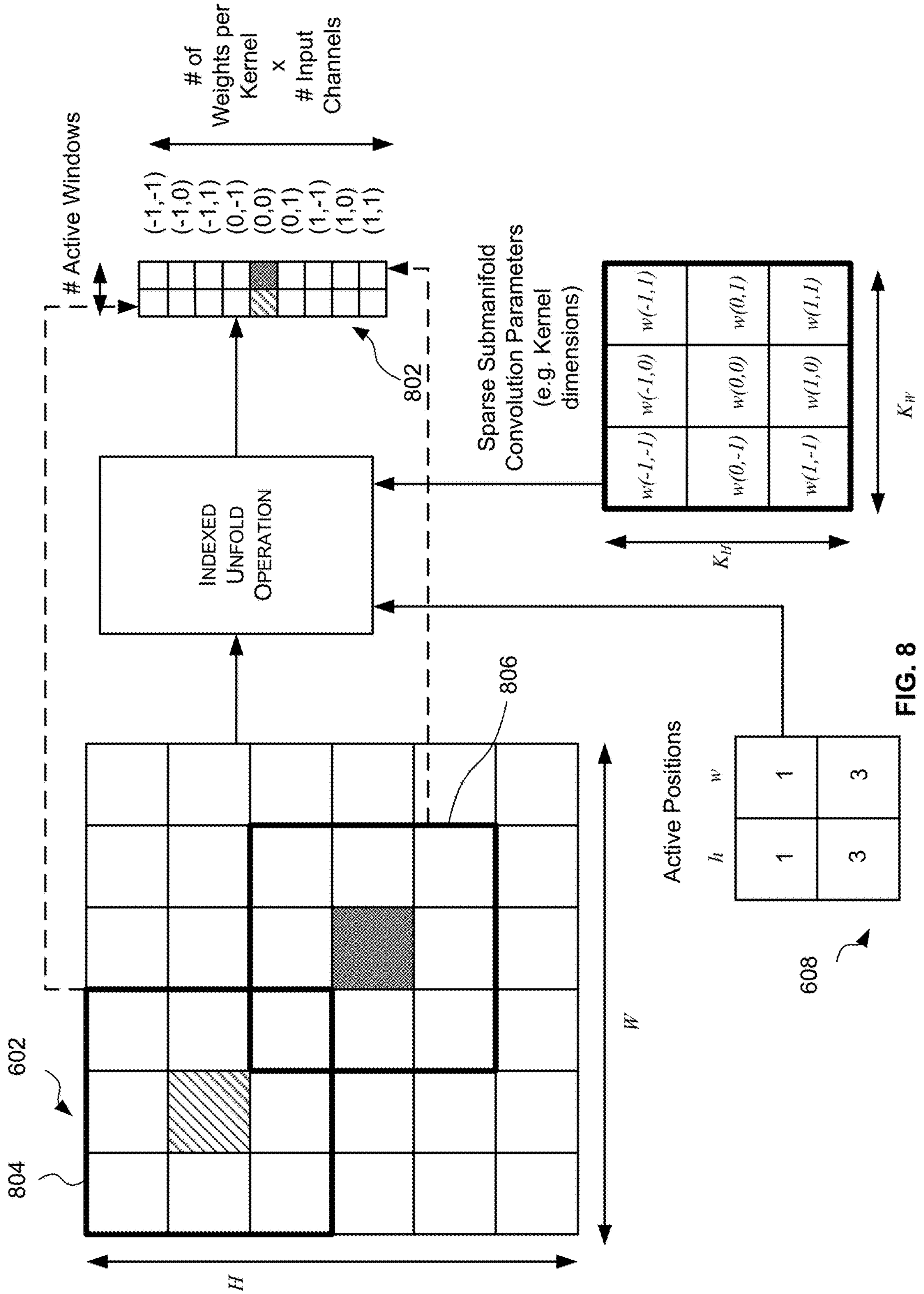
FIG. 8 is a schematic diagram illustrating an example indexed unfold operation to implement a sparse submanifold convolution.

Accordingly, the inventors have developed an indexed unfold operation in which the input tensor only comprises a column for each active window, wherein the active windows are identified from the active locations or positions identified in block 504. Specifically, the indexed unfold operation uses the active locations or positions, and the sparse submanifold convolution parameters (e.g. stride, dilation, kernel size) to determine the active windows of the input tensor, and then generates an input matrix with a column for each active window, wherein each column comprises the elements in the corresponding active window. For example, as shown in FIG. 8, if a sparse submanifold convolution with 3×3 kernels at strides of 1 is to be performed on the input tensor 602 of FIG. 6 (with only two active positions) then there are only two active windows 804, 806. An indexed unfold operation performed on the input tensor 602 therefore results in an input matrix 802 with only two columns—the first column corresponds to the first active window 804 with the first active position at the centre, and the second column corresponds to the second active window 806 with the second active position at the centre.

Figure 9:
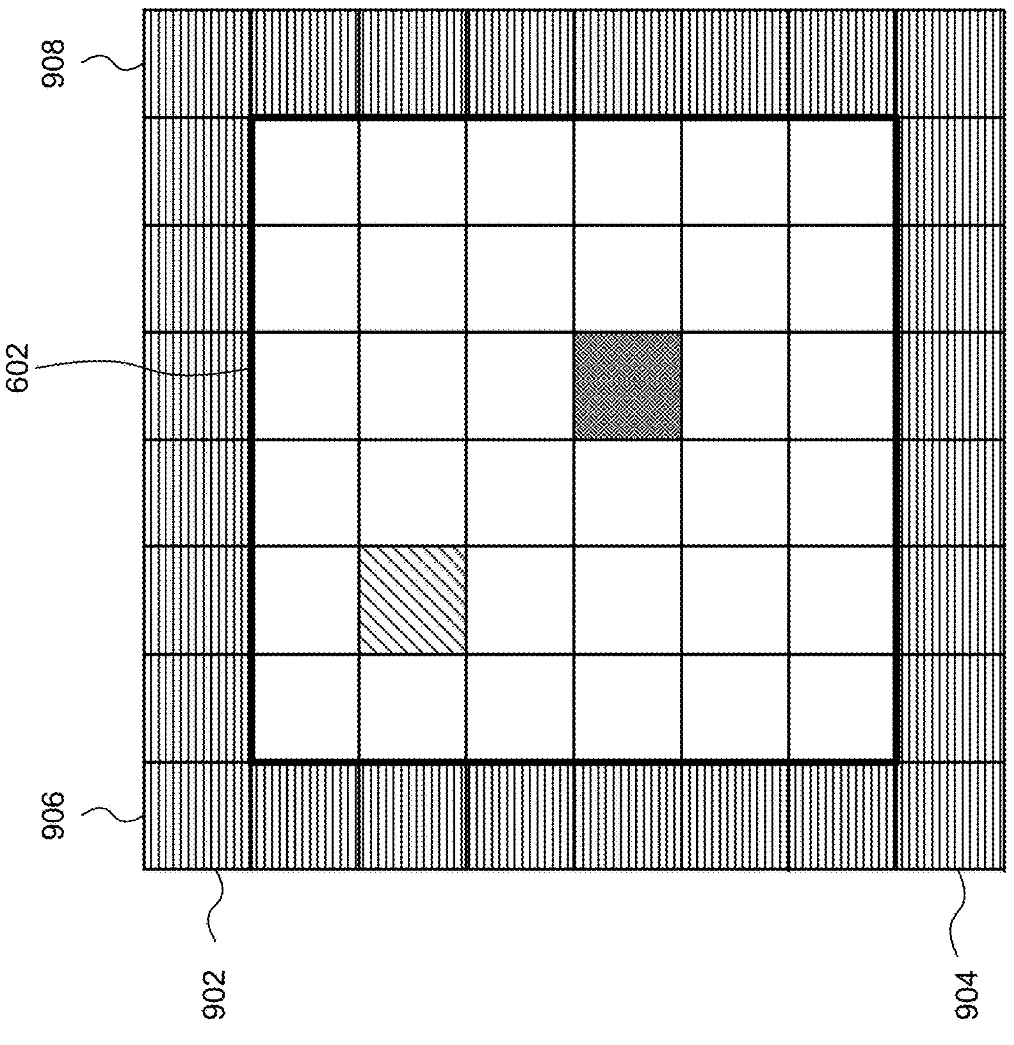
FIG. 9 is a schematic diagram illustrating an example padded input tensor.

In some cases, padding may be applied to the input tensor so that any active point on an edge (i.e. in the first/last column or first/last row) of the input tensor can be the centre of a window. The number of rows and columns of padding that are added are based on the size of the kernel. For example, where a filter has a kernel with a height $K_H$ then $$\left\lfloor \frac{K_H}{2} \right\rfloor$$

rows of padding may be added to each of the top and the bottom of the input tensor; and where a filter has a kernel with a width $K_w$ then $$\left\lfloor \frac{K_W}{2} \right\rfloor$$

columns of padding may be added to each of the left and the right of the input tensor. For example, as shown in FIG. 9, for a 3×3 kernel, a row of padding 902, 904 may be added to each of the top and bottom of the input tensor 602, and a column of padding 906, 908 may be added to each of the left and right of the tensor. Where the input tensor has been padded in this manner, and the stride is one in each dimension, there will be an active window for each active position of the input tensor and the input matrix generated by an indexed unfold operation will have a column for each active position.

Using an indexed unfold operation, as opposed to a standard unfold operation, to generate an input matrix can significantly reduce the size of the input matrix which can significantly reduce the computations to implement the matrix multiplication of block 508 (described below). Table 1 illustrates the size of the input matrix when generated from an indexed unfold operation compared to the size of the input matrix when generated from a standard unfold operation for an example input tensor of size [1, 1, 1000, 1000] (i.e. one batch, one channel, a height of 1000 and a width of 1000) for a sparse submanifold convolution with a 3×3 kernel, strides and dilations of 1 and no padding, for different levels of sparsity. Generally the sparser the input tensor, the smaller the input matrix generated by an indexed unfold operation and the more memory efficient the method described with respect to FIG. 5 is.

TABLE 1

| Sparsity | 0% | 50% | 80% | 90% | 99% |
| --- | --- | --- | --- | --- | --- |
| Standard Unfold Operation | [1, 9, 996004] | | | | |
| Indexed Unfold Operation | [1, 9, 996004] | [1, 9, 500000] | [1, 9, 200000] | [1, 9, 100000] | [1, 9, 10000] |

The indexed unfold operation may be implemented on the GPU in any suitable manner. In one example, where there is an active window per active position, the indexed unfold operation may be implemented by indexing each active location (e.g. from 0 to the number of active locations) and, for each active position/location, identifying the surrounding positions/locations (i.e. the positions/locations in the window of the input tensor centred at the active position) using multiple nested loops, one for each dimension of a window. For example, where the windows are 2D windows with a height dimension and a width dimension, there may be one loop for the height dimension and another for the width dimension. Specifically, for a 2D convolution with 2D windows, an offset may be created for each of the height and width dimensions that is equal to $$\frac{k-1}{2}$$

where k is the size of the kernel in that dimension, and then the GPU is configured to loop from −offset to +offset from the respective active location. Where the windows are 3D with a channel dimension, there may be an additional loop that loops through the channels. The element at each identified position is then copied into the appropriate position of the input matrix. As described above, each column in the input matrix may correspond to one active window. The values at the offset positions, starting from top left, may be ordered from top down. This may be implemented by having a separate thread for each active location/position. Since the same operations are performed for each active position, this can be efficiently implemented by a SIMD architecture—e.g. applying a single instruction (or set of instructions) to multiple pieces of input data (i.e., multiple active positions).

Where there are less active windows than there are active positions due to the stride, dilation, or other sparse submanifold convolution parameters, then the indexed unfold operation may be implemented on the GPU by, prior to identifying the positions/locations surrounding the active position (e.g. using the nested loops), performing a validity check to determine if the active position produces or induces an active window, and only identifying the surrounding positions/locations and adding the elements from the identified positions to the input matrix if the active position induces an active window.

In some cases, in addition to receiving the input tensor in dense format, and the active positions, the indexed unfold operation may also receive a zeroed input matrix with the desired shape (e.g. height=elements per kernel×number of channels, width=number of active windows) and the GPU may be configured to write the active window elements to the appropriate location in the received input matrix.

Once the GPU has performed an indexed unfold operation on the input tensor to generate an input matrix with the elements of each active window of the input tensor, the method 500 proceeds to block 508.

Figure 10:
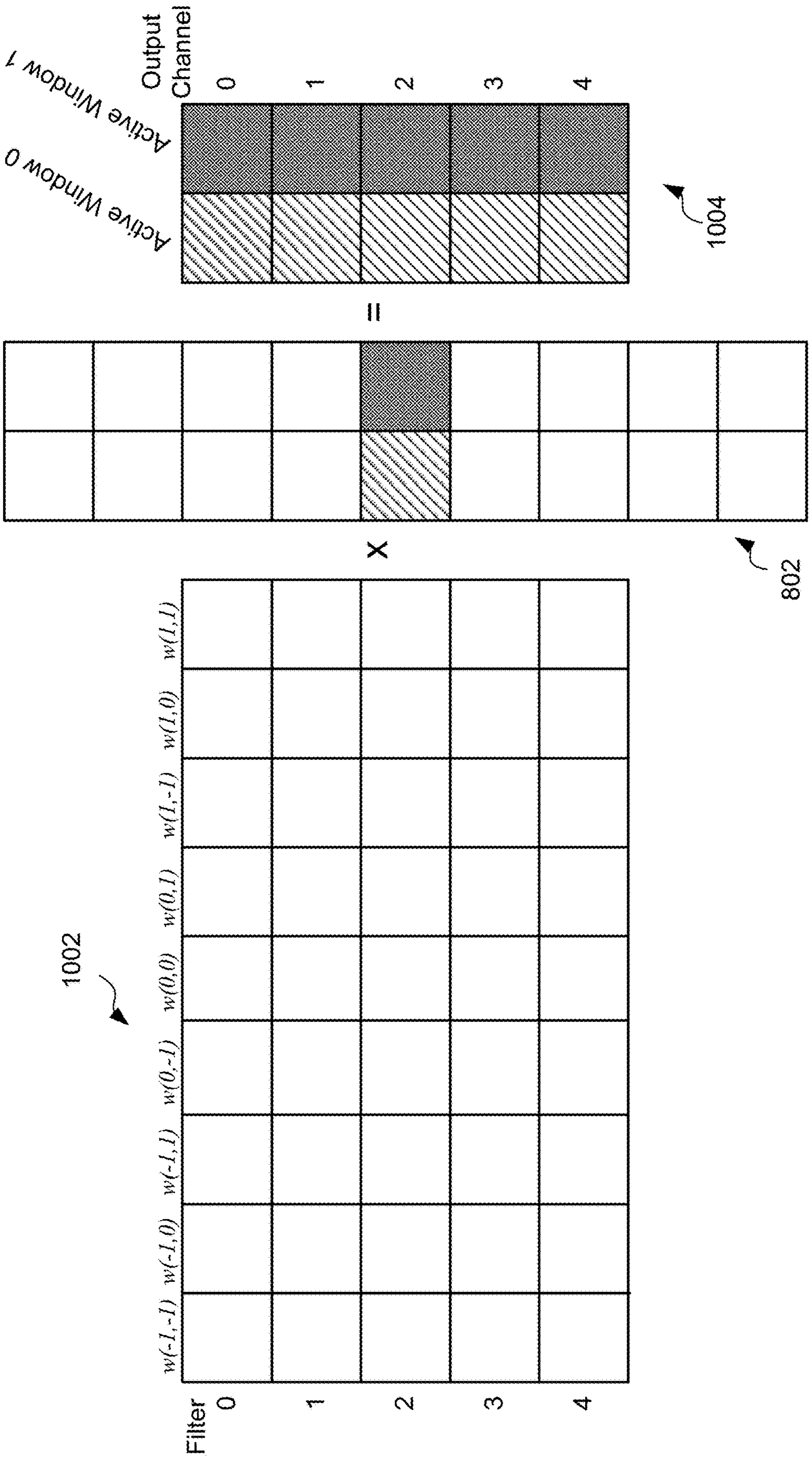
FIG. 10 is a schematic diagram illustrating an example matrix multiplication between a weight matrix and an input matrix to implement a sparse submanifold convolution.

At block 508, the GPU performs a matrix multiplication operation (which may be referred to as a MatMul operation) between a weight matrix and the input matrix generated in block 506 to generate an output matrix. FIG. 10 illustrates an example of a matrix multiplication between a weight matrix 1002 and the input matrix 802 of FIG. 8. The weight matrix 1002 may comprise a row for each filter, and a column for each weight in a filter. For example, in FIG. 10 there are five filters with 3×3 kernels and one channel (thus each filter comprises nine weights). Therefore, the weight matrix 1002 comprises five rows and nine columns. Each column corresponds to a position in the filter and the weights of a filter are placed in the columns in accordance with their place in the filter. In the example shown in FIG. 10 the weights in a filter are unrolled from left to right and top to bottom, such that the weight in the top left corner of a filter is placed in the first column, the weight in the centre of the filter is placed in the fifth column, and the weight in the bottom right of the filter is placed in the last or ninth column. It will be evident to a person of skill in the art that this is an example only and that the weights can be placed in any order in the weight matrix so long as their order corresponds to the order of the elements of each active window in the input matrix. Specifically, if element at position (−1,−1) of an active window is placed in row 0, then the weight at position (−1,−1) of the filter should be placed in column 0.

The matrix multiplication between the weight matrix 1002 and the input matrix 802 generates an output matrix 1004 which comprises, for each active window, an output element for each channel of the output tensor (i.e., for each filter of the sparse submanifold convolution). The output matrix 1004 may have a column for each active window and a row for each output channel such that each column comprises an output element for the corresponding active window for each output channel. In the example shown in FIG. 10 there are two active windows and five output channels, so the example output matrix 1004 has two columns and five rows. The matrix multiplication may be parallelised on the GPU, by, for example, processing each column of the input matrix in a separate thread.

Once the GPU has performed the matrix multiplication the method 500 may end or the method 500 may proceed to block 510. Specifically, the output matrix 1004 generated in block 508 comprises all of the non-zero elements of the output tensor (in other words the output matrix corresponds to the output tensor in sparse format) and thus the output matrix 1004 may be simply output, or an output tensor in dense format may be first generated from the output matrix 1004. When the method is performed as part of a neural network, whether or not the output matrix is converted to an output tensor in dense format may depend on what input tensor format is expected by the next layer in the neural network.

At block 510, the GPU performs an indexed fold operation on the output matrix generated in block 508 to generate an output tensor 1102 in dense format. The indexed fold operation is the opposite of the indexed unfold operation performed in block 506. Specifically, the indexed fold operation uses the active windows to generate an output tensor in dense format (e.g. a densified output tensor) from the output matrix 1004 generated in block 508. In other words, the indexed fold operation generates an output tensor with the elements of the output matrix 1004 in the correct position of the output tensor in dense format and zeros elsewhere.

A standard fold operation (which may also be referred to as a column to image (col2im) operation) receives an output matrix in dense format—i.e. an output matrix that comprises a row per output channel with an output element for each element of that channel—and converts each row of the received matrix to a plane of the output tensor in accordance with the size of a channel of the output tensor. For example, if each channel of the output tensor is of size 5×5, then a standard fold operation places every five elements in the same row of the received matrix in a different row of the corresponding channel. For example, the first five elements in the first row of the received matrix would be placed in the first row of the first channel of the output tensor, the next five elements in the first row of the received matrix would be placed in the second row of the first channel and so on; the first five elements in the second row of the received matrix would be placed in the first row of the second channel of the output tensor, the next five elements in the second row of the received matrix would be placed in the second row of the second channel and so on.

In contrast to a standard fold operation, an indexed fold operation receives an output matrix in sparse format—i.e., the received matrix does not comprise an element for every element of the output tensor in dense format. An indexed fold operation also receives information indicating the position in the output tensor corresponding to each active window of the input tensor (this may be information (e.g. indices) identifying the active positions identified in block 504; information specifically identifying the active windows (e.g. indices of an element of each active window) (which may be generated as part of block 506); or information specifically identifying the position in the output tensor corresponding to each active window (which may be generated as part of block 506)). The information indicating the position in the output tensor corresponding to each active window is then used to place the elements of the sparse output matrix in the correct location of the output tensor in dense format. The elements at all other positions may then be set to zero.

Where there is an active window per active position (e.g. because the input is padded and the stride is 1 in all directions), then the height and width of the input tensor will be the same as the height and the width of the output tensor, and the elements in the sparse output matrix 1004 can be simply placed in the same location in the output tensor as the corresponding active position. For example, in such cases, if an active window is centred at active position (1,1) then the output elements based on that active window will be placed at position (1,1) of the corresponding output channel. If, however, there is not an active window per active position and the received information does not explicitly identify the output position corresponding to each active window, the location of each element in the output matrix 1004 is determined from the received information and/or the parameters of the sparse submanifold convolution. For example, active windows can be determined from the active locations and the parameters of the sparse submanifold convolution (e.g. filter dimensions, strides, dilations), and the position in the output tensor corresponding to each active window can be determined from the active window and the parameters of the sparse submanifold convolution.

Figure 11:
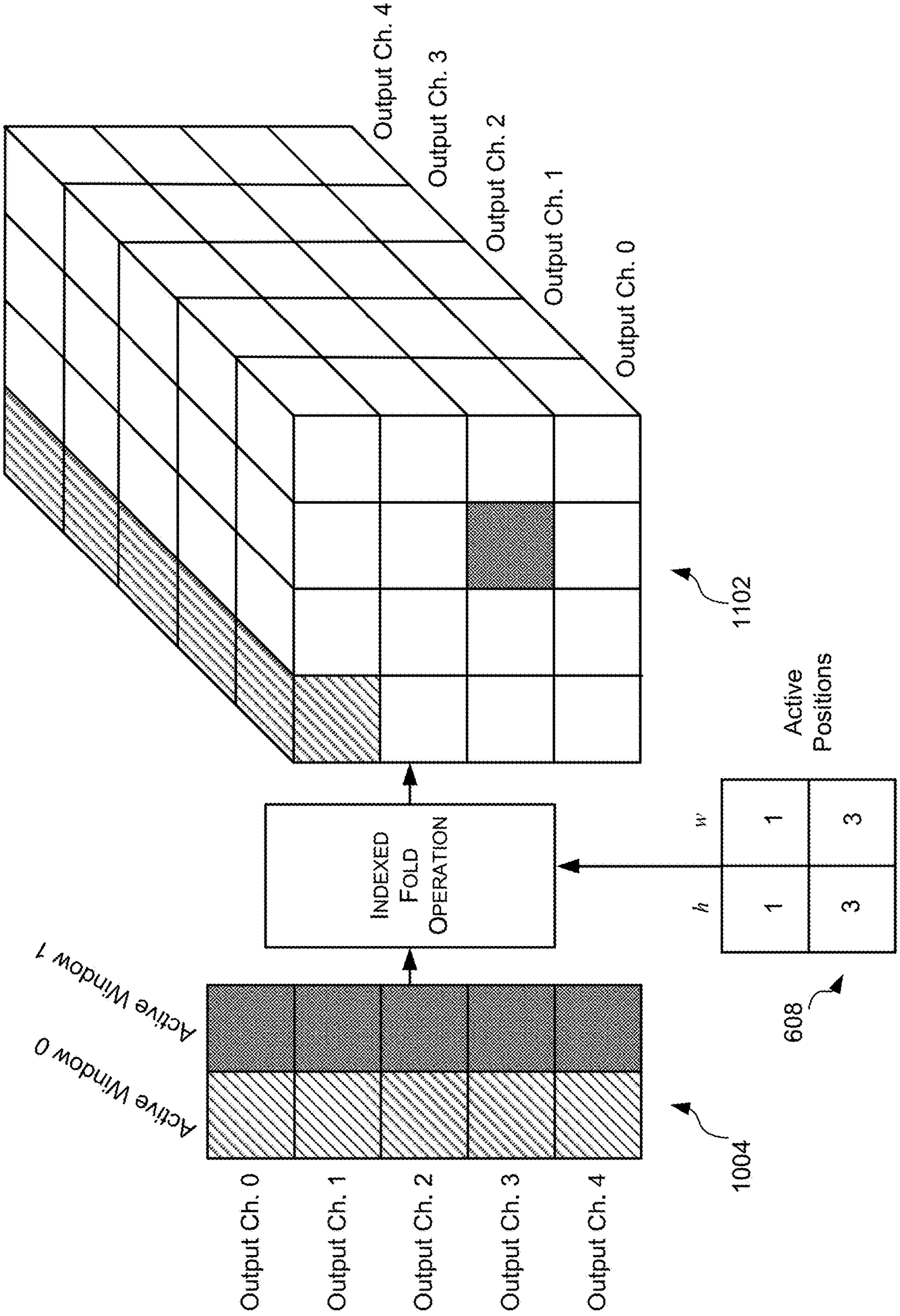
FIG. 11 is a schematic diagram illustrating an example indexed fold operation to implement a sparse submanifold convolution.

FIG. 11 illustrates an example indexed fold operation performed on the output matrix 1004 of FIG. 10. It can be seen that, based on the active position list 608 and the sparse submanifold convolution parameters, it can be determined that each element of the output matrix 1004 associated with the first active window is to be placed at location (0,0) of the corresponding channel of the output tensor 1102, and each element in the output matrix 1004 associated with the second active window is to be placed at location (2,2) of the corresponding channel of the output tensor 1102.

The indexed fold operation may be implemented on the GPU in any suitable manner. In one example, where there is an active window per active position of the input tensor, an indexed fold operation may be implemented on the GPU by, for example, creating an index for each active position/location (e.g. from 0 to n where there are n+1 active locations in the input tensor). Then, for each active position/location, the GPU may be configured to determine the associated location in the output tensor from the location of the corresponding active position and the kernel parameters, then loop through each output channel and place or copy the appropriate element of the output matrix in the determined location in the corresponding channel of the output tensor. Each active location may get its own thread.

Where there are less active windows than active positions, due to, for example, the stride, dilation, or other convolution parameters, then the indexed fold operation may be implemented on the GPU by, prior to determining the associated location in the output tensor for an active position, performing a validity check on the active position to determine if the active position produces or induces an active window, and only determining the associated location in the output tensor and performing the copying if the active position induces an active window. For example, if the stride is two for a sparse submanifold convolution, then the validity check may comprise determining if the active position is at or on an odd index, and if it is determined that the active position is at or on an odd index determining that the active position does not induce an active window.

In some cases, in addition to receiving the sparse submanifold convolution parameters, information identifying the active windows, and the output matrix generated in block 508, the indexed fold operation may also receive a zeroed output tensor of the appropriate dimensions and may write the elements of the received matrix to the received output tensor. In such cases, a zero may not have to be explicitly written to the positions of the output tensor that do not comprise an element of the output matrix.

Once the indexed fold operation has been performed, the method 500 may end.

In the examples described above, a row of the weight matrix corresponds to a filter (i.e., comprises all of the weights of a filter) and a column of the input matrix corresponds to a window of the input tensor (i.e., comprises all of the elements in the window of the input tensor), and the weight matrix is multiplied with the input matrix, such that the dot product of a row of the weight matrix and a column of the input matrix is calculated, to obtain the output matrix. However, it will be evident to a person of skill in the art that this is an example only and in other examples, the rows and columns of the weight matrix and the input matrix may be reversed (in other words the weight matrix and the input matrix may be transposed) and the transposed input matrix may be multiplied with the transposed weight matrix to obtain the transpose of the output matrix.

In some cases, the input matrix may be transposed after the indexed unfold operation, and the output matrix may be transposed prior to the indexed fold operation. However the weight matrix may be transposed offline and simply provided to the GPU as an input. In some cases, where a sequence of two or more sparse submanifold convolutions are performed only the input matrix of the first sparse submanifold convolution may be transposed and only the output matrix of the last sparse submanifold convolution is transposed. Specifically, the middle convolutions are simply performed with transposed matrices.

As described in more detail below, testing has shown that the described method of implementing a sparse submanifold convolution allows a sparse submanifold convolution to be implemented more efficiently in terms of computing time and resources than known GPU-based methods.

Test Results

Figure 12:
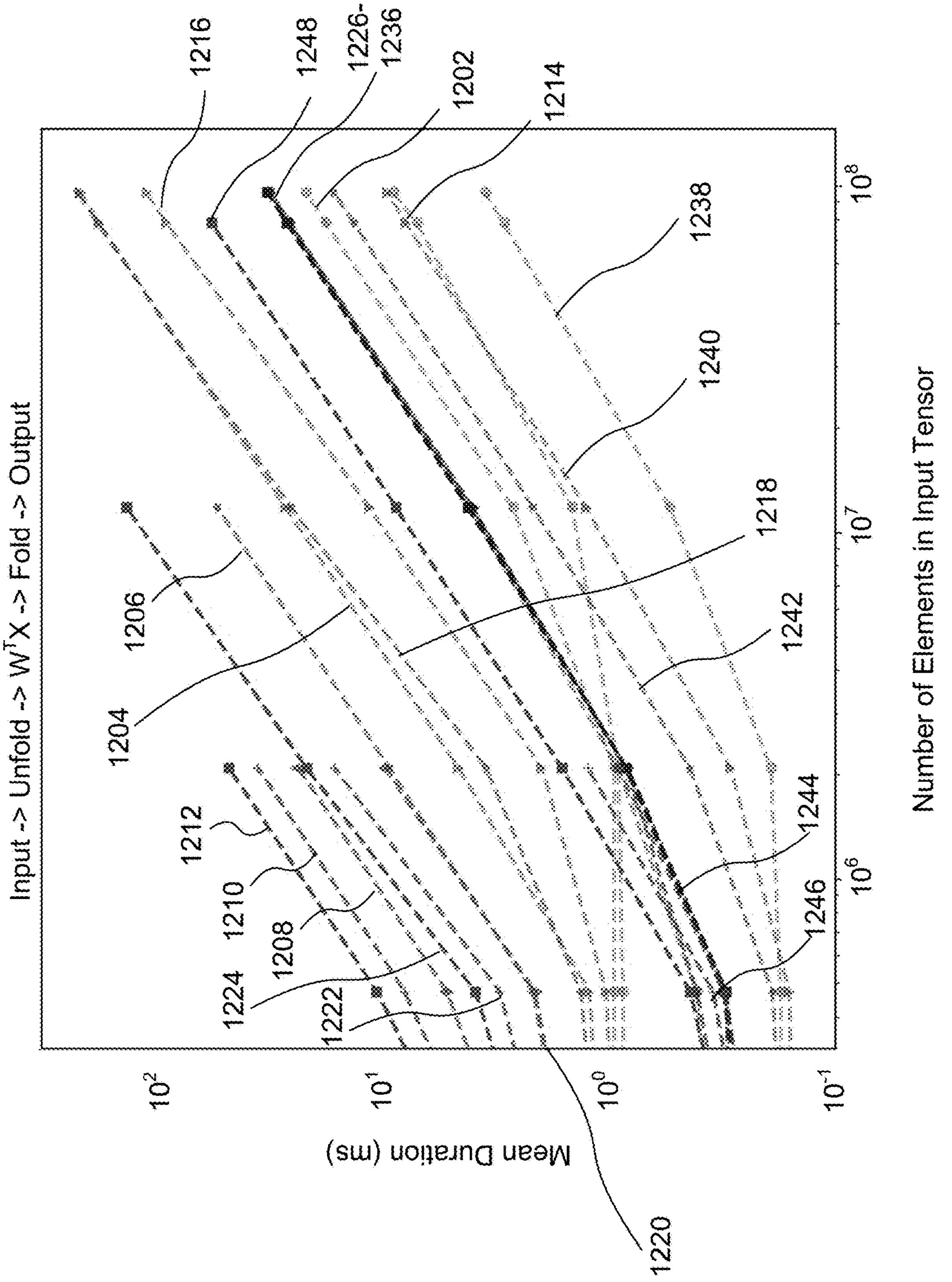
FIG. 12 is a graph of the mean duration to implement an example sparse submanifold convolution on a GPU for different sized 3D input tensors using different methods and different levels of sparsity.

Reference is now made to FIG. 12 which shows a graph of the mean duration, in ms, to implement an example sparse submanifold convolution on a GPU (i) for different sized 3D input tensors (MNIST), (ii) using different methods (TorchSparse, SpConv, PyTorch Conv3D and the method described herein with respect to FIG. 5 which is referred to as the "Sparse Unfold" method); and (iii) with different levels of sparsity. Table 2 summarises the different combinations of sparse submanifold convolution implementation methods, and input tensor sparsity shown in FIG. 12.

TABLE 2

| Element in FIG. 12 | Method | Sparsity |
|---|---|---|
| 1202 | TorchSparse | 99% |
| 1204 | TorchSparse | 90% |
| 1206 | TorchSparse | 80% |
| 1208 | TorchSparse | 50% |
| 1210 | TorchSparse | 25% |
| 1212 | TorchSparse | 0% |
| 1214 | SpConv | 99% |
| 1216 | SpConv | 90% |
| 1218 | SpConv | 80% |
| 1220 | SpConv | 50% |
| 1222 | SpConv | 25% |
| 1224 | SpConv | 0% |
| 1226 | PyTorch Conv3D | 99% |
| 1228 | PyTorch Conv3D | 90% |
| 1230 | PyTorch Conv3D | 80% |
| 1232 | PyTorch Conv3D | 50% |
| 1234 | PyTorch Conv3D | 25% |
| 1236 | PyTorch Conv3D | 0% |
| 1238 | Sparse Unfold | 99% |
| 1240 | Sparse Unfold | 90% |
| 1242 | Sparse Unfold | 80% |
| 1244 | Sparse Unfold | 50% |
| 1246 | Sparse Unfold | 25% |
| 1248 | Sparse Unfold | 0% |

It can be seen from FIG. 12 that the method described herein with respect to FIG. 5 for Implementing a sparse submanifold convolution outperforms known GPU-based methods for implementing a sparse submanifold convolution when the input data is highly sparse (e.g. at least 90% sparsity).

NNA Implementations of Sparse Submanifold Convolution

Performing forward and backward passes of a neural network is often expensive to implement on a CPU or GPU in terms of computations, bandwidth and power. Accordingly, neural network accelerators (NNAs) have been developed that allow neural networks to be implemented in a hardware efficient manner (e.g., in a manner that requires less silicon area or less processing power).

An NNA is hardware that is designed to accelerate the processing of a neural network. As is known to those of skill in the art, a hardware accelerator is hardware designed to perform a specific set of one or more functions more efficiently than a general processing unit, such as a central processing unit (CPU). Accordingly, in contrast to a general CPU which can be configured to perform any number of functions, an accelerator can only perform a limited set of one or more functions. NNAs have one or more network processing hardware units (which may simply be referred to as processing units) which are each designed to accelerate one or more neural network operations. Therefore a graphics processing unit (GPU) with one or more network processing hardware units designed to accelerate one or more neural network operations can be understood to be an NNA itself or can be understood to comprise an NNA. A neural network operation is defined herein as an operation that is used to implement all or a part of a neural network layer. A neural network layer may be implemented by one or more neural network operations. Example neural network operations include, but are not limited to, convolution operations, non-linear operations, pooling operations and normalisation operations.

An NNA may therefore have, for example, a convolution processing unit which is configured to accelerate convolution operations, an activation processing unit which is configured to accelerate non-linear operations, a pooling processing unit which is configured to accelerate pooling operations, and/or a normalisation processing unit configured to accelerate normalisation operations. It will be evident to a person of skill in the art that this is just an example set of network processing hardware units that an NNA may have, and NNAs may have additional network processing hardware units, fewer network processing hardware units or a different combination of network processing hardware units. An example NNA is described below with reference to FIG. 44.

The inventors have determined that a sparse submanifold convolution can be performed efficiently using an NNA by performing, for each kernel location, a 1×1 convolution between the input tensor in sparse format and the weight(s) at that kernel location to generate partial outputs and then combining the appropriate partial outputs to generate the final output elements. The combining of the partial outputs generated by the 1×1 convolutions may be implemented in a number of different ways. In some cases, where, for example, the NNA comprises a hardware component that can perform a scatter-add operation, the combining of the partial outputs may be implemented by performing a scatter-add operation on the partial outputs using that hardware component. In other cases, where, for example the NNA does not have a hardware component that can perform a scatter-add operation, the combining may be implemented by performing a matrix multiplication between the output of each 1×1 convolution and a corresponding scatter matrix, and combining the results of the matrix multiplications. These methods take advantage of the hardware structure of NNAs that allows convolution operations to be performed in a hardware efficient manner.

Figure 13:
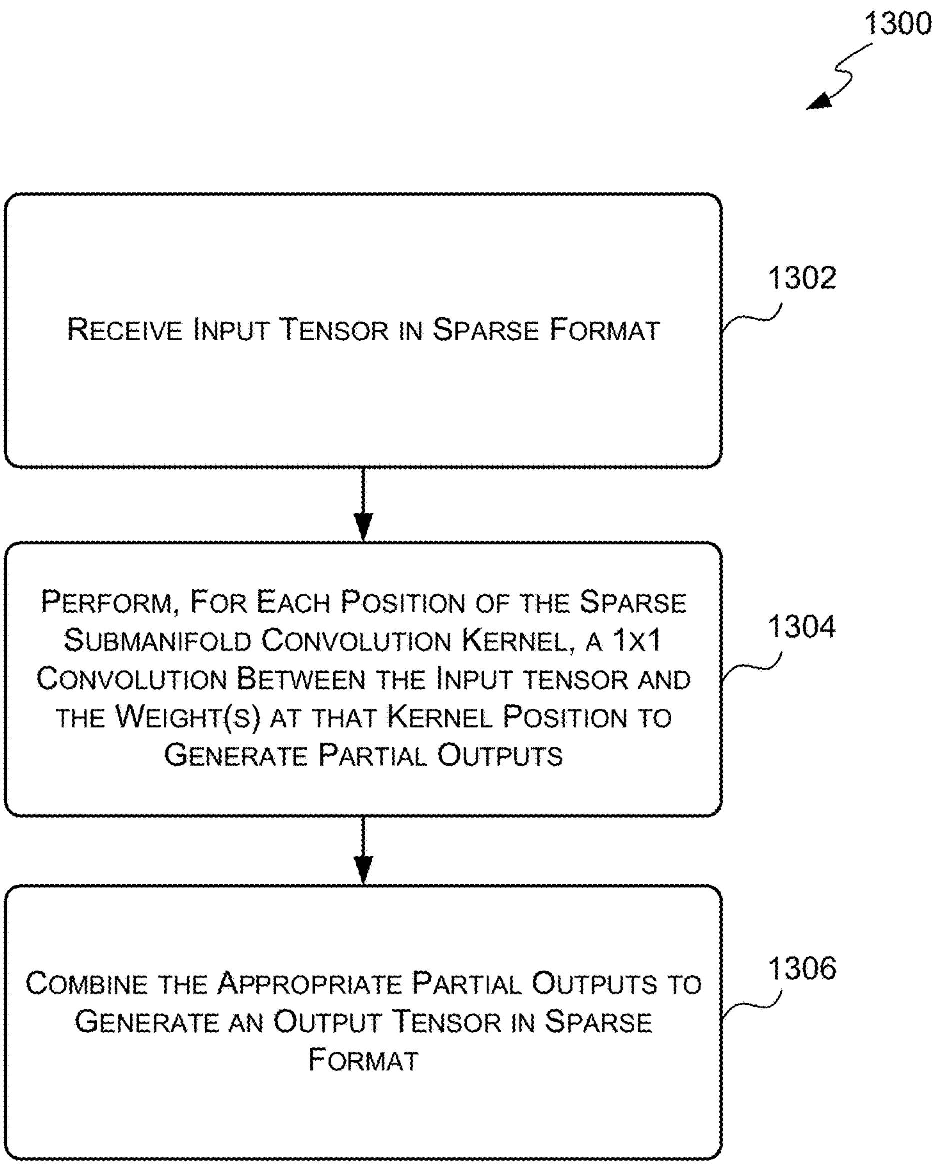
FIG. 13 is a flow diagram of an example method of implementing a sparse submanifold convolution using a neural network accelerator.
Figure 14:
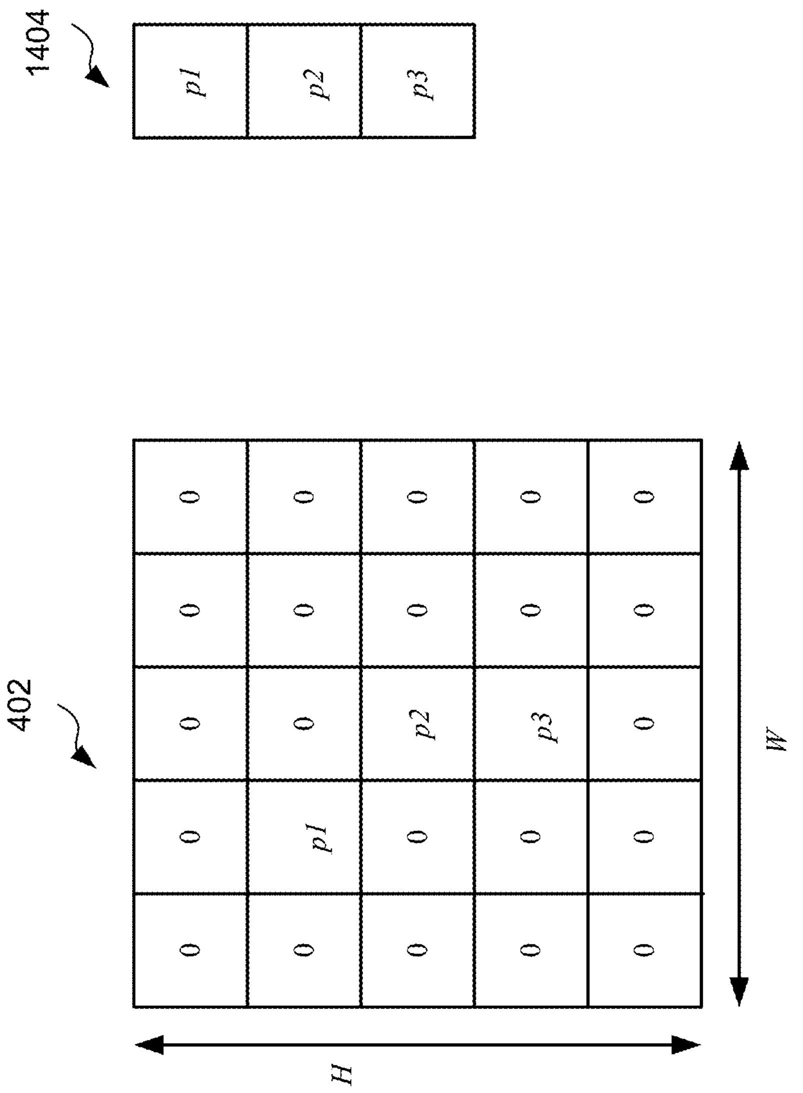
FIG. 14 is a schematic diagram illustrating dense and sparse formats of an example tensor.

Reference is now made to FIG. 13 which illustrates an example method 1300 for implementing a sparse submanifold convolution using an NNA. The method 1300 begins at block 1302 where an input tensor in sparse format is received at the NNA. As described above, an input tensor in dense format comprises each element of an input tensor, regardless of whether the element is at an active position. In contrast, an input tensor in sparse format includes only elements of an input tensor in dense format that are at an active position. For example, FIG. 14 shows the input tensor of FIG. 4 with three active positions/locations (p1, p2, p3) in dense format 402 and the same input tensor in sparse format 1404. It can be seen in FIG. 14 that the input tensor in sparse format 1404 only includes the elements of the input tensor in dense format 402 at the active locations or positions. In the example shown in FIG. 14 the input tensor in dense format 402 only has one channel, thus the input tensor in sparse format only has one channel; however, if the input tensor in dense format has multiple channels, then the input tensor in sparse format will also have multiple channels. In other words, an input tensor in sparse format will comprise, for each active position, an element for each channel. Once the input tensor in sparse format has been received at the NNA, the method 1300 proceeds to block 1304.

At block 1304, the NNA performs, for each position or location within the kernel of the filter(s) of the sparse submanifold convolution, a 1×1 convolution on the received input tensor using the weight(s) at that kernel position or location. As described above, an NNA often comprises hardware, such as a convolution processing unit (i.e., a convolution hardware accelerator), to accelerate convolution operations. Accordingly, the NNA may efficiently perform the 1×1 convolutions using such hardware.

Figure 15:
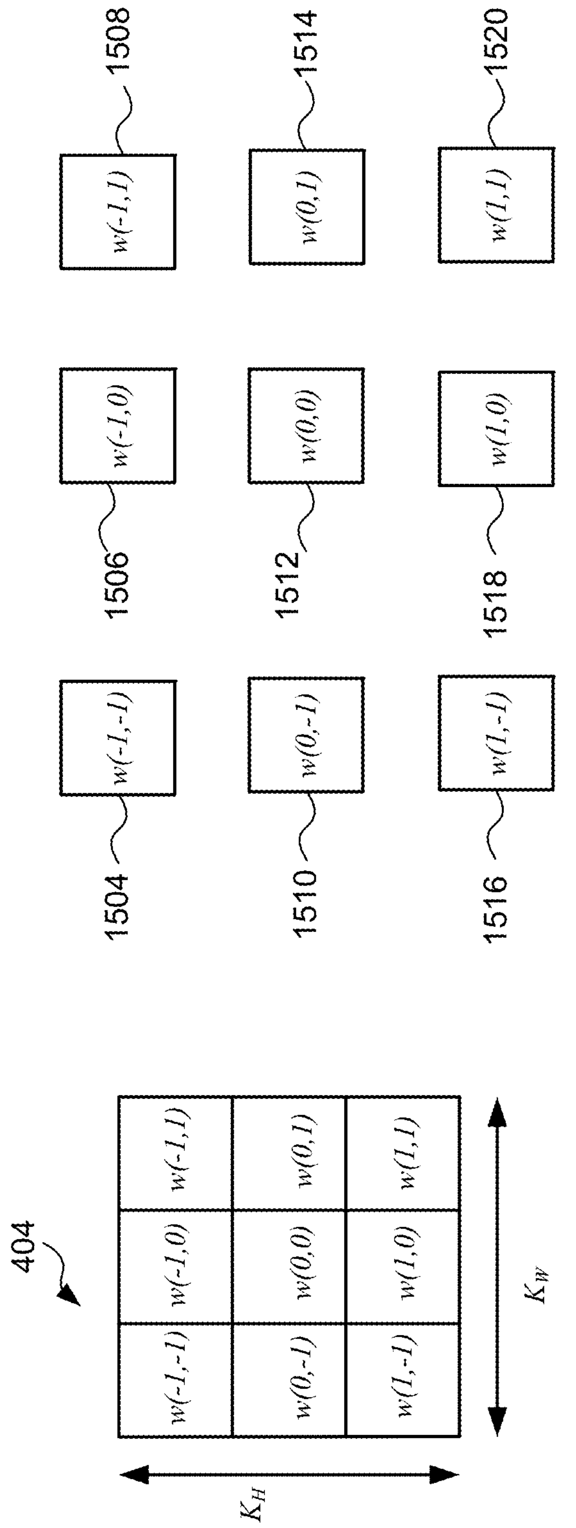
FIG. 15 is a schematic diagram illustrating the sub-filters for an example filter to implement a sparse submanifold convolution.

As described above, a sparse submanifold convolution applies one or more filters of weights to active windows of an input tensor. Each filter of a sparse submanifold convolution may be referred to herein as a sparse submanifold filter. Each sparse submanifold filter comprises one or more kernels of size $K_H \times K_W$, where $K_H$ is the height of the kernel (i.e., the number of weights in the height or y dimension) and $K_W$ is the width of the kernel (i.e., the number of weights in the width or x dimension). Each kernel thus comprises $K_H \times K_W$ weights, each at a different position or location within the kernel. FIG. 15 illustrates the example sparse submanifold filter 404 of FIG. 4 with a single 3×3 kernel. The kernel comprises nine different weights, each at a different location or position within the kernel. Each location or position in the kernel may be identified by a set of height and width (or y and x) co-ordinates or indices. For example, the nine positions within the kernel 404 in FIG. 15 can be expressed as pairs of height and width co-ordinates or indices where (0,0) is the centre of the kernel. For example, the nine positions within the kernel can be expressed by the following indices (−1,−1), (−1,0), (−1,1), (0,−1), (0,0), (0,1), (1,−1), (1,0), (1,1). It will be evident to a person of skill in the art that this is only one example of indices that can be used to identify the positions or locations within a kernel.

For each position within a kernel of a sparse submanifold filter, the weight(s) at that position are extracted to form a sub-filter. For example, the weights at position (−1,−1) form one sub-filter, the weights at position (−1,0) form another sub-filter and so on. FIG. 15 illustrates the nine sub-filters 1504, 1506, 1508, 1510, 1512, 1514, 1516, 1518, 1520 that are generated from the example sparse submanifold filter 404 of FIG. 15. It will be evident to a person of skill in the art that since the sparse submanifold filter 404 of FIG. 15 comprises only one channel, each sub-filter only comprises one channel. However, if the sparse submanifold filter has multiple channels, each sub-filter will also have multiple channels. In other words, a sub-filter comprises, for each channel of the filter, the weight at a particular kernel position. For example, if the sparse submanifold filter comprises three channels, then each sub-filter comprises three weights, one for each channel.

Figure 16:
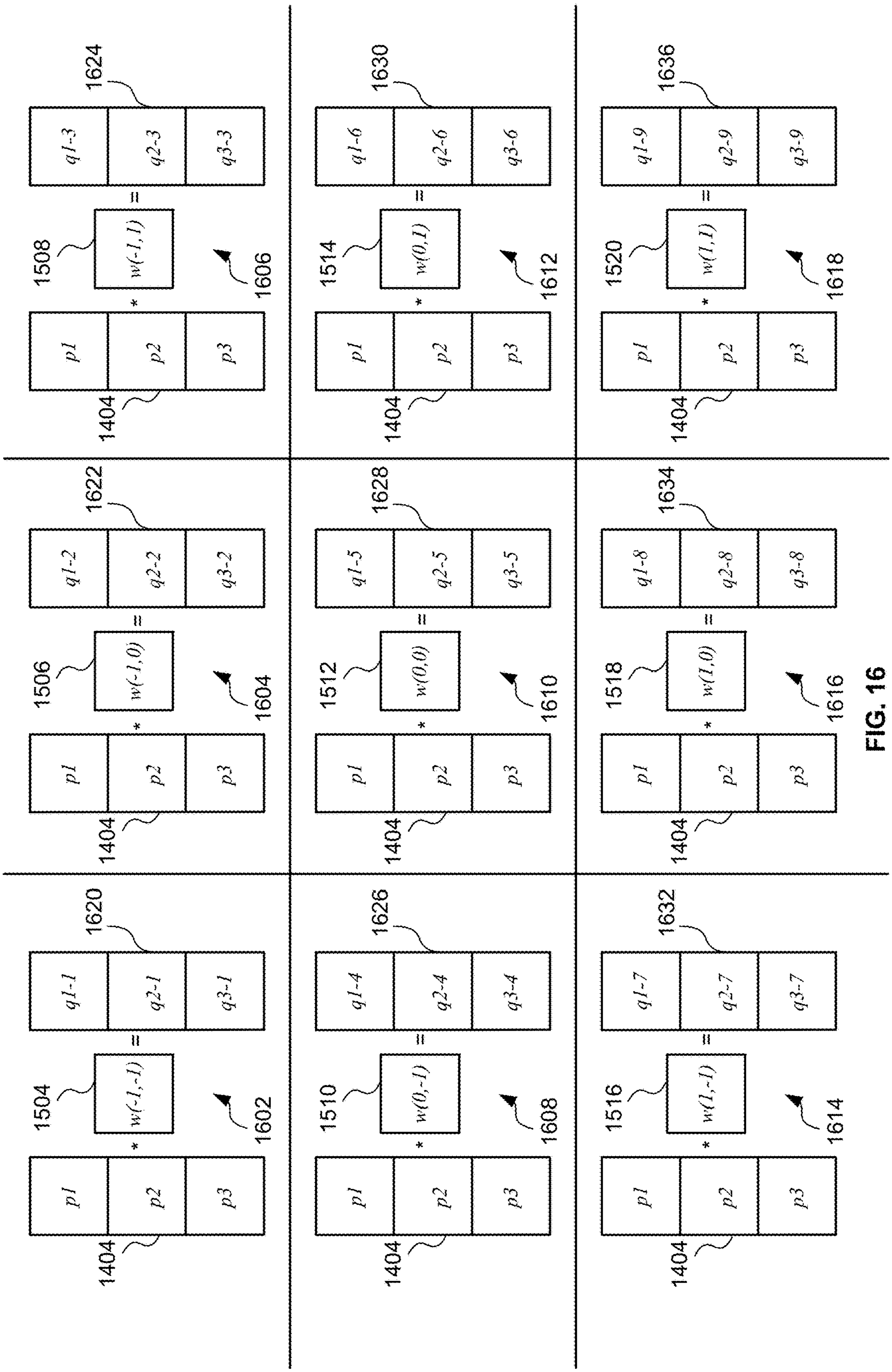
FIG. 16 is a schematic diagram illustrating 1×1 convolutions performed on the input tensor in sparse format of FIG. 14 using the sub-filters of FIG. 15 to implement an example sparse submanifold convolution.

A 1×1 convolution is then performed on the received input tensor in dense format for each kernel position, using the sub-filter(s) that correspond to that position (i.e. using the weights at that kernel position). The term "1×1" convolution is used herein to mean a convolution with a kernel that is of size 1×1 (i.e. $K_H=K_W=1$). For example, if the sparse submanifold convolution is to apply the filter 404 of FIG. 15 to the input tensor in dense format 402 of FIG. 14 then there are nine kernel positions and so, as shown in FIG. 16, nine 1×1 convolutions 1602, 1604, 1606, 1608, 1610, 1612, 1614, 1616, 1618 are performed on the input tensor in sparse format 1404, wherein each 1×1 convolution applies the sub-filter(s) 1504, 1506, 1508, 1510, 1512, 1514, 1516, 1518, 1520 that correspond to a particular position within the kernel. For example, the first 1×1 convolution 1602 applies the first sub-filter 1504 (the sub-filter corresponding to the first kernel position (−1,−1)) to the input tensor in sparse format 1404; the second 1×1 convolution 1604 applies the second sub-filter 1506 (the sub-filter corresponding to the second kernel position (−1,0)) to the input tensor in sparse format 1404; the third 1×1 convolution 1606 applies the third sub-filter 1508 (the sub-filter corresponding to the third kernel position (−1,1)) to the input tensor in sparse format 1404; and so on.

Each 1×1 convolution generates a tensor 1620, 1622, 1624, 1626, 1628, 1630, 1632, 1634, 1636 that comprises partial outputs that can be combined to generate the elements of the output tensor. Specifically, each element of the output tensor can be expressed as the sum of $K_H \times K_W$ dot products, where each dot product is the dot product of the weights at one kernel location and the elements of the input tensor at the corresponding location in a window of the input tensor. Where the corresponding location in a window is not active then that dot-product will be zero and can be ignored. The 1×1 convolution outputs will produce a dot product for each kernel position for each active position, thus any element in the output can be generated by combining the partial outputs generated by the 1×1 convolutions.

For ease of illustration, in the example of FIG. 16 there is only one sparse submanifold convolution filter thus each 1×1 convolution only has one filter. This means that each 1×1 convolution output tensor 1620, 1622, 1624, 1626, 1628, 1630, 1632, 1634, 1636 only has one channel. However, it will be evident to a person of skill in the art that if there are multiple sparse submanifold filters then each 1×1 convolution will have multiple filters which will result in a multi-channel output.

Once the 1×1 convolutions have been performed the method 1300 proceeds to block 1306.

At block 1306, the NNA combines the appropriate partial outputs generated in block 1306 to generate the active elements of the output tensor (i.e. the elements of the output tensor at the active positions).

Figure 4:
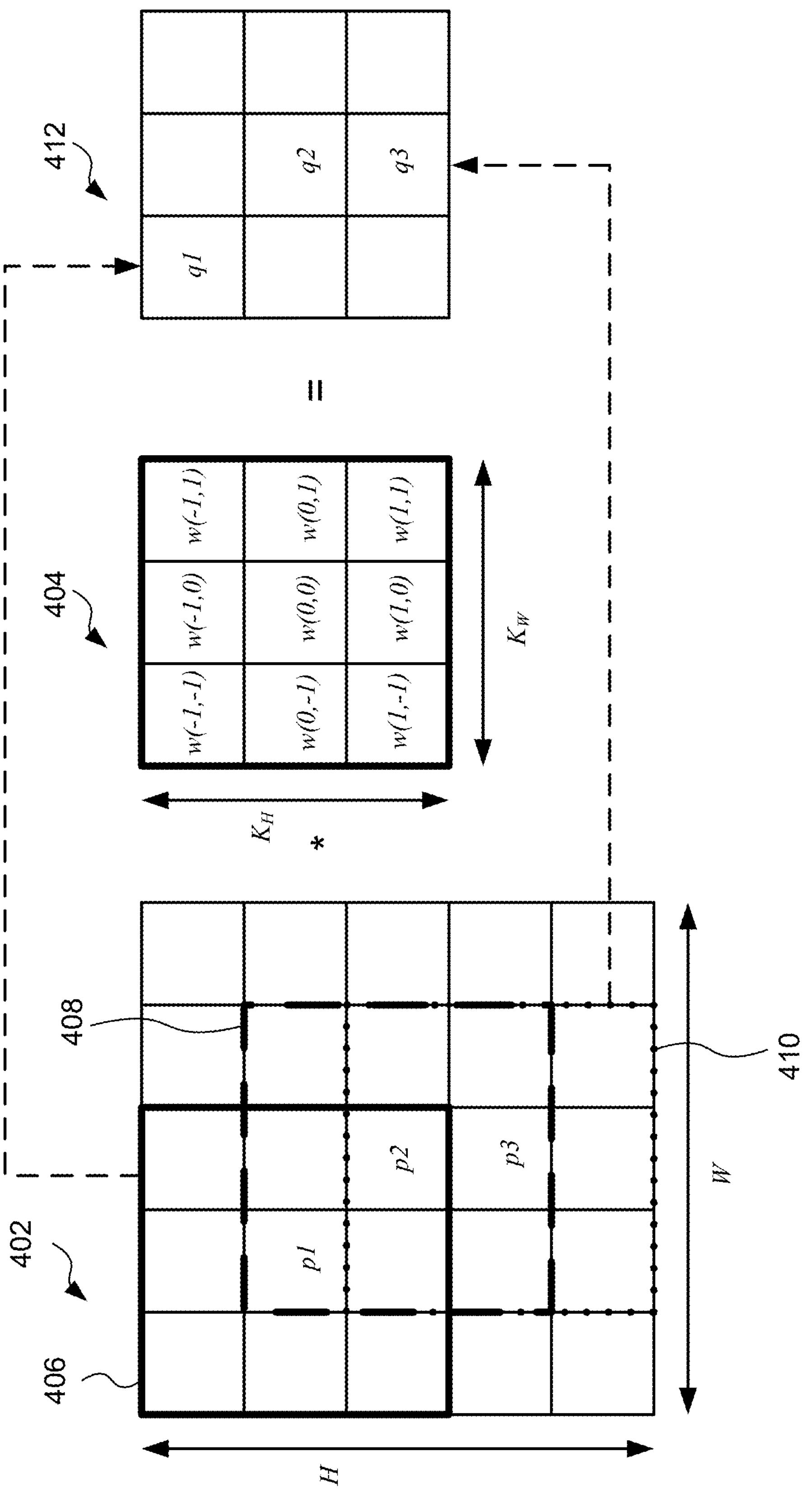
FIG. 4 is a schematic diagram illustrating an example 2D sparse submanifold convolution.

The appropriate partial outputs that are to be combined can be determined from the active positions of the input tensor and the sparse submanifold convolution parameters (e.g. kernel size, strides, dilation). For example, for the example sparse submanifold convolution of FIG. 4 there are only three active positions (q1, q2, q3) of the output tensor. As shown in FIG. 4, the element or value q1 at the first active position in the first (and only) channel of the output tensor 412 is equal to the dot product of the first active window 406 of the input tensor 402 and the filter 404, and thus will be equal to p1*w(0,0)+p2*w(1,1). It can be seen from FIG. 16 that the first output of the fifth 1×1 convolution 1610 q1−5 is equal to p1*w(0,0); and that the second output of the ninth 1×1 convolution 1618 q2−9 is equal to p2*w(1,1). Thus q1 can be generated by combining q1−5 and q2−9.

The element or value q2 at the second active position in the first (and only) channel of the output tensor 412 is equal to the dot product of the second active window 408 of the input tensor 402 and the filter 404, and thus will be equal to p1*w(−1,−1)+p2*w(0,0)+p3*w(1,0). It can be seen from FIG. 16 that the first output of the first 1×1 convolution 1602, q1−1, is equal to p1*w(−1,−1); the second output of the fifth 1×1 convolution 1610, q2−5, is equal to p2+w(0,0); and the third output of the eighth 1×1 convolution 1616, q3−8, is equal to p3*w(1,0). Thus q2 can be generated by combining q1−1, q2−5 and q3−8.

Finally, the element or value q3 at the third active position in the first (and only) channel of the output tensor is equal to the dot product of the third active window 410 of the input tensor 402 and the filter 404, and thus will be equal to p2*w(−1,0)+p3*w(0,0). It can be seen from FIG. 16 that the second output of the second 1×1 convolution 1604, q2−2, is equal to p2*w(−1,0); and that the third output of the fifth 1×1 convolution 1610, q3−5, is equal to p3*w(0,0). Thus q3 can be generated by combining q2−2 and q3−5. This is summarized in Table 3.

TABLE 3

| Active Position of Input Tensor | Kernel Position | 1 × 1 Convolution Partial Output | Offset/ Position of 1 × 1 Convolution | Active Position of Output Tensor |
|---|---|---|---|---|
| p1 | w(−1, −1) | q1 − 1 | 1 | q2 |
| p2 | w(−1, 0) | q2 − 2 | 2 | q3 |
| p1 | w(0, 0) | q1 − 5 | 5 | q1 |
| p2 | w(0, 0) | q2 − 5 | 5 | q2 |
| p3 | w(0, 0) | q3 − 5 | 5 | q3 |
| p3 | w(1, 0) | q3 − 8 | 8 | q2 |
| p2 | w(1, 1) | q2 − 9 | 9 | q1 |

The combining of the appropriate partial outputs generated at block 1304 may be implemented in number of different ways. In some cases, the combining of the appropriate partial outputs may be implemented by the NNA by (i) performing a matrix multiplication between each channel of each 1×1 convolution output tensor and a corresponding scatter matrix to group or align the partial outputs that are relevant to each output element; and (ii) combining, via addition operations, the grouped or aligned partial outputs. As described above, an NNA often comprises hardware, such as a convolution processing unit (i.e., a convolution hardware accelerator), to accelerate convolution operations. Hardware that is efficient at performing convolution operations can also efficiently perform matrix multiplications. Accordingly, the NNA may efficiently perform the matrix multiplications using such hardware. An NNA may also comprise hardware that is configured to accelerate performing per-element operations, such as, but not limited to, addition and multiplication, on an input tensor using another tensor (which may be referred to as an element-wise operations processing unit). Such hardware may be able to efficiently (in terms of processing resources and time) perform the addition operations.

In these cases, there may be a scatter matrix for each 1×1 convolution that identifies the elements of the output tensor of that 1×1 convolution that are relevant to an element of the output tensor and if relevant, identifies which element of the output tensor it is relevant to. The scatter matrix for a 1×1 convolution is configured such that when it is applied to a channel of the output tensor of that 1×1 convolution the result is a matrix that comprises only the relevant partial outputs and an indication of which element of the output tensor each of those partial outputs is relevant to. In some cases, the scatter matrix may comprise only ones and zeros. In some cases, the scatter matrix may be configured such that when it is multiplied with a channel of the output tensor of a 1×1 convolution the result is a matrix that only comprises the partial outputs that are relevant to an element of the output tensor, and each relevant partial output is in a row (or column) of the matrix that corresponds to the corresponding element of the output tensor.

Where, as shown in FIG. 16, each channel of the output tensor of a 1×1 convolution comprises a row for each active position of the input tensor, and each row comprises the partial output(s) that relate to the corresponding active position, each scatter matrix may comprise a column for each active position of the input tensor and a row for each active position of the output tensor. Then, if a partial output in row A of a 1×1 convolution output tensor is relevant to active position B of the final output tensor, then the scatter matrix may comprise a '1' in row B, column A. For example, if the partial output in the first row of a 1×1 convolution output tensor is relevant to the $2^{nd}$ active element of the final output tensor then a '1' may be placed at position (2,0) of the scatter matrix, wherein a position in the scatter matrix is identified by (row, column) and the rows and columns are numbered starting from 0. Where the number of active positions in the input tensor is the same as the number of active positions in the output tensor (e.g. due to padding and strides of 1) each scatter matrix may be a N×N matrix where N is the number active positions in the input tensor. However, where the number of active positions in the tensor is greater than the number of active positions in the output tensor then each scatter matrix may be an M×N matrix where M<N.

Figure 17:
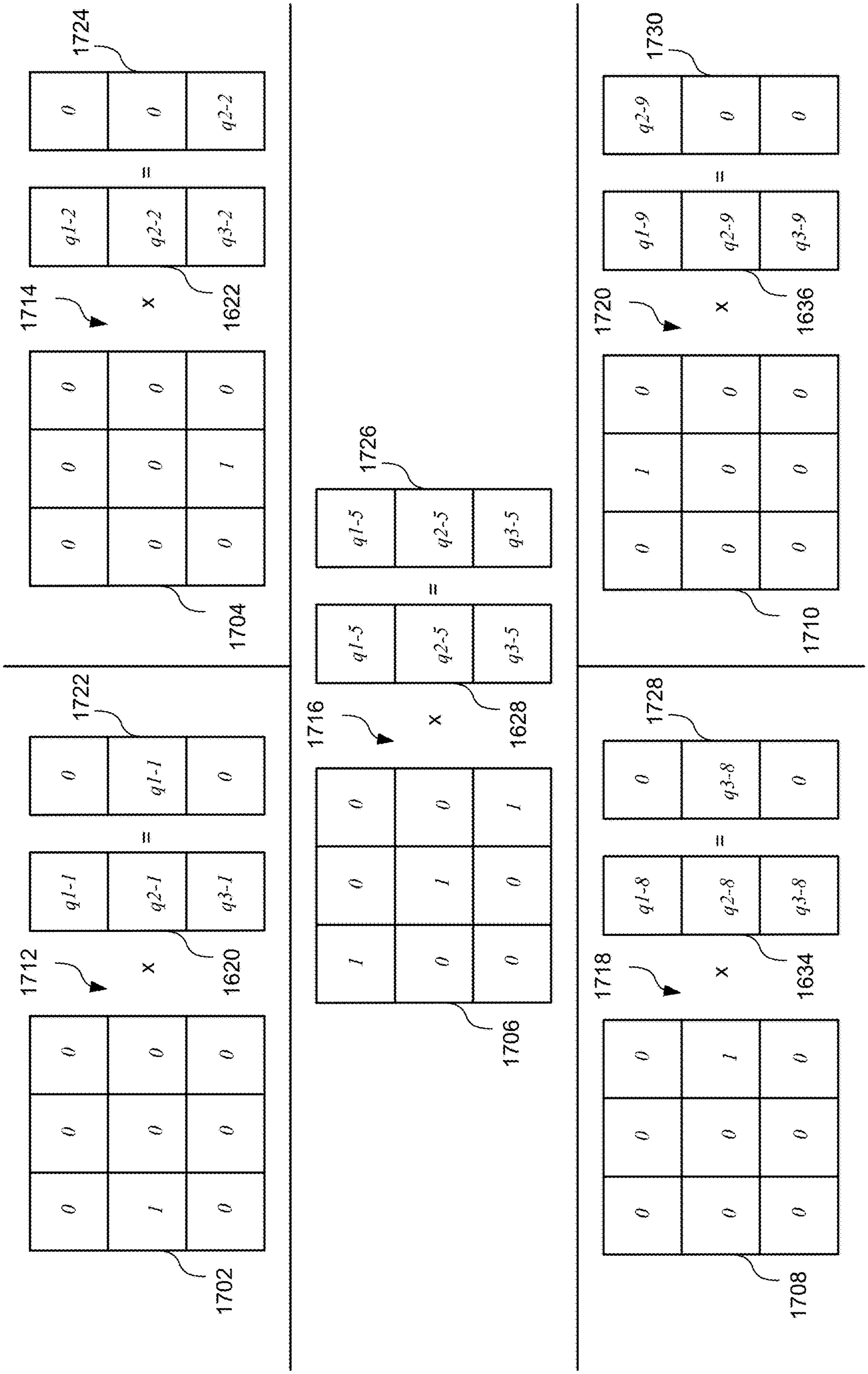
FIG. 17 is a schematic diagram illustrating matrix multiplications between the 1×1 convolution outputs of FIG. 16 and corresponding scatter matrices to implement an example sparse submanifold convolution.

Reference is now made to FIG. 17 which illustrates (i) example scatter matrices 1702, 1704, 1706, 1708, 1710 for the 1×1 convolutions of FIG. 16 to implement the sparse submanifold convolution of FIG. 4 and (ii) the matrix multiplications 1712, 1714, 1716, 1718, 1720 of those scatter matrices 1702, 1704, 1706, 1708, 1710 with the corresponding 1×1 convolution outputs 1620, 1622, 1628, 1634, 1636. As shown in FIG. 4, in this example sparse submanifold convolution there are three active positions (p1, p2, p3) in the input tensor and three active positions (q1, q2, q3) in the final output tensor, thus each scatter matrix 1702, 1704, 1706, 1708, 1710 comprises 3 rows and 3 columns. If a partial output in row A of a 1×1 convolution output is relevant to active position B in the final output tensor then the scatter matrix comprises a '1' in row B, column A; otherwise the scatter matrix comprises a '0' in row B, column A.

As described above with respect to Table 3, the first partial output (q1−1) of the first 1×1 convolution (i.e. the 1×1 convolution related to kernel position (−1,−1)) is relevant to the second active element (q2) of the final output tensor. Accordingly, the scatter matrix 1702 for the first 1×1 convolution has a '1' at position (1, 0) (i.e. second row, first column). None of the other partial outputs of the first 1×1 convolution are relevant to an active element of the final output tensor, so the remaining elements of the scatter matrix 1702 are set to '0'. Multiplying this scatter matrix 1702 with the output of the first 1×1 convolution 1620 results in a matrix 1722 with the first partial output (q1−1) in the second row. All other elements of the output matrix 1722 are zero. This indicates that the first partial output is relevant to an active position of the final output tensor, and specifically, to the second active position of the final output tensor.

Similarly, since the second partial output (q2−2) of the second 1×1 convolution (i.e. the 1×1 convolution related to kernel position (−1,0)) is relevant to the third active element (q3) of the final output tensor, the scatter matrix 1704 for the second 1×1 convolution has a '1' at position (2, 1) (i.e. the third row, second column). Multiplying this scatter matrix 1704 with the output of the second 1×1 convolution 1622 results in a matrix 1724 with the second partial output (q2−2) in the third row. All other elements of the output matrix 1724 are zero. This indicates that the second partial output is relevant to an active position of the final output tensor, and specifically, to the third active position of the final output tensor.

Since the first, second and third partial outputs of the fifth 1×1 convolution (i.e. the 1×1 convolution related to kernel position (0,0)) are relevant to the first, second and third active elements (q1, q2, q3) of the final output tensor respectively, the scatter matrix 1706 for the fifth 1×1 convolution has a '1' at positions (0, 0) (i.e. the first row, first column), (1, 1) (i.e. the second row, second column), and (2,2) (i.e. third row, third column). Multiplying this scatter matrix 1706 with the output of the fifth 1×1 convolution 1628 results in a matrix 1726 with the first, second, and third partial outputs in the first, second and third rows respectively. This indicates that the first, second and third partial outputs are relevant to an active position of the final output tensor, and specifically to the first, second and third active positions respectively.

Since the third partial output (q3−8) of the eighth 1×1 convolution (i.e. the 1×1 convolution related to kernel position (1,0)) is relevant to the second active element (q2) of the final output tensor, the scatter matrix 1708 for the eighth 1×1 convolution has a '1' at position (1, 2) (i.e. the second row, third column). Multiplying this scatter matrix 1708 with the output of the eighth 1×1 convolution 1634 results in a matrix 1728 with the third partial output (q3−8) in the second row. All other elements of the output matrix 1728 are zero. This indicates that the third partial output is relevant to an active position of the final output tensor, and specifically, to the second active position of the final output tensor.

Finally, since the second partial output (q2−9) of the ninth 1×1 convolution (i.e. the 1×1 convolution related to kernel position (1,1)) is relevant to the first active element (q1) of the final output tensor, the scatter matrix 1710 for the ninth 1×1 convolution has a '1' at position (0, 1) (i.e. the first row, second column). Multiplying this scatter matrix 1710 with the output of the ninth 1×1 convolution 1636 results in a matrix 1730 with the second partial output (q2−9) in the first row. All other elements of the output matrix 1730 are zero. This indicates that the second partial output is relevant to an active position of the final output tensor, and specifically, to the first active position of the final output tensor.

None of the other 1×1 convolutions in this example produce partial outputs that are relevant to an active position of the final output tensor thus the scatter matrices for each of these 1×1 convolutions (not shown) are all zeros.

It can be seen that multiplying the scatter matrices and the 1×1 convolution outputs identifies the relevant partial outputs and groups the partial outputs that are relevant to each output element together—i.e., all of the partial elements that are relevant to the $i^{th}$ output element are placed in the $i^{th}$ row of the output of the matrix multiplication.

The scatter matrices may be generated offline (e.g. by a component external to the NNA) such as a CPU or a GPU and provided to the NNA as an input. For example, a CPU or a GPU may be configured to identify from the input tensor in dense format the active locations (e.g. using a nonzero PyTorch® function). The CPU or GPU may then be configured to generate a HashTable from the identified active locations and the sparse submanifold convolution parameters (e.g. kernel size, strides, dilation) which stores information that indicates which active position of the input tensor needs to be multiplied with which kernel position or offset and which active position of the output tensor it is relevant to. An example HashMap is shown below in Table 4. The example HashMap is similar to what is shown in Table 3. A HashMap can be efficiently generated on GPU in a parallel manner by using well-known data structures in literature.

TABLE 4

| |
|---|
| p1, w(−1, −1), q2 |
| p2, w(−1, 0), q3 |
| p1, w(0, 0), q1 |
| p2, w(0, 0), q2 |
| p3, w(0, 0), q3 |
| p3, w(1, 0), q2 |
| p2, w(1, 1), q1 |

Figure 18:
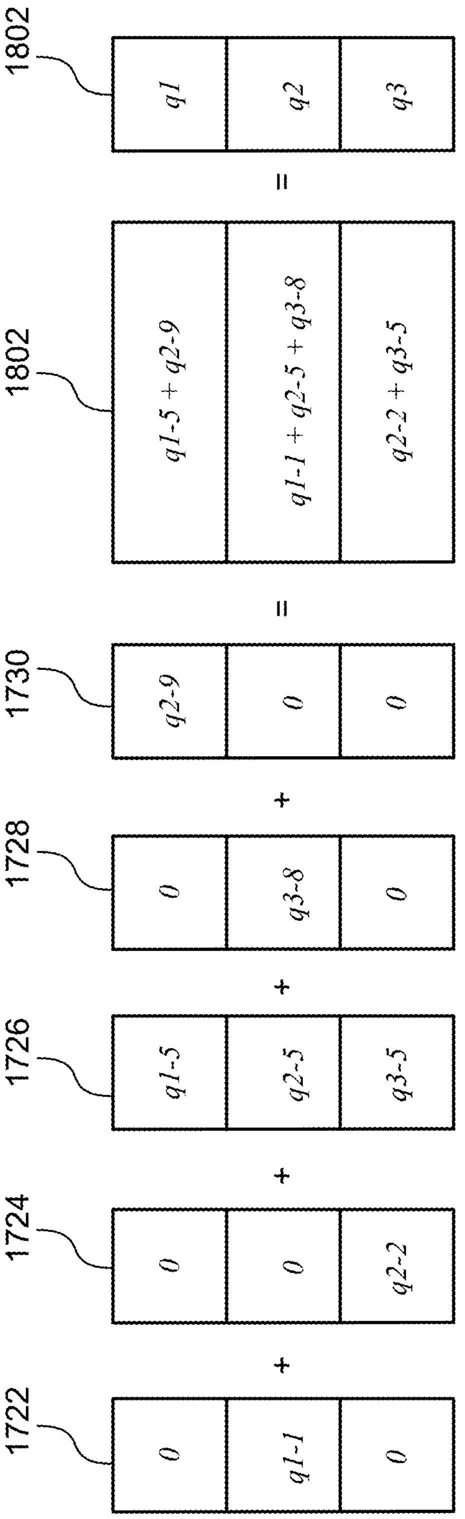
FIG. 18 is a schematic diagram illustrating combining the matrix multiplication outputs of FIG. 17 to implement an example sparse submanifold convolution.

In this example, once the matrix multiplications between the scatter matrices and the corresponding 1×1 convolution outputs have been completed, the partial outputs that have been identified as being relevant to each of the output elements are combined to generate the final output elements. This may be implemented through one or more tensor addition operations. In a tensor addition operation each element of a first tensor is added to the corresponding element of a second tensor. For example, as shown in FIG. 18, the active elements (q1, q2, q3) of the output tensor 1802 are generated by adding the matrices 1722, 1724, 1726, 1728, 1730 generated by the matrix multiplications 1712, 1714, 1716, 1718, 1720 respectively.

In the example shown in FIGS. 14-18 the input tensor and the output tensor have only one channel. However, it will be evident to a person of skill in the art that the same techniques can be applied to sparse submanifold convolutions with an input tensor and/or an output tensor with multiple channels. For example, where the input tensor has multiple channels (i.e. $C_{in}>1$), instead of each 1×1 convolution simply computing the product of the input element x with the corresponding weight w, each 1×1 convolution computes the dot product of the input elements at the same location of each channel and the corresponding weights. Where the output tensor has multiple channels (i.e. $C_{out}>1$), meaning that the sparse submanifold convolution has multiple filters then each 1×1 convolution will generate a channel per filter. Then, in the matrix multiplication stage each scatter matrix is multiplied with each channel of the corresponding 1×1 convolution output to produce a 3D tensor, and then the tensor additions are performed on a per channel basis.

Figure 19:
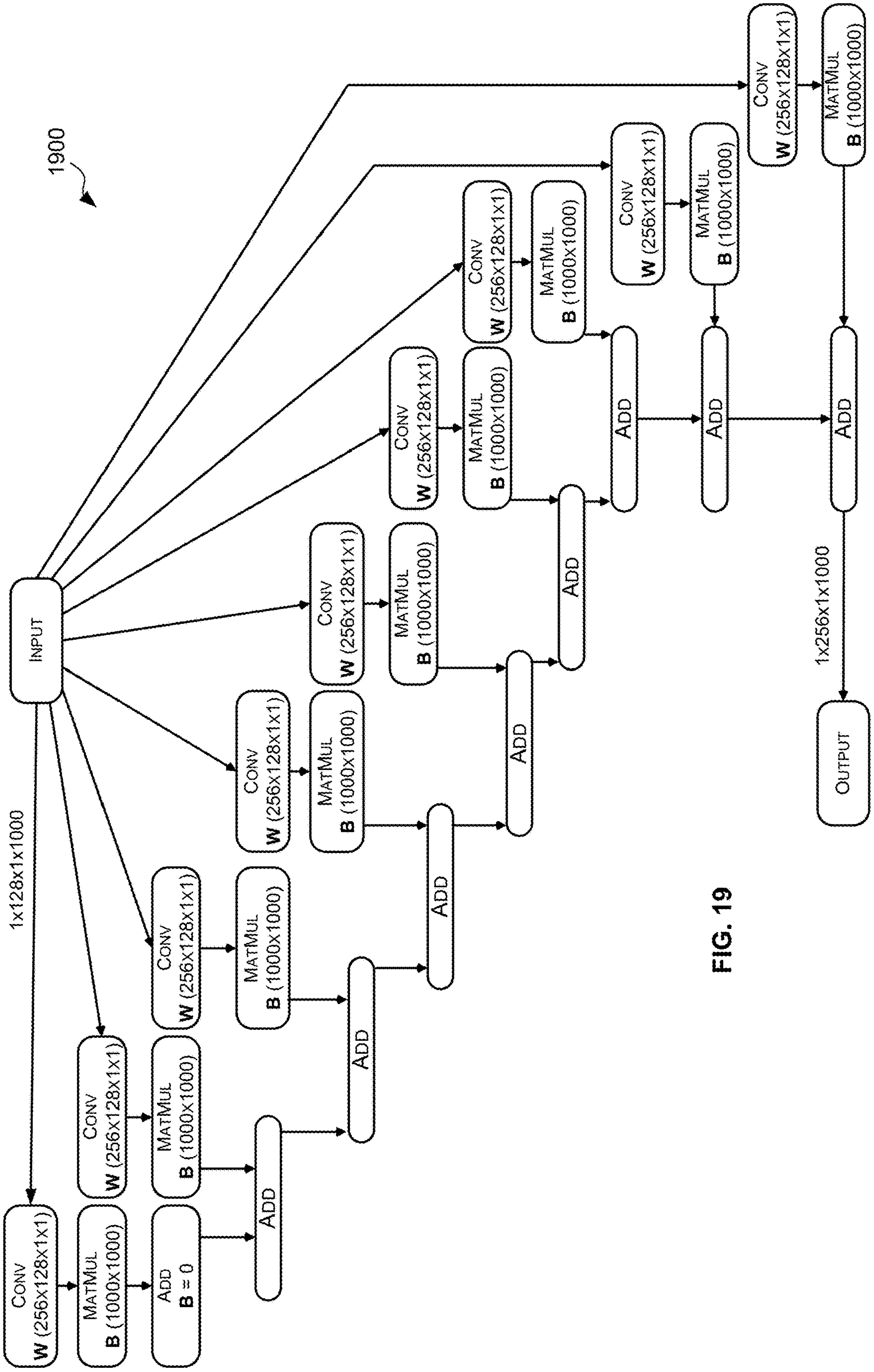
FIG. 19 is an example inference graph to implement the method of FIG. 13 for an example sparse submanifold convolution in accordance with a first example.

Reference is now made to FIG. 19 which illustrates an example inference graph 1900 for a sparse submanifold 2D convolution with 256 filters with 3×3 kernels performed on an input tensor with 1000 active positions and 128 channels in accordance with the method described above (i.e., 1×1 convolutions, matrix multiplications, and additions), wherein the stride is 1 in the height and width dimensions. The input tensor in sparse format is thus a [1, 128, 1, 1000] tensor of the form [batch, channel, height, width]—i.e., the input tensor in sparse format has, for each active position of the input tensor, an element for each channel.

Since the kernel is 3×3 there are nine kernel positions, thus nine 1×1 convolutions are performed on the input tensor in sparse format-one for each kernel position. Since there are 256 filters, each 1×1 convolution receives a [256, 128, 1, 1] weight tensor of the form [output channels, input channels, kernel height, kernel width]. In other words, the weight tensor comprises 256 filters of size 128×1×1. The output of each 1×1 convolution is thus a [1, 256, 1, 1000] tensor of partial outputs—i.e. the output tensor for each 1×1 convolution has 256 channels with 1000 partial outputs per channel.

A matrix multiplication is performed on the output of each 1×1 convolution in which a corresponding scatter matrix is multiplied with each channel of the 1×1 convolution output. In this example the number of active positions (1000) in the input tensor is the same as the number of active positions (1000) in the output tensor, thus each scatter matrix is a 1000×1000 matrix. The result of each matrix multiplication operation is thus a [1, 256, 1, 1000] tensor which comprises the partial outputs of the corresponding 1×1 convolution that are relevant to an active output position.

The outputs of the matrix multiplications are then combined through a series of tensor addition or accumulation operations. Each addition or accumulation operation adds the elements at corresponding positions. In the example shown in FIG. 19 the first addition operation combines the first two matrix multiplication outputs and then each other addition operation combines an addition operation output and a matrix multiplication output. The final output tensor in sparse format is thus a [1, 256, 1, 1000] tensor.

The efficiency of implementing operations on an NNA may be measured by the number of multiply accumulate (MAC) operations to implement the operation, wherein a MAC operation is an operation that computes the product of two numbers and adds the product to another number. The number of MACs to implement a sparse submanifold convolution in this manner (i.e., via 1×1 convolutions, matrix multiplication, addition operations) can be represented by equation (1) wherein K is the size of the kernel (i.e. $K=K_H \times K_W$), N is the number of active positions in the input tensor, $C_{in}$ is the number of channels in the input tensor, and $C_{out}$ is the number of channels in the output tensor (which is equal to the number of filters).

$$MACs = K \times N \times C_{in} \times C_{out} + K \times N^2 \times C_{out} \quad (1)$$

In other cases, instead of combining the relevant partial outputs generated by the 1×1 convolutions in block 1304 via matrix multiplications with scatter matrices and addition operations, where an NNA has a hardware component, such as a processor, that can selectively combine elements of one or more received tensors, then the combining of the relevant partial outputs may be performed by that hardware component. In these cases the hardware component may be configured to receive the outputs of the 1×1 convolutions and information identifying which partial outputs are relevant to each active element of the final output tensor. The hardware component (e.g. processor) may then be configured to retrieve the partial outputs relevant to each output element and combine them (e.g. via an addition operation) to generate that output element.

For example, if the 1×1 convolutions shown in FIG. 16 are performed in block 1304, the hardware component (e.g. processor) of the NNA may be provided with information that indicates partial outputs q1–5, and q2–9 are relevant to the first active output element q1; partial outputs q1–1, q2–5 and q3–8 are relevant to the second active output element q2; and partial outputs q2–2 and q3–5 are relevant to the third active output element q3. The hardware component may then retrieve or select the identified partial outputs and combine them in the identified manner. Similar to how the scatter matrices may be generated offline (i.e., by a component external to the NNA) the information that is provided to the hardware component (e.g. processor) that identifies which partial outputs are relevant to each output element may be generated offline from, for example, a HashTable.

Figure 20:
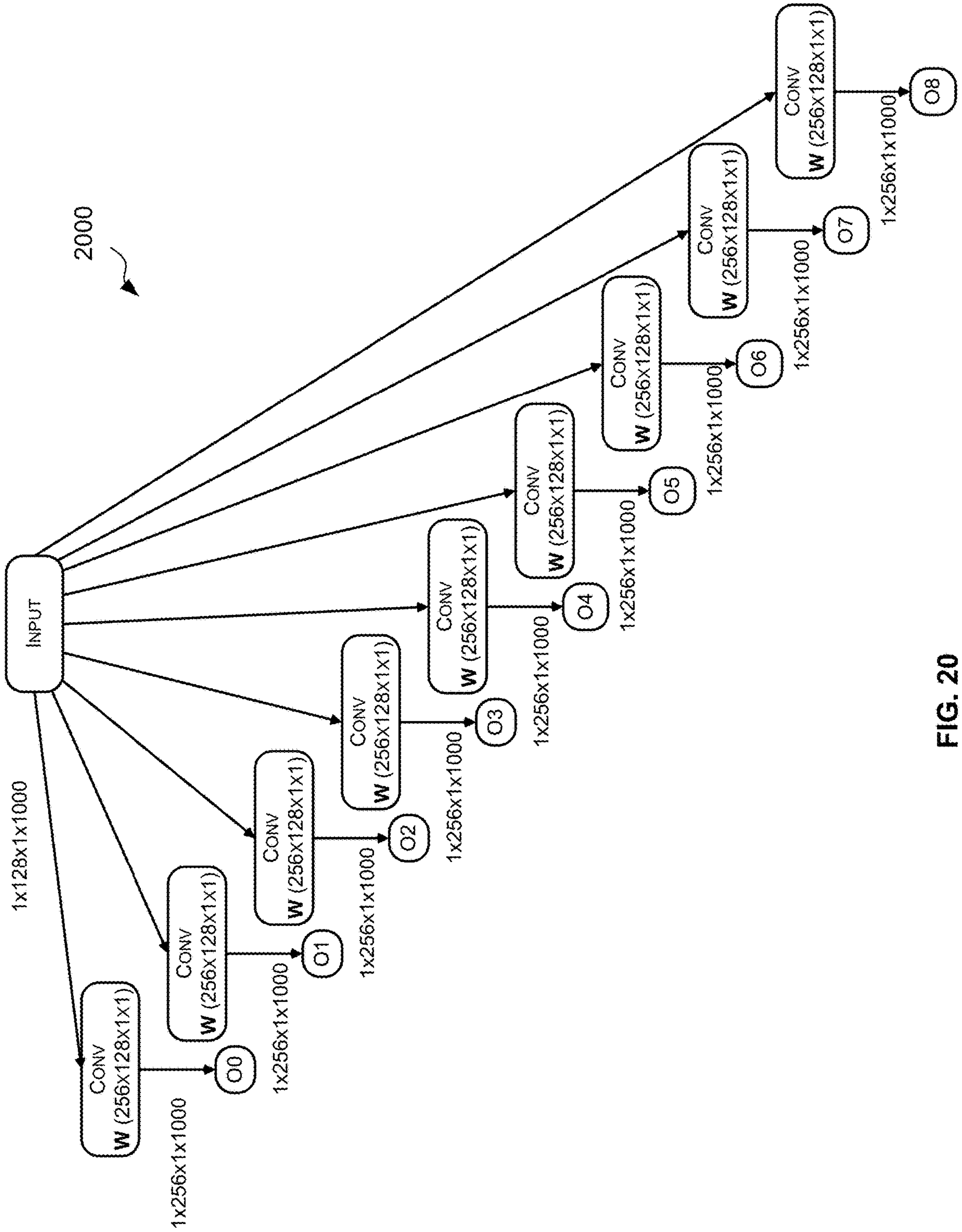
FIG. 20 is an example inference graph to implement the method of FIG. 13 for an example sparse submanifold convolution in accordance with a second example.

Reference is now made to FIG. 20 which illustrates an example inference graph 2000 for a sparse submanifold 2D convolution with 256 filters with 3×3 kernels performed on an input tensor with 1000 active positions and 128 channels in accordance with the second method described above (i.e., 1×1 convolutions, scatter-add via hardware component of NNA), wherein the stride is 1 in the height and width dimensions. The input tensor in sparse format is thus a [1, 128, 1, 1000] tensor of the form [batch, channel, height, width]—i.e., the input tensor in sparse format has, for each active position of the input tensor, an element for each channel.

Like the inference graph of FIG. 19, since the kernel is 3×3 there are nine kernel positions, thus nine 1×1 convolutions are performed on the input tensor in sparse format-one for each kernel position. Since there are 256 filters, each 1×1 convolution receives a [256, 128, 1, 1] weight tensor of the form [output channels, input channels, kernel height, kernel width]. In other words, the weight tensor comprises 256 filters of size 128×1×1. The output of each 1×1 convolution is thus a [1, 256, 1, 1000] tensor of partial outputs—i.e. the output tensor for each 1×1 convolution has 256 channels with 1000 partial outputs per channel.

However, instead of performing matrix multiplications and additions via hardware accelerators of the NNA, the outputs of the 1×1 convolutions are provided to a hardware component, such as a processor, of the NNA that can selectively combine elements of the 1×1 convolution outputs, along with information identifying the partial outputs relevant to each active element of the output tensor.

The maximum number of MACs to implement a sparse submanifold convolution in this manner (i.e., via 1×1 convolutions+scatter-add operations) can be represented by equation (2) wherein K is the size of the kernel (i.e. $K=K_H \times K_W$), N is the number of active positions in the input tensor, $C_{in}$ is the number of channels in the input tensor, and $C_{out}$ is the number of channels in the output tensor (which is equal to the number of filters). $K \times N \times C_{in} \times C_{out}$ MAC operations are used to perform the 1×1 convolutions, and $K \times N \times C_{out}$ MAC operations are used to perform the scatter-add.

$$MACs = K \times N \times C_{in} \times C_{out} + K \times N \times C_{out} \tag{2}$$

It will be evident to a person of skill in the art that references to rows and columns of tensors and matrices herein are exemplary only and that rows and columns may be switched as appropriate. It can be seen, from equations (1) and (2), that performing scatter-add operations may, in some cases, be more efficient than combining the relevant partial outputs via matrix multiplications and additions.

While it is described above that block 1306 of the method 1300 of FIG. 13 is implemented by the NNA, in some cases it may be more efficient to perform all or a portion of the combining of the partial outputs generated by the 1×1 convolutions on a GPU or CPU. For example, in some cases, one or more of the matrix multiplications may be performed on a CPU or a GPU and/or one or more of the addition operations may be performed on a CPU or a GPU. Similarly, in some cases one or more of the scatter-add operations may be performed on a CPU or a GPU. Whether or not it is more efficient to implement all or part of block 1306 on a CPU or a GPU may depend on the configuration of the NNA.

Test Results

Table 5 shows the results of implementing a 3×3 sparse submanifold convolution on an input tensor with 1000 active positions using the first NNA method described above (1×1 convolutions, matrix multiplications, additions), the second NNA method described above (1×1 convolutions, scatter-add via processor of NNA), and as a standard convolution on a 256×256 input tensor with 1.25% density (i.e., 1000 active positions) when run on the Applicant's PowerVR 3NX NNA running at 800 MHz and 20.48 GB/s. In these tests the MatMuls of the first NNA method were implemented on a CPU and thus the time taken to implement the MatMuls were not included in the timing numbers in Table 5; and the scatter-add operations performed by the processor of the NNA were not included in the timing numbers in Table 5.

TABLE 5

| | Inferences per second | Latency (ms) |
|---|---|---|
| NNA Method 1 | 430.0 | 2.32 |
| NNA Method 2 | 637.7 | 1.56 |
| Standard 2D Convolution | 74.9 | 13.35 |

The number of MACs to implement a standard 2D convolution is expressed by equation (3). This can be written in terms of N as shown in equation (4), where the denseRatio is as set out in equation (5).

$$MACs = K \times H_{out} \times W_{out} \times C_{in} \times C_{out} \tag{3}$$

$$MACs = \frac{K \times N \times C_{in} \times C_{out}}{denseRatio} \tag{4}$$

$$denseRatio = \frac{N}{H_{out} \times W_{out}} \tag{5}$$

It can be seen from Table 5 that a sparse submanifold convolution can be implemented much more efficiently using an NNA via either of the described methods which take advantage of the sparsity of the input and the hardware components of the NNA, compared to implementing the sparse submanifold convolution as a standard convolution on the NNA.

Table 6 shows the results of implementing a 3×3 sparse submanifold convolution on an input tensor with 1000 active positions using the second NNA method described above (1×1 convolutions, scatter-add via processor of NNA), and as a standard convolution on a 256×256 input tensor with 1.25% density (i.e., 1000 active positions) when run on the Applicant's PowerVR 4NX MC1 NNA running at 1.5 GHz and 38.4 GB/s.

TABLE 6

| | Inferences per second | Latency (ms) |
|---|---|---|
| NNA Method 2 | 1261.58 | 0.79 |
| Standard 2D Convolution | 140.39 | 7.12 |

Tables 5 and 6 show that a sparse submanifold convolution can be implemented significantly faster via an NNA using the described method(s), which take advantage of the sparsity of the input tensor, than implementing the sparse submanifold convolution via an NNA as a standard 2D convolution, which does not take advantage of the sparsity of the input tensor.

Combination of GPU and NNA Implementations of Sparse Submanifold Convolution

A sequence of sparse submanifold convolutions may be implemented using a combination of the GPU and NNA implementations described above. Specifically, the first sparse submanifold convolution in the sequence may be implemented in accordance with the GPU method described above with respect to FIG. 5, without the final indexed fold operation (so that the output is just the active points in the output tensor—in other words the output tensor is in a sparse format). This unfolded output is then provided as the input to the NNA method described above with respect to FIG. 13 to perform the next sparse submanifold convolution in the sequence. For each subsequent sparse submanifold convolution in the sequence, the NNA method may be used. Then, after the last sparse submanifold convolution in the sequence is performed, an indexed unfold operation may be performed to generate a final output tensor in dense format.

A method of implementing a sequence of two sparse submanifold convolutions may comprise: receiving, at a graphics processing unit, an input tensor, in a dense format, to a first sparse submanifold convolution of the sequence; identifying, at the graphics processing unit, active positions of the input tensor; performing, at the graphics processing unit, an indexed unfold operation on the input tensor based on the identified active positions to generate an input matrix comprising elements of the input tensor in each active window of the input tensor; performing, at the graphics processing unit, a matrix multiplication between a weight matrix and the input matrix to generate an output matrix that comprises elements of an output tensor of the first sparse submanifold convolution based on the active windows; providing the output matrix to a neural network accelerator as an input tensor, in a sparse format, to a second sparse submanifold convolution of the sequence; performing, at the neural network accelerator, for each position of a kernel of the second sparse submanifold convolution, a 1×1 convolution between the received input matrix and weights of filters of the sparse submanifold convolution at that kernel position to generate a plurality of partial outputs; and combining appropriate partial outputs of the plurality of partial outputs to generate an output tensor, in sparse format, of the second sparse submanifold convolution. Where the GPU comprises a convolution accelerator such that the GPU may be considered to be an NNA, or may be considered to comprise an NNA, the steps of the above method identified as being performed by the NNA may be performed by the convolution accelerator of the GPU.

It has been described above how indexed unfold and fold operations can be used to implement a sparse submanifold convolution on a GPU. The inventors have determined that similar indexed unfold and fold operations can be used to more efficiently implement standard convolutions, standard deconvolutions and sparse submanifold deconvolutions with sparse inputs on a GPU. Methods for implementing these convolutions and deconvolutions using similar indexed unfold and fold operations will now be described. Each of these methods are particularly adapted to take into consideration the internal functioning of a GPU. In particular, the described methods are designed to take advantage of the parallel architecture (e.g. SIMD architecture) of GPUs.

GPU Implementation of Standard Convolution Operation

Figure 3:
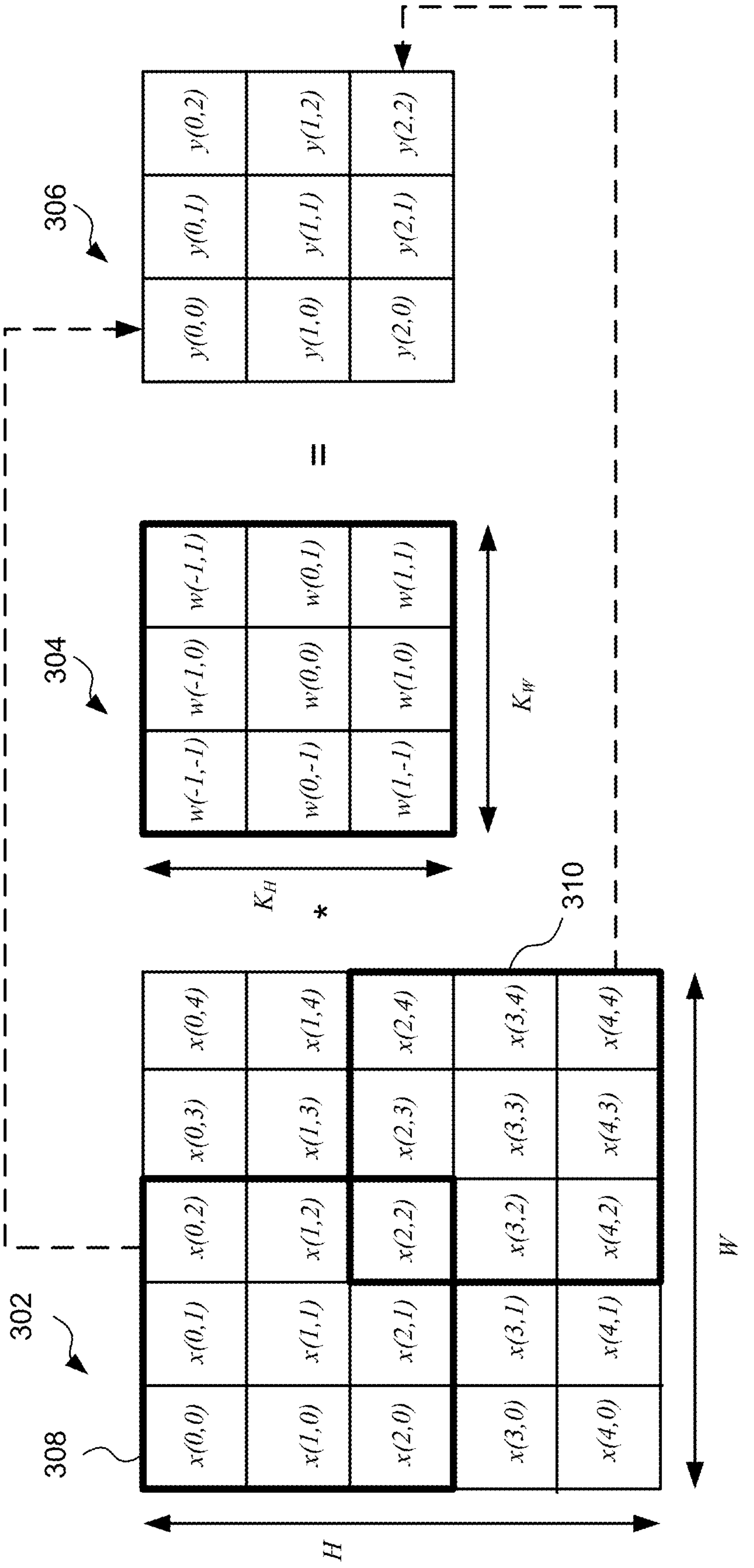
FIG. 3 is a schematic diagram illustrating an example 2D convolution.

As described above, with respect to FIG. 3, in a standard 2D convolution, each filter has a dimension $K_H \times K_W \times C_{in}$ (i.e., each filter may comprise a set of $K_H \times K_W \times C_{in}$ weights w) wherein $C_{in}$ is the number of channels of the input tensor such that each filter generates a channel of the output. Each filter channel may be described as a kernel of size $K_H \times K_W$. Accordingly, depending on the number of input channels, a filter may comprise one or more kernels. Each filter is slid across the input tensor in steps $s_H$ and $s_W$ in the H and W dimensions respectively, which are referred to as the strides of the convolution. A 3D convolution is the same as a 2D convolution except there is an extra dimension.

The inventors have determined that standard 2D and 3D convolutions with a sparse input can be performed more efficiently on a GPU by using similar indexed unfold and fold operations as those described above with respect to the method 500 of FIG. 5 to implement a sparse submanifold convolution on a GPU.

Figure 21:
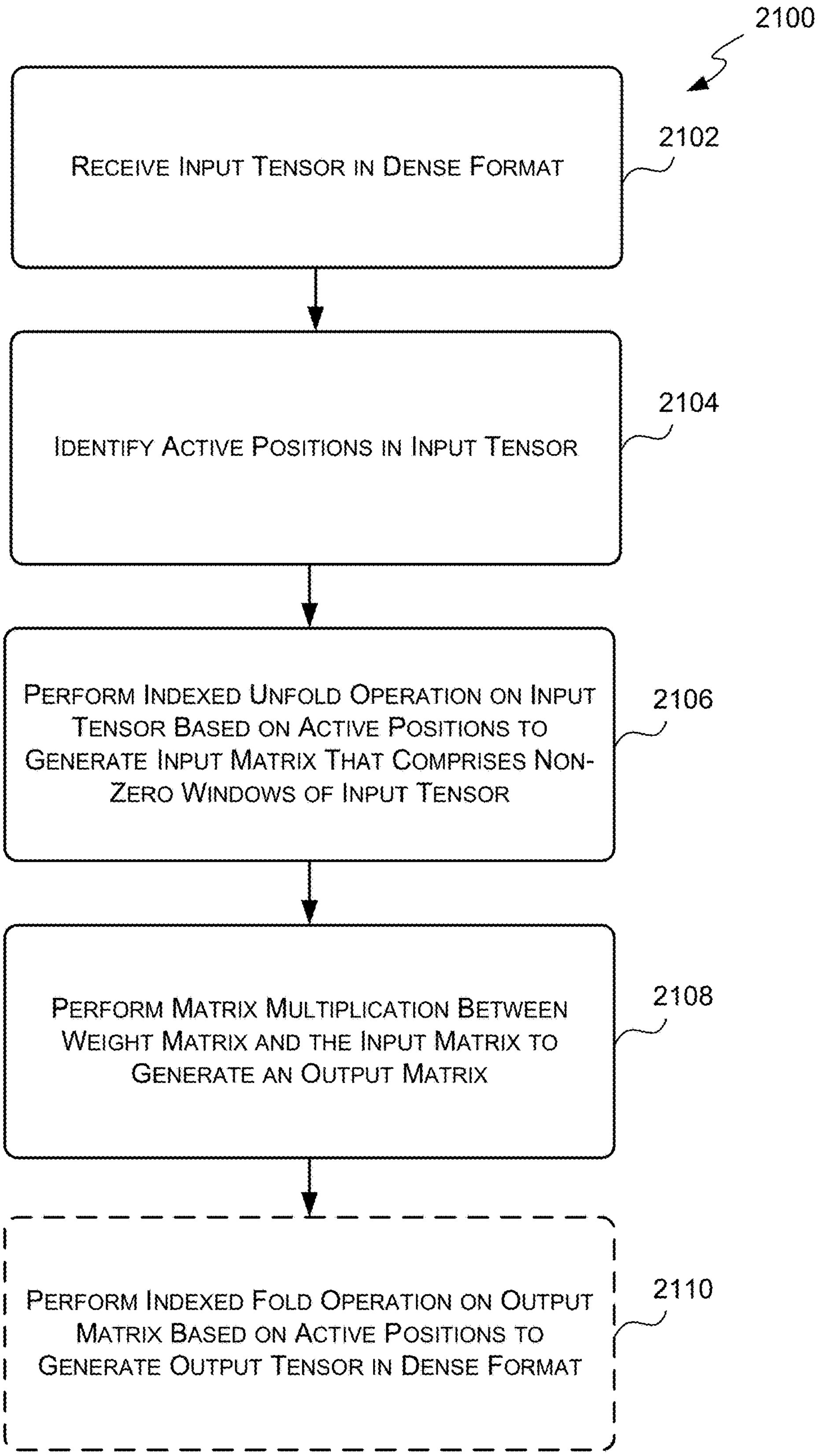
FIG. 21 is a flow diagram of an example method to implement a standard convolution using a GPU.

Reference is now made to FIG. 21 which illustrates an example method 2100 of implementing a standard convolution using a GPU. The method 2100 begins at block 2102 where an input tensor in dense format is received at the GPU. As described above, an input tensor in dense format, which may also be referred to as a densified input tensor, comprises each element of the complete tensor, regardless of whether the element is at an active position. In contrast, an input tensor in sparse format only comprises the elements of the input tensor in dense format that are at an active position or location. Once the input tensor in dense format has been received, the method 2100 proceeds to block 2104.

At block 2104, the GPU identifies the active locations or positions in the received input tensor. As described above, an active location of an input tensor is a height and width position or location in which at least one channel of the input tensor has a non-zero value. Each active location or position may be identified by a set or pair of indices-a height or row index, and a width or column index. The active locations or positions in the received input tensor may be identified using any suitable technique, such as, but not limited to, those described above with respect to block 504 of the method 500 of FIG. 5.

In some cases, the output of this block 2104 may be a list of the height and width (or column and row) co-ordinates or indices of the active positions. As described above, FIG. 6 shows an active position list 608 for an example 6×6 input tensor 602 with two active positions 604, 606. Specifically, as shown in FIG. 6, the active position list 608 comprises an entry for the first active position 604 that identifies its location as a height (row) of 1 and a width (column) of 1, and an entry for the second active position 606 that identifies its location as a height (row) of 3 and a width (column) of 3.

Once the active locations or positions in the received input tensor have been identified, the method 2100 proceeds to block 2106.

At block 2106, the GPU performs an indexed unfold operation (which may also be referred to as a sparse convolution unfold operation) on the received input tensor based on the active locations or positions identified in block 2104 to generate an input matrix that comprises the elements of the non-zero windows of the input tensor. A non-zero window is a window of the input tensor used in the standard convolution that comprises at least one non-zero element. As described above with respect to FIG. 7, in a standard unfold operation (e.g. im2col operation), an input matrix is generated from the input tensor which comprises a column for each window of the input tensor used in the standard convolution, wherein each column comprises the elements of the input tensor in the corresponding window. As described above, each window of the input tensor generates one output element per channel of the output tensor. Accordingly, if there are P elements in each channel of the output tensor (meaning there are P windows of the input tensor), there will be P columns in an input matrix generated by a standard unfold operation.

However, where a window comprises all zeros (which may be referred to a zero window) it is not necessary to compute the output based on that window. Instead a zero can be placed at the corresponding output position. Accordingly, only the outputs corresponding to non-zero windows may be computed.

Figure 22:
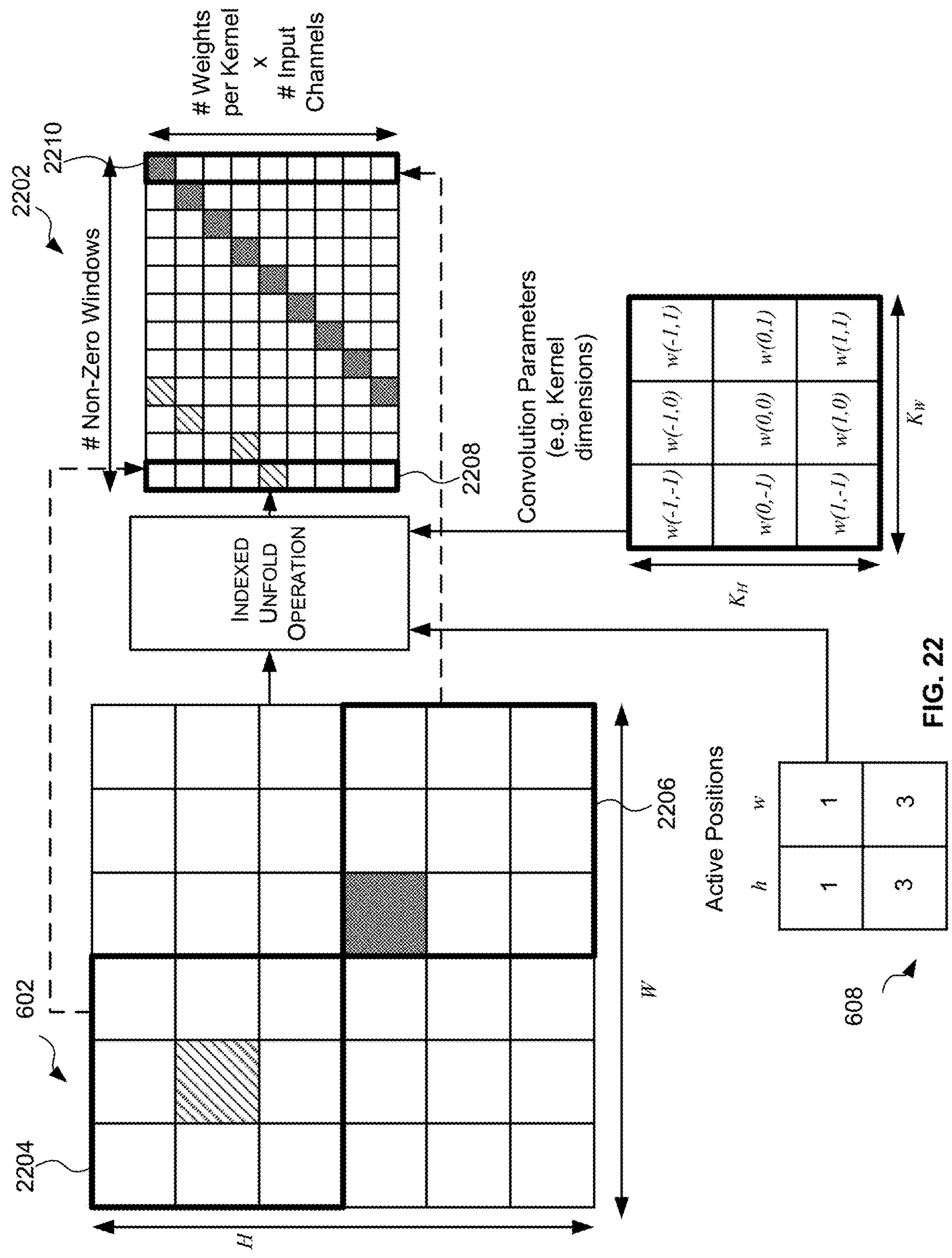
FIG. 22 is a schematic diagram illustrating an example indexed unfold operation performed on an example input tensor to implement an example standard convolution.

Therefore, the inventors have developed an indexed unfold operation for a standard convolution operation in which an input matrix is generated that only comprises a column for each non-zero window of the input tensor, wherein the non-zero windows of the input tensor are identified from the active locations or positions identified in block 2104 and the convolution parameters (e.g. kernel size, strides, dilations etc.). Specifically, the indexed unfold operation for a standard convolution operation uses the active locations or positions, and the convolution parameters (e.g. strides, dilation, kernel size) to identify the non-zero windows of the input tensor, and generates an input matrix with a column for each non-zero window that comprises the elements of the input tensor in that non-zero window. For example, if the input tensor 602 of FIG. 6 with only two active positions is to be convolved with filters having 3×3 kernels at strides of 1 such that there are twelve non-zero windows, then, as shown in FIG. 22, an indexed unfold operation performed on that input tensor for that convolution results in an input matrix 2202 with twelve columns. The first column 2208 of the input matrix 2202 corresponds to the first non-zero window 2204 of the input tensor 602 and the last (or twelfth) column 2210 of the input matrix 2202 corresponds to the last non-zero window 2206 of the input tensor 602. It can be seen that the input matrix 2202 of FIG. 22 does not comprise the third, fourth, ninth and fourteenth columns of the input matrix 702 of FIG. 7 generated in accordance with a standard unfold operation as each of these columns comprises only zeros values.

Using an indexed unfold operation, as opposed to a standard unfold operation, to implement a standard convolution can significantly reduce the size of the input matrix. This can significantly reduce the computations to implement the matrix multiplication of block 2108 (described below). Generally the sparser the input tensor, the smaller the input matrix generated by an indexed unfold operation, and the more memory efficient the method described with respect to FIG. 21 is.

Figure 23:
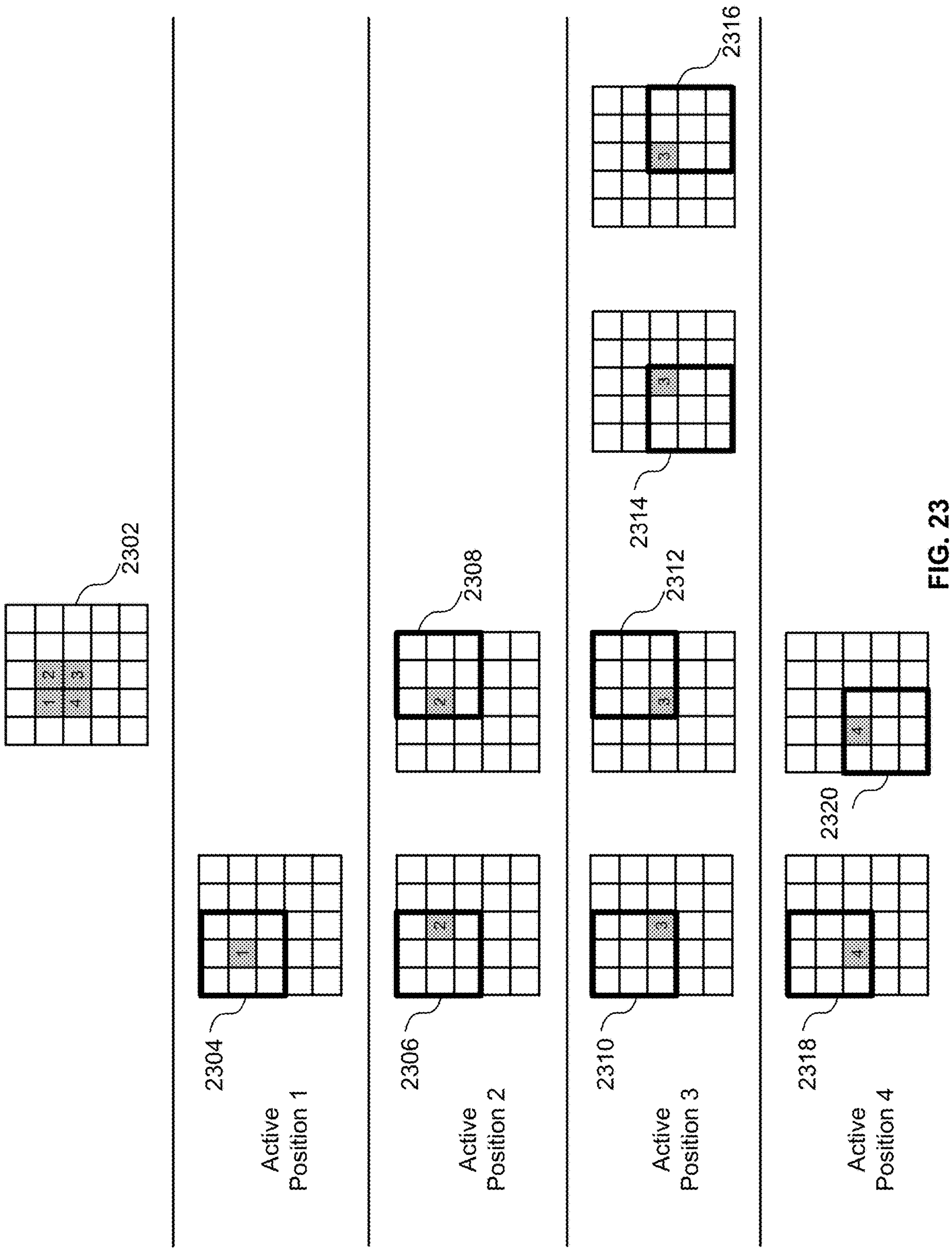
FIG. 23 is a schematic diagram illustrating identifying the windows that each of a plurality of active positions form part of to implement a standard convolution.

The indexed unfold operation may be implemented on the GPU in any suitable manner. In one example, the GPU may be configured to, for each identified active position, determine from the parameters of the convolution (kernel dimensions, strides, dilation), which window(s) that active position forms part of, and identify each such window as a non-zero window. Each non-zero window may be identified by a particular location in the window, such as, but not limited to, the first (e.g. top-left) element of the window, the middle element of the window, or the last (e.g. the bottom right) element of the window. For example, FIG. 23 illustrates an input tensor 2302 with four active positions numbered 1 to 4 which is the input to a 3×3 convolution with a stride of 2 in both the height and width dimensions. In this example the GPU may implement an indexed unfold operation by determining, for each of the four active positions which window(s) that active position falls within. For example, the GPU may determine that the first active position falls within only one window 2304; the GPU may determine that the second active position falls within two windows 2306, 2308; the GPU may determine that the third active position falls within four windows 2310, 2312, 2314, 2316; and the GPU may determine that the fourth active position falls within two windows 2318, 2320. The analysis of each active position may be performed by a separate thread so that the active position analysis can be performed in parallel.

Once the non-zero windows have been identified, the elements forming each non-zero windows are extracted from the input tensor and placed in a column of the input matrix. The elements forming each non-zero window may be extracted using any suitable technique. For example, the elements forming each non-zero window may be identified by indexing each non-zero window (e.g. from 0 to the number of non-zero windows) and, for each non-zero window, identifying the elements in that non-zero window using multiple nested loops, one for each dimension of a window. For example, where the windows are 2D with a height dimension and a width dimensions, there may be loop for the height and another for the width may be implemented. Specifically, for a 2D convolution with 2D windows, an offset may be created for each of the height and width dimensions that is equal to $$\frac{k-1}{2}$$

where k is the size of the kernel in that dimension, and then the GPU may be configured to loop from −offset to +offset from the non-zero window centre. Where the windows are 3D with a channel dimension there may also be a channel loop that loops through the channels. The element at each identified position is then copied into the appropriate position of the input matrix.

As described above, each column in the input matrix corresponds to one non-zero window. The values at the offset positions, starting from top left, may be ordered from top down. In the example shown in FIG. 23 there are only 4 windows, and each window is active so the input matrix would comprise a column for each window. It will be evident to a person of skill in the art that this is only an example method of identifying the elements of each non-zero window and that the elements of each non-zero window may be identified in another manner. Specifically, it will be evident to a person of skill in the art that there are other methods of traversing/indexing each element in a window.

Figure 24:
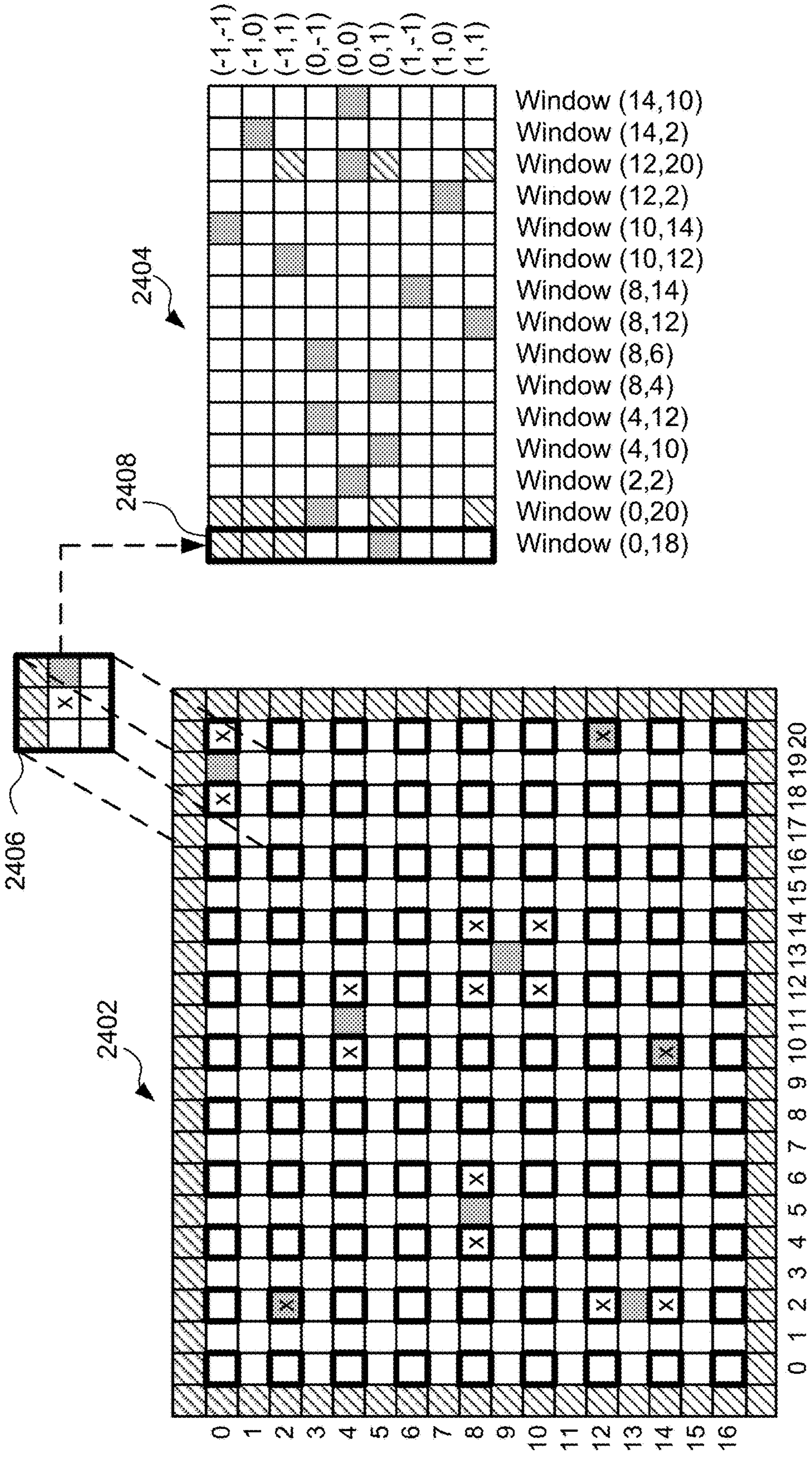
FIG. 24 is a schematic diagram illustrating an example unfold operation performed on another example input tensor to implement an example standard convolution.

Reference is now made to FIG. 24 which illustrates another example of performing an indexed unfold operation on an input tensor of an example 2D convolution operation. In this example the 2D convolution is a 3×3 convolution with a stride of 2 in each of the height and width dimensions with padding. The input tensor 2402 is a 17×21 matrix which has eight active positions (identified by grey shading). The active positions are listed in Table 7.

TABLE 7

| Active Positions of Input Tensor | Centre of Each Window Active Position Forms Part of | Position of Output Tensor |
|---|---|---|
| (2, 2) | (2, 2) | (1, 1) |
| (13, 2) | (12, 2) | (6, 2) |
| | (14, 2) | (7, 1) |
| (8, 5) | (8, 4) | (4, 2) |
| | (8, 6) | (4, 3) |
| (14, 10) | (14, 10) | (7, 5) |
| (4, 11) | (4, 10) | (2, 5) |
| | (4, 12) | (2, 6) |
| (9, 13) | (8, 12) | (4, 6) |
| | (8, 14) | (4, 7) |
| | (10, 12) | (5, 6) |
| | (10, 14) | (5, 7) |
| (0, 19) | (0, 18) | (0, 9) |
| | (0, 20) | (0, 10) |
| (12, 20) | (12, 20) | (6, 10) |

As described above, in some examples, performing an indexed unfold operation to implement a standard convolution may comprise determining, for each active position of the input tensor 2402 (each element shown in grey), the windows that the active position falls within. In FIG. 24 the centre of each 3×3 window of the input tensor used in the convolution is outlined in bold. Since, in this example, the stride is greater than 1, not every element of the input tensor 2402 is the centre of a window. For example, position (0,0) of the input tensor is the centre of a window of the input tensor for this example convolution, but position (0,1) is not the centre of a window of the input tensor for this example convolution. It will be evident to a person of skill in the art that this is only an example technique of identifying a window. In other examples, each window may be identified by another element/position of the window. As described in more detail below, each window of the input tensor maps to (or is used to generate) one element of each channel of the output tensor.

The windows of the input tensor that an active position falls within can be determined from the indices of the active positions, and the convolution parameters (e.g. kernel size, the strides and the padding). In general, the size of the kernel and strides determine the number of windows that an active position belongs to. For instance, a 3×3 kernel with stride 2×2, there are 2×2 different cases—as described in more detail below, in one case the active position will form part of only one window, in another case an active position will form part of two windows, in another case an active position will form part of two windows, and in another case an active position will form part of four windows. In contrast, a 3×3 kernel with stride 1×1, there is only single case and each active position will form part of nine different windows.

In the example shown in FIG. 24, based on the convolution parameters (e.g. kernel size (3×3) and strides (2×2) and padding (1 row at top and bottom, and 1 column on the right and left) any active position with even indices (e.g. both the horizontal index and the width index are even) will be the centre of a window and will not belong to any other windows. For example, active positions (2,2) and (12, 20) belong to only one window and it is a window that those active positions are the centre of. Specifically, active position (2,2) falls within a window that is centred at (2,2) and active position (12, 20) falls within a window that is centred at (12, 20). In contrast, an active position with at least one odd index will belong to at least two windows. Specifically, an active position will belong to two windows for each odd index. The centre positions of those windows can be determined by subtracting 1 from each of the odd indices (or selecting the closest even index in one direction) and adding 1 to each of the odd indices (or selecting the closest even index in the other direction). For example, active position (13, 2), with one odd index, belongs to a first window centred at (12, 2) and a second window centred at (14, 2). Similarly, active position (9, 13), with two odd indices, belongs to a first window centred at (8, 12), a second window centred at (8, 14), a third window centred at (10, 12) and a fourth window centred at (10, 14). The active windows that each of the active positions of the input tensor 2402 of FIG. 24 fall within are shown in Table 7. Each of these windows, which are identified by an 'x' in the input tensor 2402 of FIG. 24, comprises at least one active position and thus is a non-zero window.

Once the non-zero windows have been identified the elements forming each non-zero window are extracted from the input tensor 2402 and placed in a column of the input matrix 2404. As described above, in the example shown in FIG. 24 the centre of each non-zero window is identified by an 'x'. Accordingly, for each 'x' shown in the input tensor 2402, the elements forming a 3×3 window centred on that position are extracted. For example, for the 'x' at (0, 18), the elements forming a 3×3 window 2406 centred at (0, 18) are extracted from the input tensor 2402 and are placed in the first column 2408 of the input matrix 2404. Since in this example, there are fifteen non-zero windows, there are fifteen columns of the input matrix 2404.

In some cases, in addition to receiving the input tensor in dense format, and the active positions, the indexed unfold operation may also receive a zeroed input matrix with the desired shape (e.g. height=elements per kernel×number of channels, width=number of non-zero windows) and the GPU may be configured to write the non-zero window elements to the appropriate location in the input matrix.

Once the GPU has performed an indexed unfold operation on the input tensor to generate an input matrix with the elements of each non-zero window of the input tensor, the method 2100 proceeds to block 2108.

Figure 25:
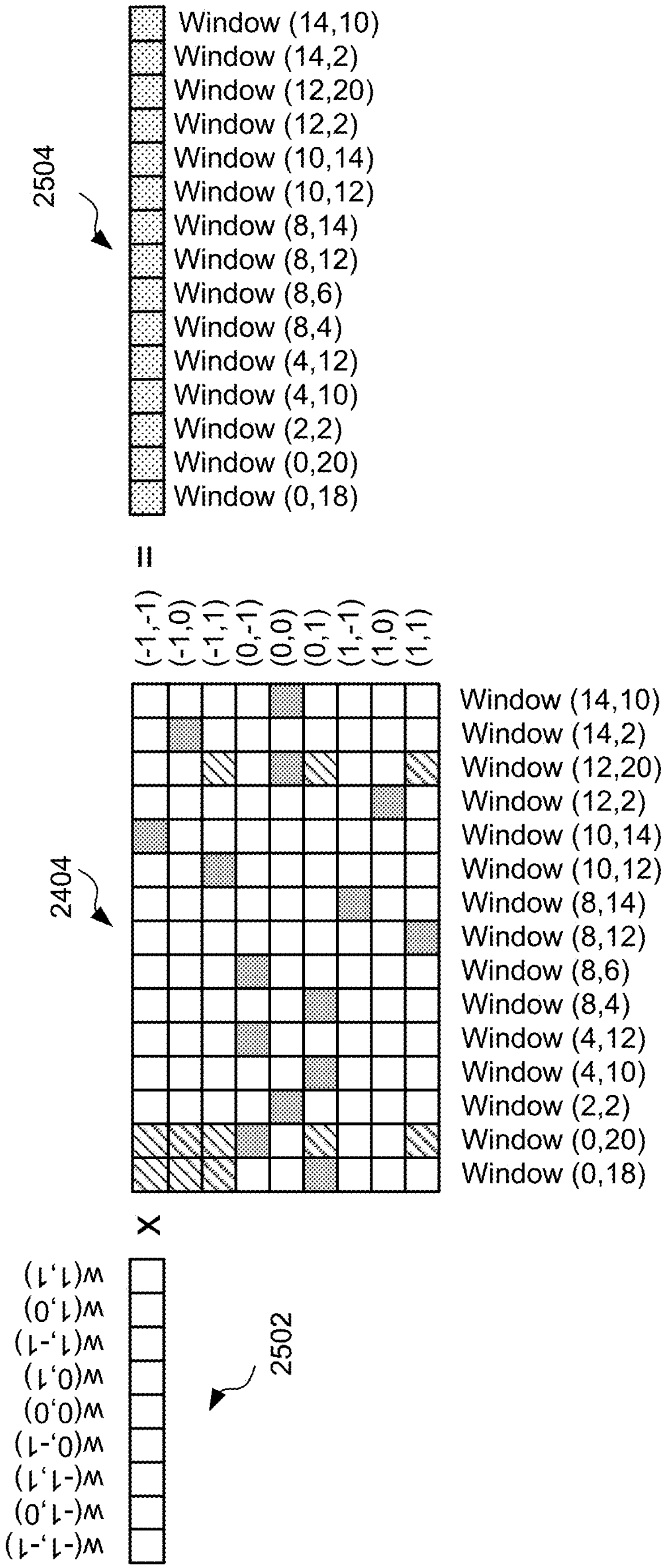
FIG. 25 is a schematic diagram illustrating a matrix multiplication between the input matrix generated in FIG. 24 and a weight matrix to implement an example standard convolution.

At block 2108, the GPU performs a matrix multiplication operation (which may be referred to as a MatMul operation) between a weight matrix and the input matrix generated in block 2106 to generate an output matrix. FIG. 25 illustrates an example matrix multiplication between an example weight matrix 2502 and the input matrix 2404 of FIG. 24. The weight matrix may comprise a row for each filter, and a column for each weight in a filter. In the example shown in FIG. 25 there is only one filter with a 3×3 kernel and one channel (thus nine weights per filter). Therefore the weight matrix 2502 comprises one row and nine columns. Each column corresponds to a position in the filter and the weights of a filter are placed in the columns in accordance with their place in the filter. In the example shown in FIG. 25 the weights in a filter are unrolled from left to right and top to bottom, such that the weight in the top left corner of a kernel is placed in the first column, the weight in the centre of the filter is placed in the fifth column, and the weight in the bottom right of the kernel is placed in the last or ninth column. It will be evident to a person of skill in the art that this is an example only and the weights can be placed in any order in the weight matrix so long as their order corresponds to the order of the elements of each non-zero window in the input matrix. Specifically, if element at position (−1,−1) of a non-zero window is placed in row 0 of the input matrix, then the weight at position (−1,−1) of the filter would be placed in column 0 of the weight matrix.

The matrix multiplication between the weight matrix 2502 and the input matrix 2404 generates an output matrix 2504 which comprises, for each non-zero window, an output element for each channel of the output (i.e., for each filter). The output matrix 2504 may have a column for each non-zero window and a row for each output channel such that each column comprises an output element for the corresponding non-zero window for each output channel. In the example shown in FIG. 25 there are fifteen non-zero windows and one output channel, so the example output matrix 2504 has fifteen columns and one row. The matrix multiplication may be parallelised on the GPU, by, for example, processing each column of the input matrix in a separate thread.

Once the GPU has performed the matrix multiplication the method 2100 may end or the method 2100 may proceed to block 2110. Specifically, the output matrix 2504 generated in block 2108 comprises all of the non-zero elements of the output-tensor (in other words the output matrix corresponds to the output tensor in sparse format) and thus the output matrix 2504 may be simply output, or an output tensor in dense format may be first generated from the output matrix 2504.

At block 2110, the GPU performs an indexed fold operation on the output matrix generated in block 2108 to generate an output tensor in dense format. The indexed fold operation is the opposite of the indexed unfold operation performed in block 2106. Specifically, each non-zero window can be mapped to a 2D position in the output tensor in dense format, and the indexed fold operation uses this information to generate an output tensor in dense format (e.g. a densified output tensor) from the output matrix generated in block 2108. In other words, the indexed fold operation generates an output tensor with each element in the output matrix in the correct position and zeros elsewhere.

As described above, a standard fold operation (e.g. a col2im operation) receives an output matrix in dense format—i.e. an output matrix that comprises a row per output channel with an output element for each element of that channel—and converts each row of the received matrix to a plane of the output tensor in accordance with the size of a channel of the output tensor.

In contrast to a standard fold operation, an indexed fold operation receives an output matrix in sparse format—i.e., the received matrix does not necessarily comprise a value or element for each element of the output tensor. An indexed fold operation also receives information indicating the output position corresponding to each non-zero window. The information indicating the output position corresponding to each non-zero window may be the co-ordinates of the active locations in the input tensor determined in block 2104; the location of the non-zero windows identified in block 2106 to perform the indexed unfold operation; or the co-ordinate of the position in the output tensor corresponding to each non-zero window (which may be determined in block 2106 as part of the indexed unfold operation). The position in the output tensor corresponding to each non-zero window is then used to place the elements of the sparse output matrix in the correct location of the output tensor in dense format. The elements at all other positions of the output tensor may then be set to zero.

Figure 26:
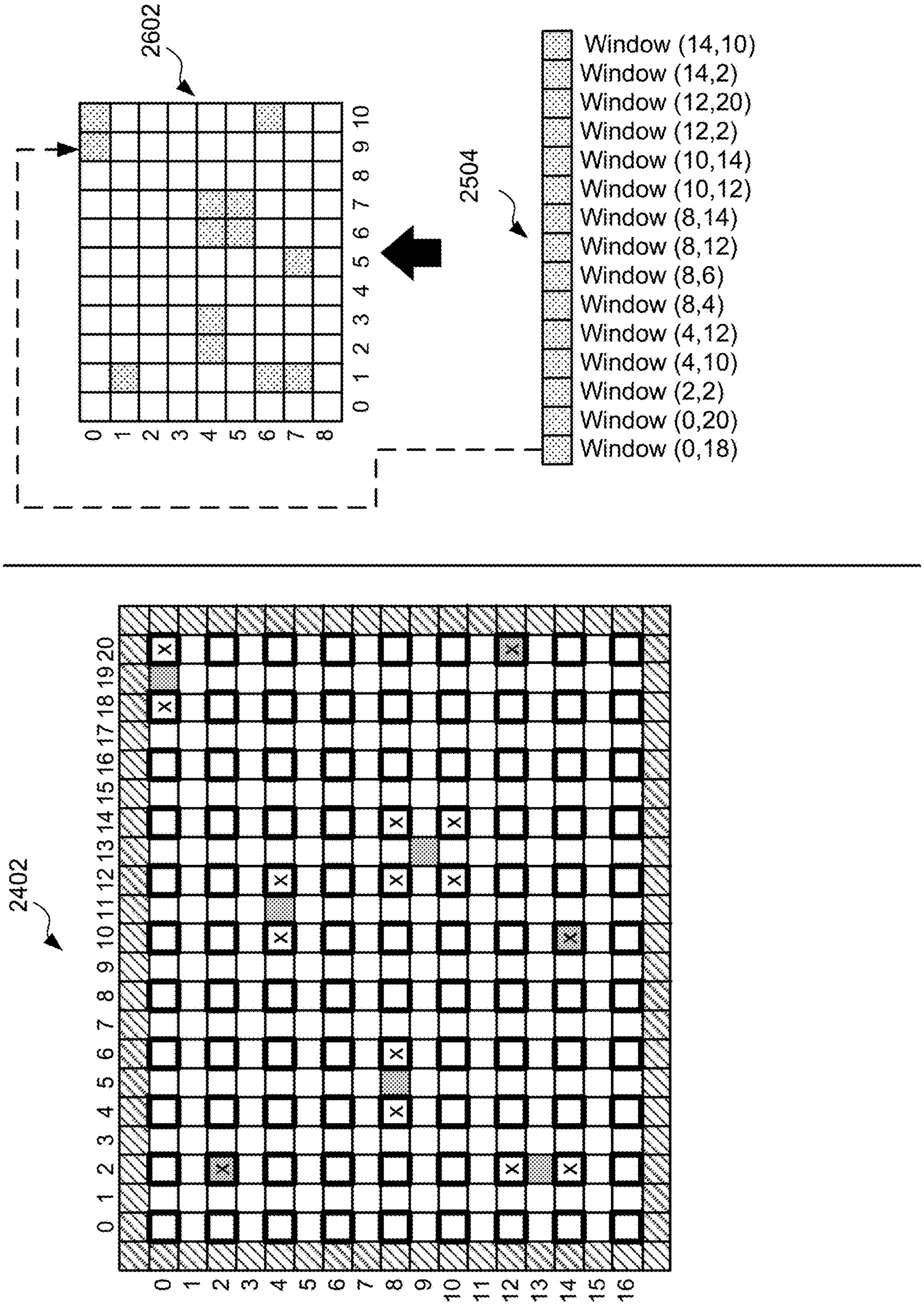
FIG. 26 is a schematic diagram illustrating an example indexed fold operation performed on the output of the matrix multiplication of FIG. 25 to implement an example standard convolution.

If the co-ordinates of the position of the output tensor corresponding to each non-zero window are not explicitly provided then they may be determined from the provided information. For example, as described above, the non-zero windows can be identified from the active positions of the input tensor and the convolution parameters (e.g. strides, kernel size etc.). Each non-zero window can then be mapped to a 2D position in the output tensor based on the convolution parameters. For example, as shown in FIG. 26, each window of the input tensor 2402 maps to a position in the final output tensor 2602. In this example, since there is one row and column of padding in each dimension, the kernel is of size 3×3, and the strides are 2, the position in the output tensor corresponding to a particular window can be determined by dividing the indices of the centre of a non-zero window by the stride (i.e. 2 in this case). For example, a window centred at position (2,2) of the input tensor 2402 maps to position (1,1) of the output tensor. Accordingly, an indexed fold operation can be performed on the output matrix 2504 of FIG. 25 by mapping each element of the output matrix to position (y, x) where y=y position of centre of corresponding window/2, and x=x position of centre of corresponding window/2. Table 7 illustrates a mapping between each of the non-zero windows and a position in the output tensor 2602 and FIG. 26 shows the final output tensor in dense format 2602 that is generated from the output matrix 2504 of FIG. 25 in accordance with those window-output position pairings. Although it has been described that a non-zero window is identified based on the position of its centre element, it will be evident to a person of skill in the art that this is an example only, and other positions in a window (e.g. the first or last positions) may be used to (i) identify that window; and (ii) identify the corresponding position in the output tensor.

The indexed fold operation may be implemented on the GPU by, for example, creating an index for each non-zero window (e.g. from 0 to n where there are n+1 non-zero windows). For each non-zero window, the GPU may then be configured to determine the associated location in the output tensor from a location in that window (e.g. the centre of the window) and the convolution parameters, then loop through each output channel and place or copy the appropriate element of the output matrix in the determined location in the corresponding channel of the output tensor. Each non-zero window may get its own thread so that the indexed fold operation can be performed in parallel on the GPU.

In some cases, in addition to receiving, information indicating the positions of the final output tensor corresponding to each non-zero window, the convolution parameters and the output matrix generated in block 2108, the indexed fold operation may also receive a zeroed output tensor of the appropriate dimensions and may write the elements of the received matrix to the received output tensor. In such cases, zeros may not be explicitly added to the positions of the output tensor that do not comprise an element of the output matrix.

Once the indexed fold operation has been performed, the method 2100 may end.

Test Results

Tables 8, 9 and 10 show the average time or duration, in ms, to implement a 2D convolution on a GPU for 2D input tensors of sizes 128×128, 1000×1000 and 10000×10000 respectively using different methods and different levels of sparsity. The methods include: (1) the method described above with respect to FIG. 21, which is referred to as the "Indexed Un/Fold" method, (2) the PyTorch Conv2D method, (3) the PyTorch Un/Fold method, and (4) the UnFoldNd method.

TABLE 8

| Input Size: 128 × 128 | | | | | |
|---|---|---|---|---|---|
| Method | 0% Sparsity | 50% Sparsity | 80% Sparsity | 90% Sparsity | 99% Sparsity |
| Indexed Un/Fold | 0.15 | 0.15 | 0.15 | 0.15 | 0.15 |
| PyTorch Conv2D | 0.16 | 0.16 | 0.16 | 0.16 | 0.16 |
| PyTorch Un/Fold | 0.09 | 0.09 | 0.09 | 0.09 | 0.09 |
| UnFoldNd | 0.34 | 0.34 | 0.34 | 0.34 | 0.34 |

TABLE 9

| Input Size: 1000 × 1000 | | | | | |
|---|---|---|---|---|---|
| Method | 0% Sparsity | 50% Sparsity | 80% Sparsity | 90% Sparsity | 99% Sparsity |
| Indexed Un/Fold | 0.58 | 0.37 | 0.24 | 0.21 | 0.19 |
| PyTorch Conv2D | 0.33 | 0.33 | 0.33 | 0.33 | 0.33 |
| PyTorch Un/Fold | 0.91 | 0.91 | 0.91 | 0.91 | 0.91 |
| UnFoldNd | 0.70 | 0.70 | 0.70 | 0.70 | 0.70 |

TABLE 10

| Input Size: 10000 × 10000 | | | | | |
|---|---|---|---|---|---|
| Method | 0% Sparsity | 50% Sparsity | 80% Sparsity | 90% Sparsity | 99% Sparsity |
| Indexed Un/Fold | 65.04 | 32.72 | 17.02 | 11.83 | 7.14 |
| PyTorch Conv2D | 20.20 | 20.20 | 20.20 | 20.20 | 20.20 |
| PyTorch Un/Fold | 105.80 | 105.80 | 105.80 | 105.80 | 105.80 |
| UnFoldNd | — | — | — | — | — |

The UnFoldNd, PyTorch Conv2D, and PyTorch Un/Fold methods are known 2D convolution methods which do not take into account sparsity. Accordingly, the time to implement a 2D convolution operation using these methods doesn't change with the sparsity because each of these methods perform the same operations regardless of the sparsity (i.e., perform the full 2D convolution). It can be seen from Tables 8 to 10 that when the input is large enough and the sparsity is high enough (e.g. 80% or above), the method described herein with respect to FIG. 21 for implementing a standard 2D convolution consistently outperforms these known 2D convolution methods.

Figure 27:
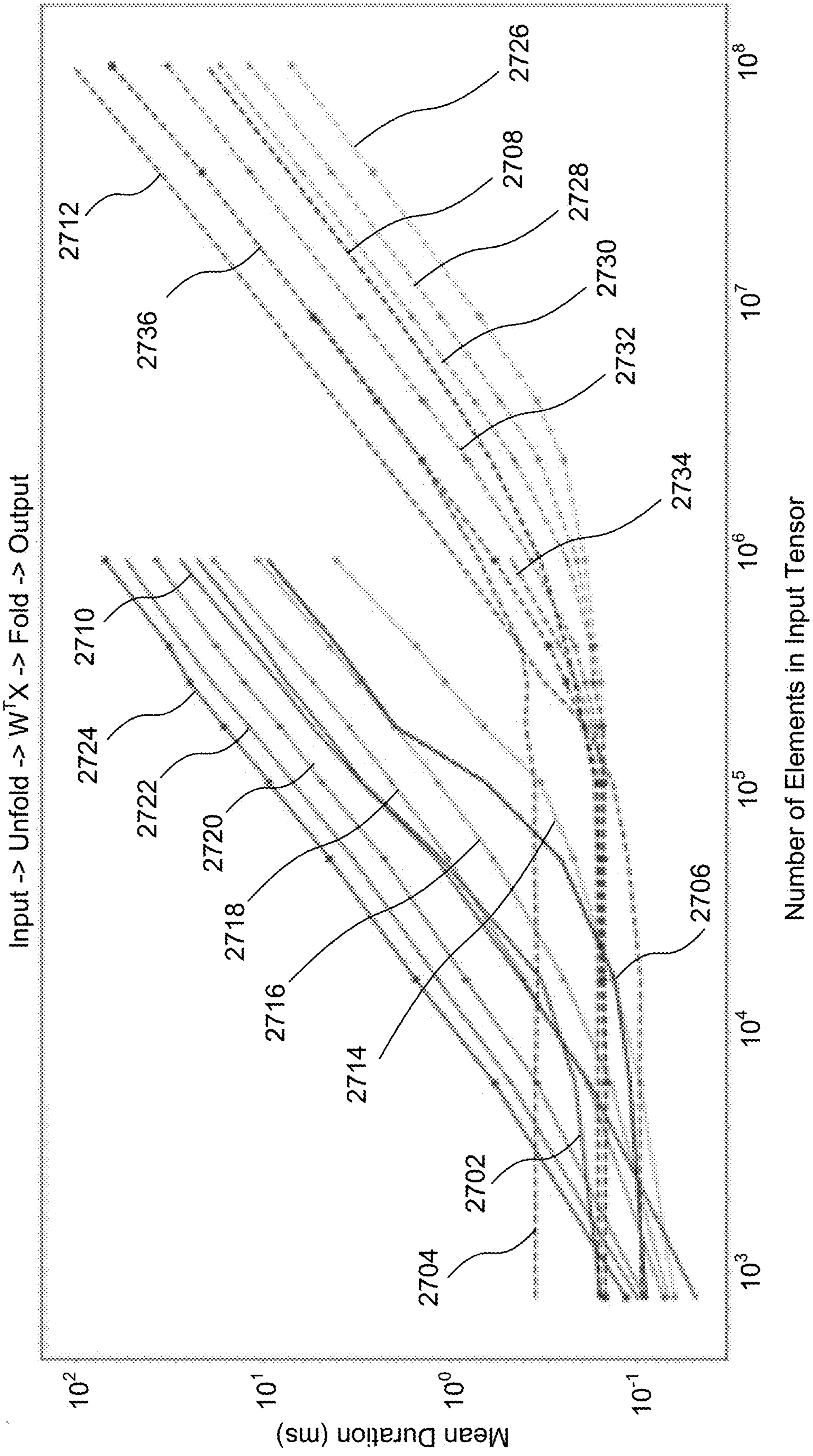
FIG. 27 is a graph of the mean duration to implement an example 2D convolution operation on a GPU or CPU for different sized 2D input tensors and different levels of sparsity using different methods.

Reference is now made to FIG. 27 which shows a graph of the mean duration, in ms, to implement an example 2D convolution on a GPU or CPU (i) for different sized 2D input tensors (MNIST), (ii) using different methods (FoldNd, PyTorch Conv2D, PyTorch Fold and the method described herein with respect to FIG. 21 which is referred to as the "Indexed Un/Fold" method); and (iii) with different levels of sparsity. Table 11 summarises the different combinations of 2D convolution implementation methods, and input tensor sparsity shown in FIG. 27.

TABLE 11

| Element in FIG. 27 | Method | Sparsity |
|---|---|---|
| 2702 | FoldNd (cpu) | — |
| 2704 | FoldNd (gpu) | — |
| 2706 | PyTorch Conv2d (cpu) | — |
| 2708 | PyTorch Conv2d (gpu) | — |
| 2710 | PyTorch Un/Fold (cpu) | — |
| 2712 | PyTorch Un/Fold (gpu) | — |
| 2714 | Indexed Un/Fold (cpu) | 99% |
| 2716 | Indexed Un/Fold (cpu) | 90% |
| 2718 | Indexed Un/Fold (cpu) | 80% |
| 2720 | Indexed Un/Fold (cpu) | 50% |
| 2722 | Indexed Un/Fold (cpu) | 25% |
| 2724 | Indexed Un/Fold (cpu) | 0% |
| 2726 | Indexed Un/Fold (gpu) | 99% |
| 2728 | Indexed Un/Fold (gpu) | 90% |
| 2730 | Indexed Un/Fold (gpu) | 80% |
| 2732 | Indexed Un/Fold (gpu) | 50% |
| 2734 | Indexed Un/Fold (gpu) | 25% |
| 2736 | Indexed Un/Fold (gpu) | 0% |

It can be seen from FIG. 27 that the method described above with respect to FIGS. 21 to 26 outperforms known methods for implementing a 2D convolution when the input data is highly sparse (at least 80% sparsity when implement on a GPU, and at least 90% sparsity when implemented on a CPU). Accordingly, the described method provides significant speed-ups when presented with a highly sparse input both when the method is performed on a GPU and a CPU. Accordingly, the method 2100 of FIG. 21 may alternatively be performed on a CPU.

GPU Implementation of Standard Deconvolution Operation

Figure 28:
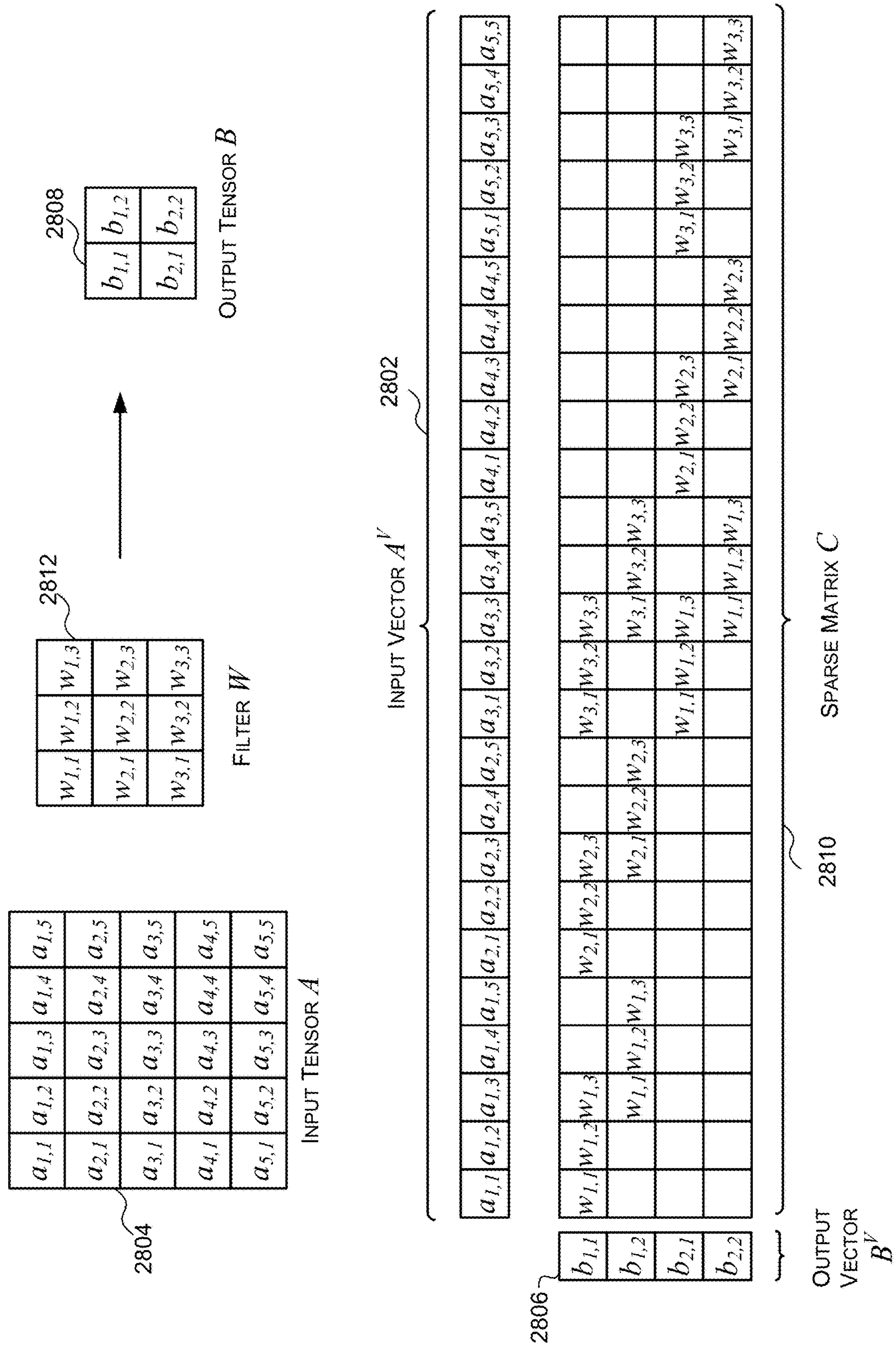
FIG. 28 is a schematic diagram illustrating an example 2D convolution.

A deconvolution, which may also be referred to a convolution transpose or a fractionally strided convolution, is the reverse operation of a convolution. Specifically, a convolution can typically be represented as a matrix multiplication between an input vector $A^V$ and a sparse matrix C as shown in equation (6) where the non-zero elements of the sparse matrix C are the weights w of the filter W. The input vector $A^V$ is the elements of the input tensor unrolled from left to right and top to bottom (and front to back if 3D). For example, as shown in FIG. 28, the input vector $A^V$ 2802 for the 5×5 input tensor A 2804 is a flattened 25-element vector. Similarly the output vector BY is the elements of the output tensor B unrolled. For example, as shown in FIG. 28, the output vector BY 2806 for the 2×2 output tensor B 2808 is a flattened 4-element vector. An example sparse matrix C 2810 for the example filter 2812 is also shown in FIG. 28.

$$B^V = C \times A^V \tag{6}$$

In contrast, in a deconvolution the input tensor A is processed by transposing the sparse matrix C for the corresponding direct convolution to generate a transposed sparse matrix $C^T$ and performing a matrix multiplication between the input vector $A^V$ and the transposed sparse matrix $C^T$ as shown in equation (7).

$$B^V = C^T \times A^V \tag{7}$$

Figure 29:
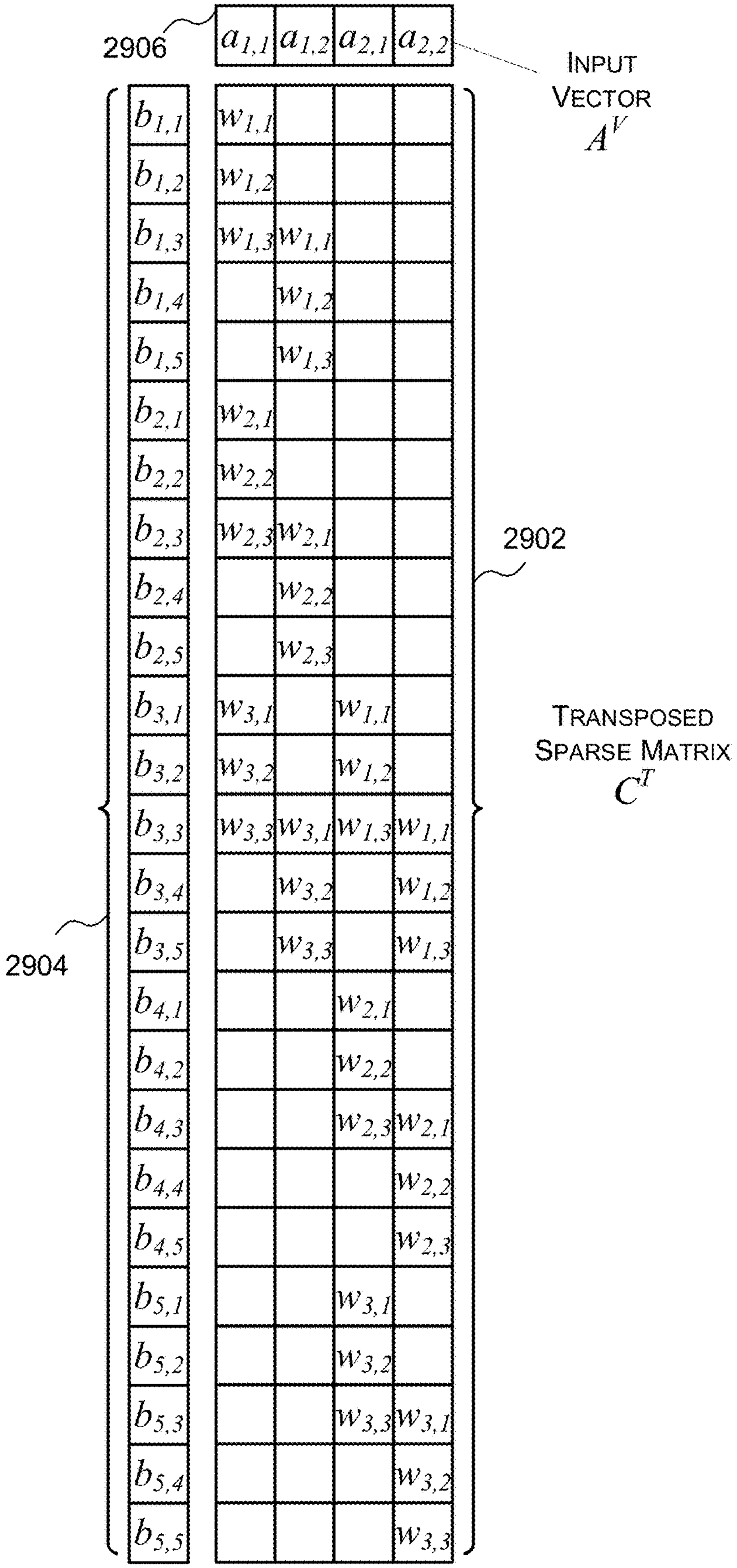
FIG. 29 is a schematic diagram illustrating an example 2D deconvolution.
Figure 30:
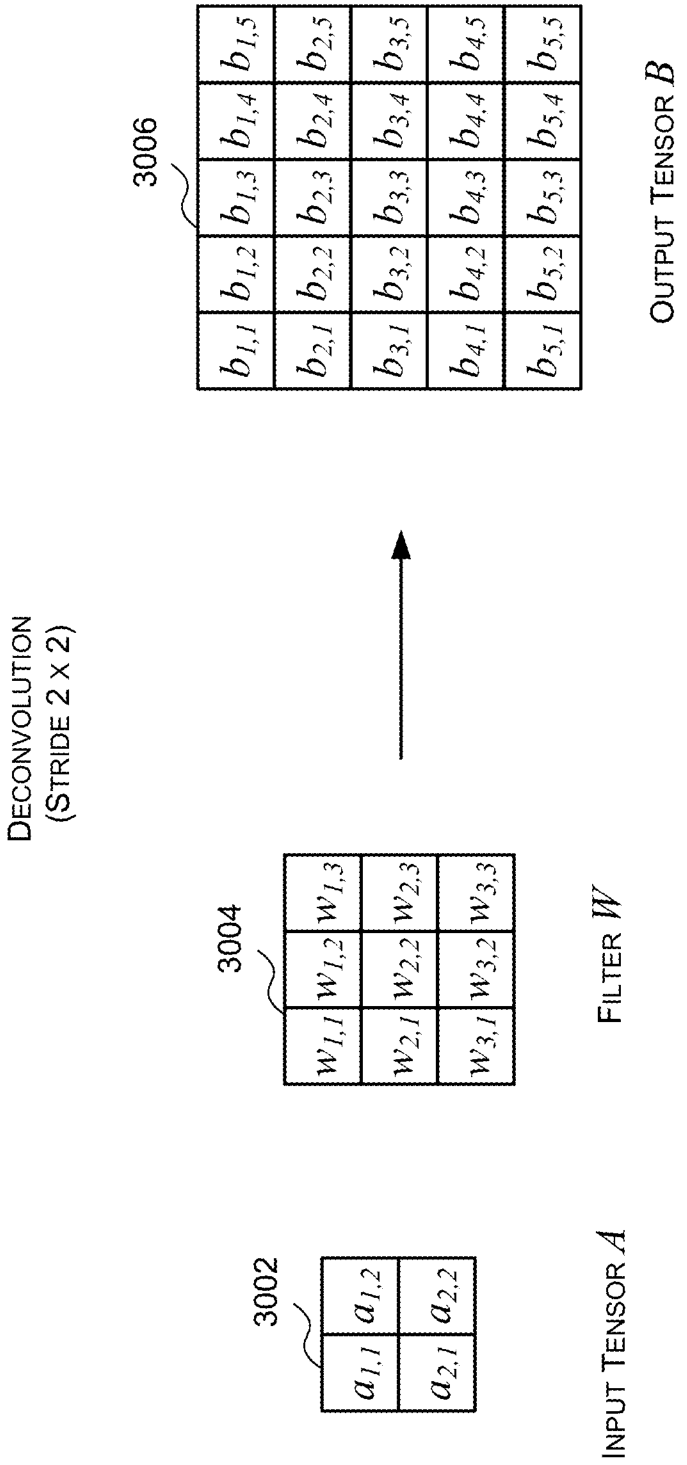
FIG. 30 is a schematic diagram illustrating an example 2D deconvolution.

As is known to those of skill in the art, a matrix is transposed by converting the rows of the matrix into columns and converting the columns into rows. For example, FIG. 29 illustrates the transposed sparse matrix $C^T$ 2902 of the sparse matrix C 2810 of FIG. 28. It can be seen that the first row of the sparse matrix C 2810 of FIG. 28 has become the first column of the transposed sparse matrix $C^T$ 2902 of FIG. 29, the second row of the sparse matrix C 2810 of FIG. 28 has become the second column of the transposed sparse matrix $C^T$ 2902 of FIG. 9 and so on. FIG. 29 also shows the output vector BV 2904 and the input vector $A^V$ 2906 for the deconvolution.

Where a convolution may produce an output tensor B that is smaller, in the height and/or width dimension, relative to the input tensor A, a deconvolution may produce an output tensor B that is larger, in the height and/or width dimension, relative to the input tensor A. For example, as shown in FIG. 30 a deconvolution between a 2×2 input tensor A 3002 and a 3×3 filter W 3004 with a stride of 2 in the height and width dimensions, produces a 5×5 output tensor B 3006. Accordingly, a deconvolution may be used in a neural network to perform up-sampling. However, a deconvolution may also, or alternatively, be used in a neural network to perform image segmentation, image super-resolution, and/or object detection. A deconvolution may also be used in training a neural network. Specifically, during training both a forward pass and a backward pass of a neural network may be implemented. In a forward pass of a neural network, data is processed in accordance with the layers of the DNN. For example, if the neural network comprises a convolution layer followed by a pooling layer, then the input data to the neural network is processed in accordance with the convolution layer and the output of the convolution layer is processed in accordance with the pooling layer. In a backward pass of a neural network, data is passed backwards through the neural network such that the reverse operations of those performed in the forward pass are performed on the data. Accordingly, a deconvolution may be used in a backward pass of a neural network to implement the reverse of a convolution operation in the forward pass.

As described in the Applicant's GB Patent No. 2582352, which is incorporated herein by reference in its entirety, a deconvolution can be implemented by performing a plurality of direct or standard convolutions on the input tensor to the deconvolution and interleaving the outputs of the direct convolutions to generate the output of the deconvolution. Specifically, each filter of the deconvolution is divided into a plurality of sub-filters; a convolution operation is performed between each sub-filter and the input tensor to generate a sub-output tensor; and the elements of the sub-output tensors are interleaved to generate a channel of the final output.

Figure 31:
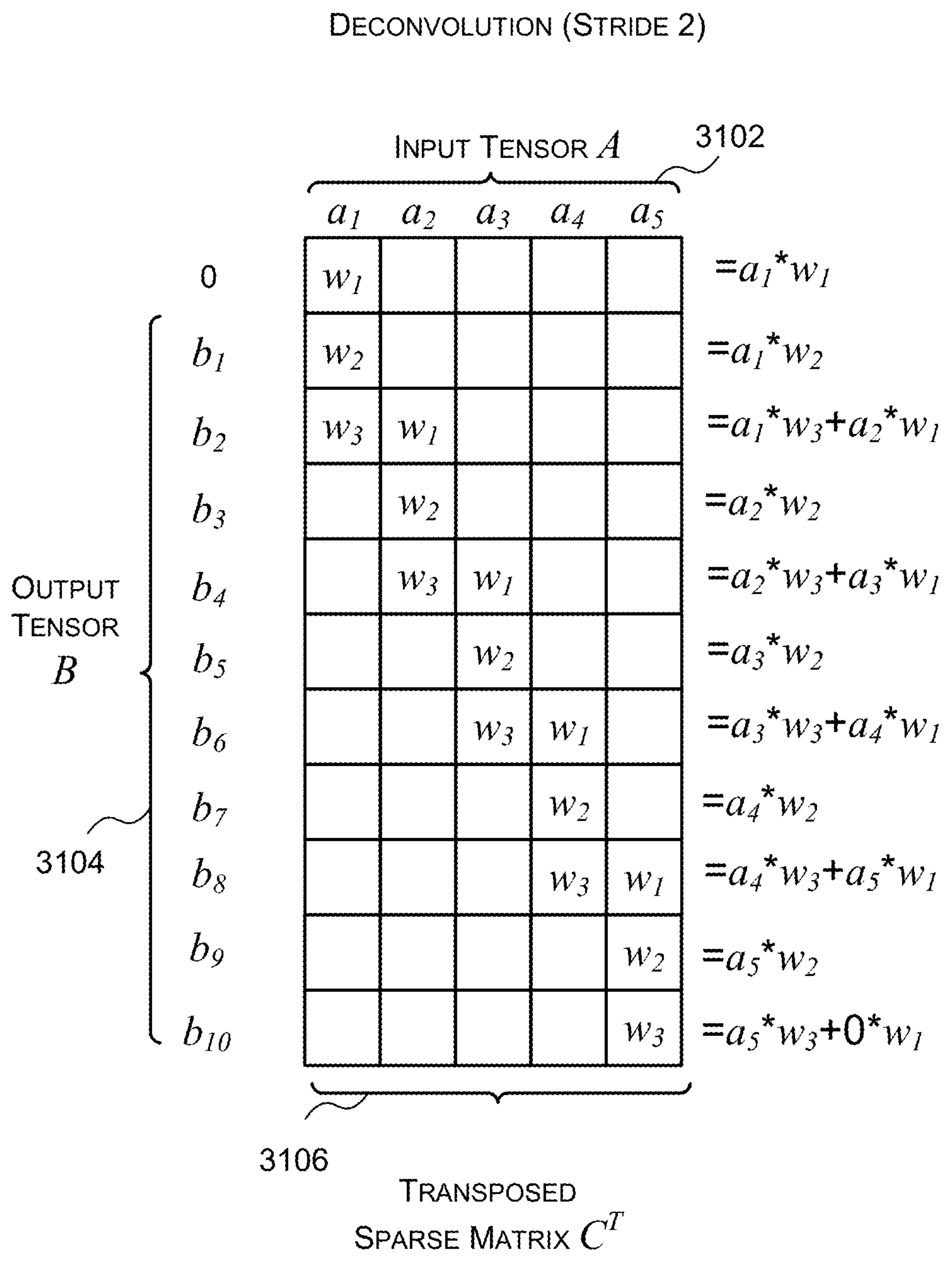
FIG. 31 is a schematic diagram illustrating implementing an example 2D deconvolution using a transposed sparse matrix.

For example, FIG. 31 illustrates a deconvolution between a 5-element input tensor $A=[a_1\ a_2\ a_3\ a_4\ a_5]$ 3102 and a 3-weight filter $W=[w_1\ w_2\ w_3]$ that produces a 10-element output tensor $B=[b_1\ b_2\ b_3\ b_4\ b_5\ b_6\ b_7\ b_8\ b_9\ b_{10}]$ 3104. As noted above, a deconvolution can be expressed as a matrix multiplication between an input vector A and the transposed sparse matrix $C^T$ 3106. As is shown in FIG. 32 the deconvolution is equivalent to padding the input tensor A with zeros between each element so that the input elements are spaced apart by the stride in the height and width dimensions and on one or more edges and convolving the padded input tensor $A^P$ with a reflected version of the filter $W^R$.

Figure 32:
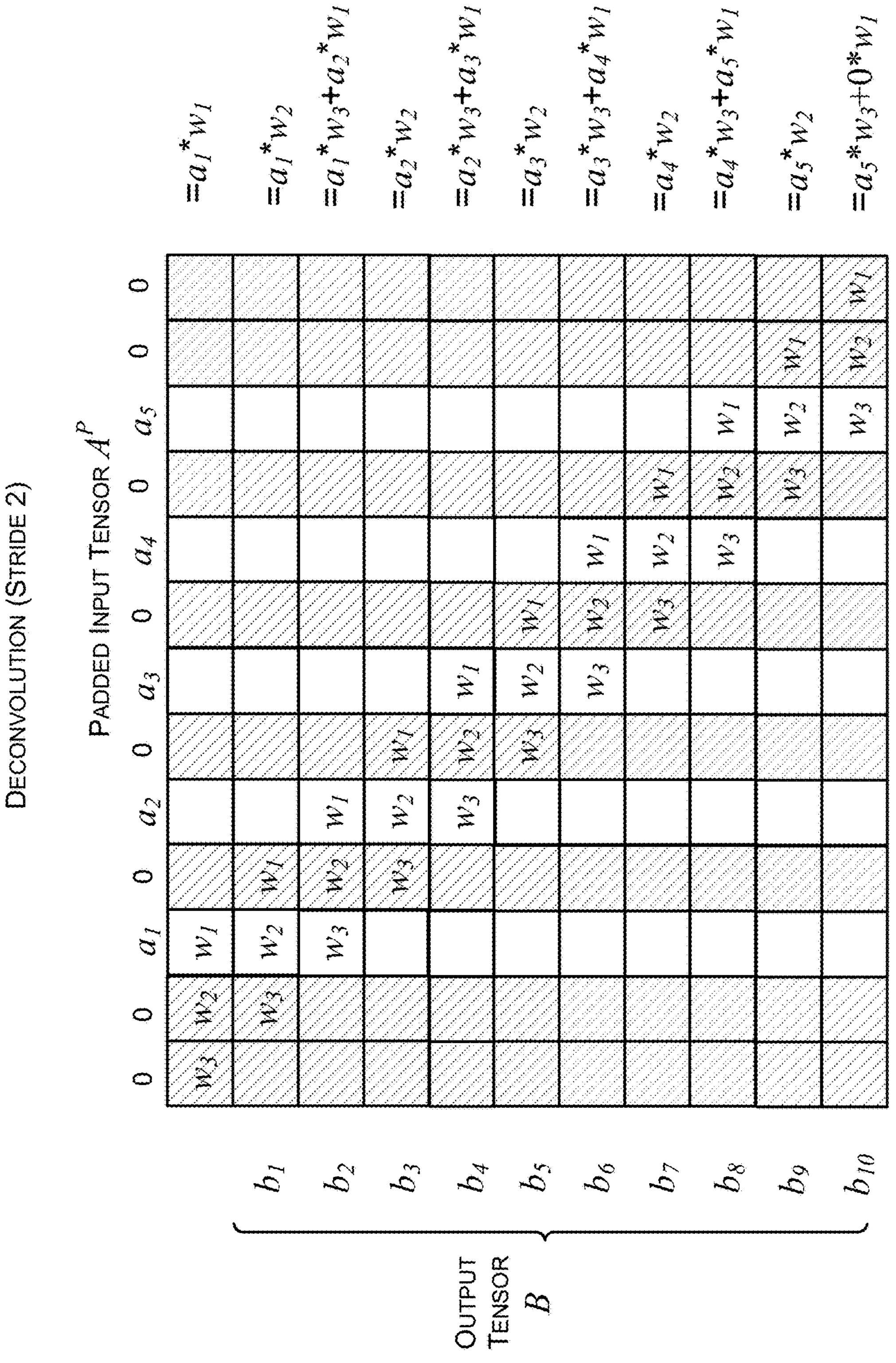
FIG. 32 is a schematic diagram illustrating implementing an example 2D deconvolution using a padded input tensor.
Figure 33:
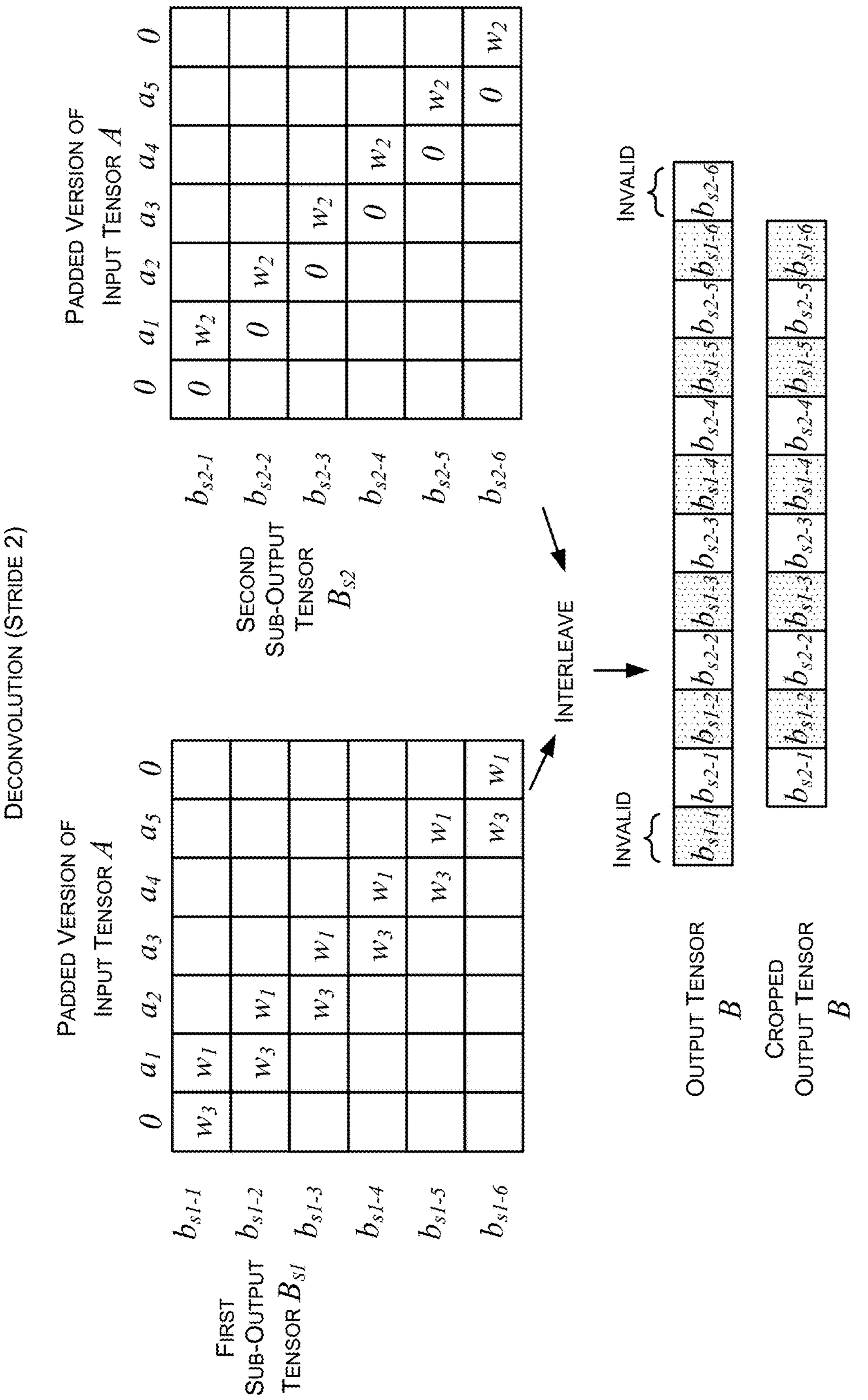
FIG. 33 is a schematic diagram illustrating implementing an example 2D deconvolution using multiple direct convolutions.

It can be seen in FIGS. 31 and 32 that each even output element is equal to the dot product of the $i^{th}$ and $(i+1)^{th}$ input elements and the third and first filter weights $w_3$ and $w_1$, wherein i=n/2 and n is the output element number. Accordingly, the even output elements can be generated by performing a direct convolution between the input tensor A and a first sub-filter $W_{s1}=[w_3\ w_1]$. Similarly, each odd output element is equal to the product of the $i^{th}$ input element a; and the second filter weight $w_2$, wherein i=(n+1)/2 and n is the output element number. Accordingly the odd output elements can be generated by performing a direct convolution between the input tensor A and a second sub-filter $W_{s2}=[0\ w_2]$. The final output tensor B of the deconvolution can then be generated by interleaving the outputs of the first convolution and the second convolution as shown in FIG. 33. Specifically, the final output tensor B of the deconvolution can be generated by alternating between the outputs of the first and second direct convolutions.

In general, the number of sub-filters (per filter) to implement a particular deconvolution is based on the stride(s) of the deconvolution. In particular, there will be stride_h+stride_w+stride_p sub-filters per filter where stride_h is the stride in the height dimension, stride_w is the stride in the width dimension, and stride_p is the stride in the p or channel dimension. For example, where the filter W is one-dimensional (1D) in the width dimension there will be stride_w sub-filters. In particular, for a deconvolution with a 1D filter and stride_w=4 there will be 4 sub-filters. Where the filter W is two-dimensional (2D) and the filter moves in both width and height dimensions with respect to the input tensor A, there will be stride_w+stride_h sub-filters. Where the filter W is three-dimensional (3D) the number of sub-filters may depend on the number of directions or dimensions in which the filter moves with respect to the input tensor. For example, in a 2D deconvolution a 3D filter is only moved in the width and height dimensions (or the x and y dimensions) with respect to a 3D input tensor, so there will only be stride_w*stride_h sub-filters per filter. In contrast, in a 3D convolution a 3D filter moves in the height, width and p dimensions with respect to the 3D input tensor, thus there will be stride_h*stride_w*stride_p sub-filters per filter.

In general, the dimension of the kernel of each sub-filter will be w_sub_filter_max*h_sub-filter_max wherein $$\text{w\_sub\_filter\_max} = \left\lceil \frac{\text{filter\_width}}{\text{stride\_w}} \right\rceil \text{ and h\_sub\_filter max} = \left\lceil \frac{\text{filter\_height}}{\text{stride\_h}} \right\rceil.$$

In some cases, the sub-filters of a filter W may be generated by forming a stride_w*stride_h*stride_p base block of filter weights from the origin of the filter W. The origin of a filter is the filter weight that is aligned with a particular input element to generate an output element for that input element. The origin of a filter is typically the first filter weight, the last filter weight or the centre filter weight, but it can be any filter weight. Once the base block is formed each sub-filter is formed from the filter weights at the stride increments starting from one of the filter weights in the base block and generating a reflected version of that filter.

Figure 34:
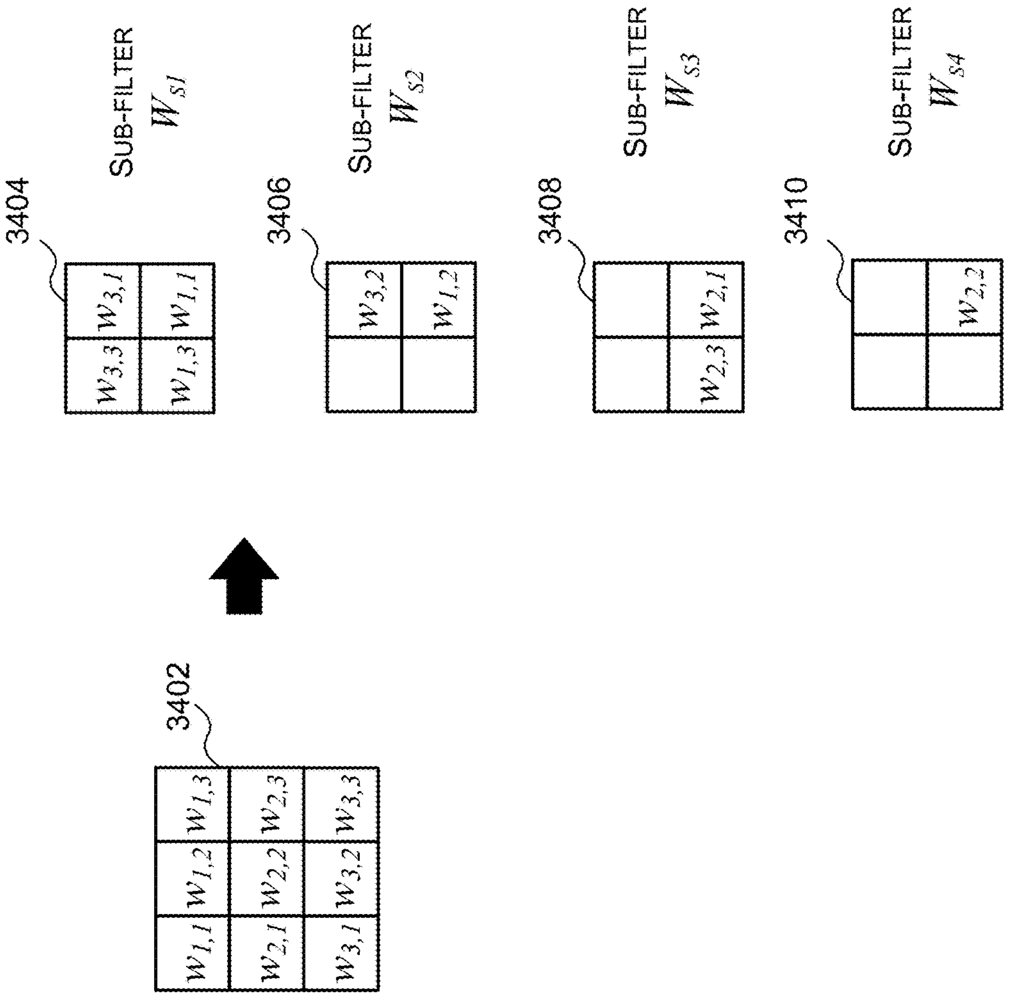
FIG. 34 is a schematic diagram illustrating the sub-filters for implementing an example 2D deconvolution using multiple direct convolutions.

For example, as shown in FIG. 34, a deconvolution with a 3×3 filter 3402 and a stride of two in the width and height dimensions results in four 2×2 sub-filters 3404, 3406, 3408 and 3410.

Figure 35:
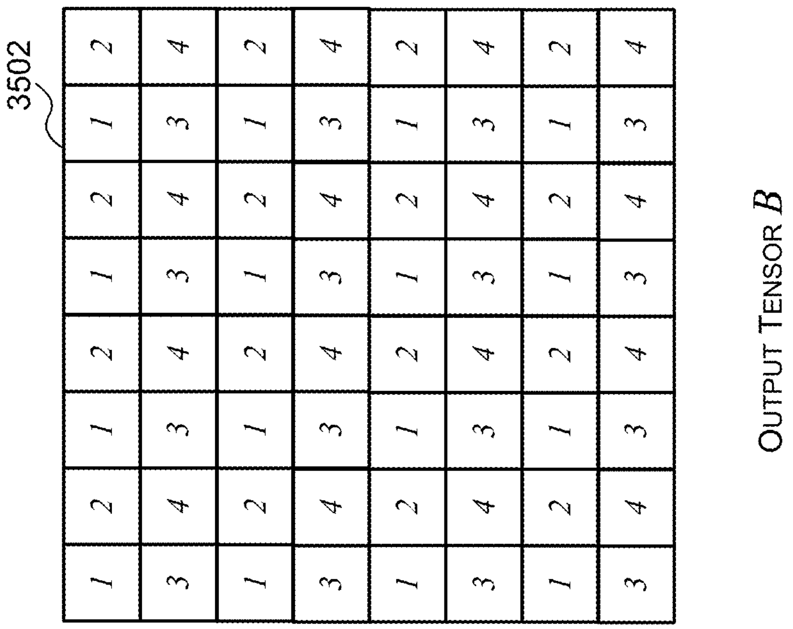
FIG. 35 is a schematic diagram illustrating interleaving the outputs of multiple direct convolutions.

A direct convolution with strides of 1 is then performed between the input tensor and each sub-filter. Each sub-filter thus generates a sub-output tensor. The elements of the sub-output tensors corresponding to the same filter are then interleaved to generate a channel of the output tensor. In general the output elements of the sub-output tensors are interleaved in sub-filter order in accordance with the stride in each direction. Specifically, if the deconvolution has a stride in the width dimension that is greater than 1 (i.e.

stride_w>1) each row of a channel of the output tensor is generated by selecting elements from stride_w sub-output tensors in a round-robin manner. If the deconvolution has a stride in the height dimension that is greater than 1 (i.e. stride_h>1) every stride_h$^{th}$ row is generated by selecting elements from the same stride_w sub-output tensors. For example for a deconvolution that generates an output tensor with 4×4 channels with stride_w=2 and stride_h=2 there will be four sub-filters per filter numbered 1 to 4. The first row and the third row of a channel of the output tensor 3502 are generated by alternating between elements of the 1$^{st}$ and 2$^{nd}$ sub-output tensors and the second and fourth rows are generated by alternating between elements of the 3$^{rd}$ and 4$^{th}$ sub-output tensors as shown in FIG. 35.

The inventors have determined that standard 2D and 3D deconvolutions with a sparse input can be performed efficiently on a GPU by using similar indexed unfold and fold operations as those described above with respect to the method 500 of FIG. 5 to implement at sparse submanifold convolution on a GPU.

Figure 36:
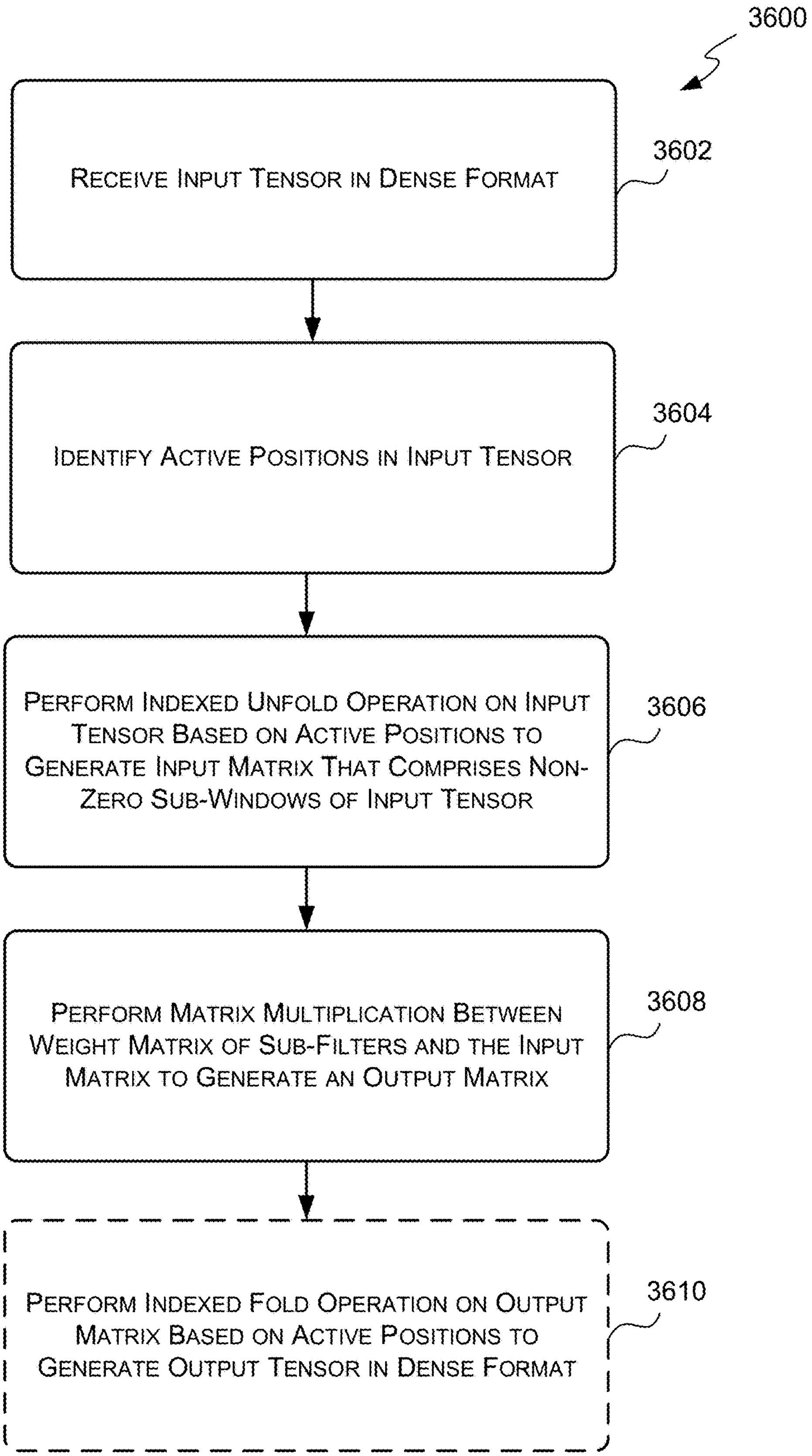
FIG. 36 is a flow diagram of an example method of implementing a deconvolution using a GPU.

Reference is now made to FIG. 36 which illustrates an example method 3600 of implementing a standard deconvolution on a GPU. The method 3600 begins at block 3602 where an input tensor in dense format is received at the GPU. As described above, an input tensor in dense format, which may also be referred to as a densified input tensor, comprises every element of the complete tensor, regardless of whether the element is at an active position. In contrast, an input tensor in sparse format only comprises the elements of the input tensor in dense format that are at an active position. Once the input tensor in dense format has been received, the method 3600 proceeds to block 3604.

At block 3604, the GPU identifies the active locations or positions in the received input tensor. As described above, an active location in an input tensor is a height and width position or location in which at least one channel of the input tensor has a non-zero value or element. Each active location or position may be identified by a set or pair of indices-a height or row index, and a width or column index. The active locations or positions in the received input tensor may be identified using any suitable technique, such as, but not limited to, those described above with respect to block 504 of the method 500 of FIG. 5.

In some cases, the output of this block 3604 may be a list of the height and width (or column and row) co-ordinates or indices of the active positions. As described above, FIG. 6 shows an active position list 608 for an example 6×6 input tensor 602 with two active positions 604, 606. Specifically, as shown in FIG. 6, the active position list 608 comprises an entry for the first active position 604 that identifies its location as a height (row) of 1 and a width (column) of 1, and an entry for the second active position 606 that identifies its location as a height (row) of 3 and a width (column) of 3.

Once the active locations or positions in the received input tensor have been identified, the method 3600 proceeds to block 3606.

At block 3606, the GPU performs an indexed unfold operation (which may also be referred to as a sparse deconvolution unfold operation) on the received input tensor based on the active locations or positions identified in block 3604 to generate an input matrix that comprises the elements of the non-zero sub-windows of the input tensor. As described above, a deconvolution can be implemented by performing a direct convolution between the input tensor and each of a plurality of sub-filters and interleaving the results of the direct convolutions. A non-zero sub-window is a window of the input tensor used in the direct convolutions that has at least one non-zero element. The size of the sub-windows for a deconvolution are based on the size of the sub-filters. As described above, the size of the sub-filters is based on the size of the deconvolution filters and the strides. Specifically, as described above, the sub-filters for a 2D deconvolution will be of size $w_{sub\_filter\_max} \times h_{sub\_filter\_max} \times C_{in}$ wherein $$\text{w\_sub\_filter\_max} = \left\lceil \frac{\text{filter\_width}}{\text{stride\_w}} \right\rceil \text{ and h\_sub\_filter max} = \left\lceil \frac{\text{filter\_height}}{\text{stride\_h}} \right\rceil.$$

For example, as described above with respect to FIG. 34, a 3×3 2D deconvolution with a stride of two in both the width and height dimensions has four 2×2 sub-filters (per filter). Therefore, in that example, each sub-window of the input tensor is a 2×2 window.

Performing an indexed unfold operation may comprise, identifying, from the active locations or positions of the input tensor identified in block 3604 and the deconvolution parameters (e.g. strides, dilation, kernel size), the non-zero sub-windows of the input tensor; and, for each non-zero sub-window, extracting the elements of that non-zero sub-window from the input tensor and placing them in the input matrix. In some cases, the input matrix comprises a column for each non-zero sub-window and a row for each position in a sub-window, and all of the elements that form a non-zero sub-window are placed in the same column. In some cases, the elements in a sub-window are unrolled from left to right and top to bottom, such that the element in the top left corner of the sub-window is placed in the first row, and the element in the bottom right of the sub-window is placed in the last row. However, it will be evident to a person of skill in the art that this is an example only.

The indexed unfold operation may be implemented on the GPU in any suitable manner. In one example, the GPU may be configured to, for each identified active position of the input tensor, determine from the parameters of the deconvolution (kernel dimensions, strides, dilation), which sub-window(s) of the input tensor that active position forms part of, and identify each such sub-window as a non-zero sub-window. Each non-zero sub-window may be identified by a particular location in the window, such as, but not limited to, the first (e.g. top-left) element of the sub-window, the middle element of the sub-window, or the last (e.g. the bottom right) element of the sub-window.

Figure 37:
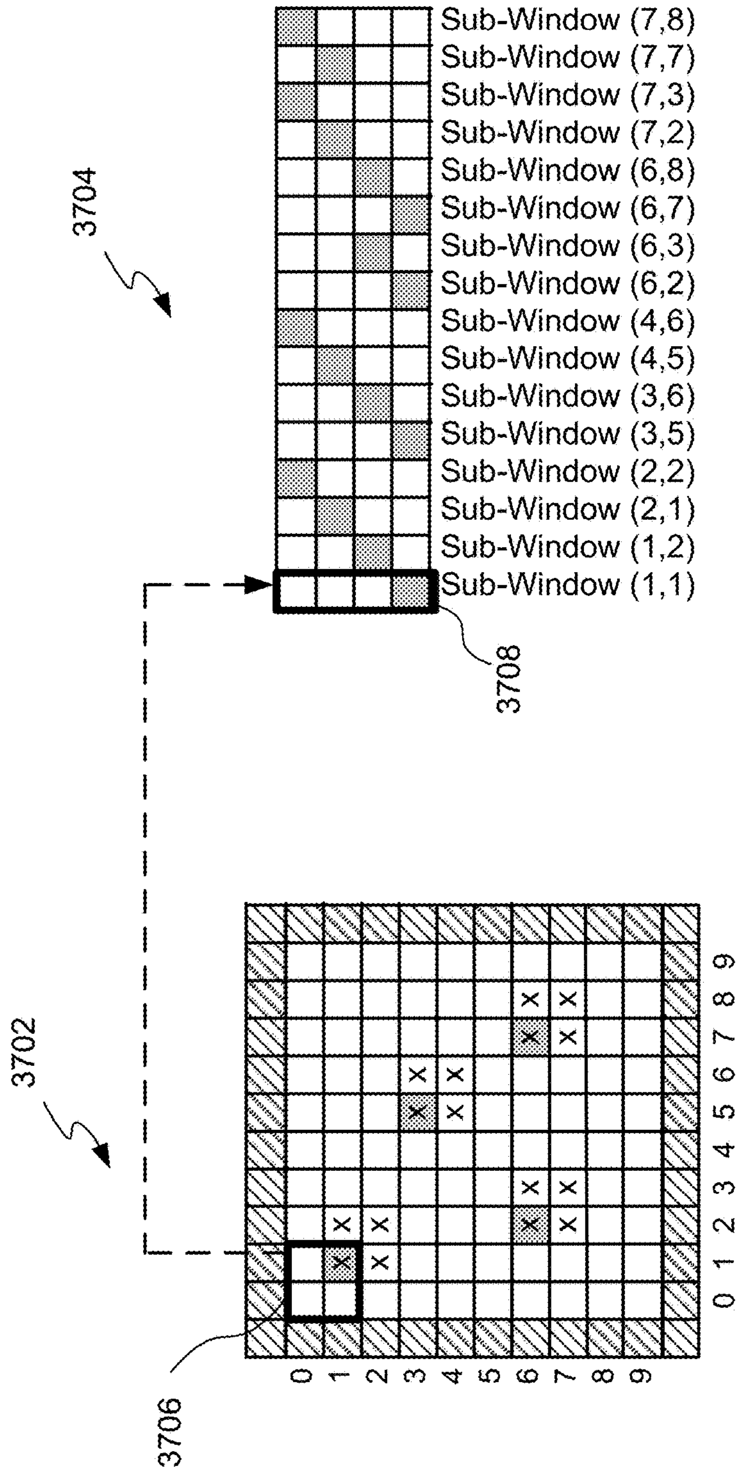
FIG. 37 is a schematic diagram illustrating an example indexed unfold operation performed on an example input tensor to generate an input matrix to perform an example deconvolution.

For example, FIG. 37 illustrates an example padded input tensor 3702 to a 3×3 deconvolution with strides of 2. The input tensor 3702 has four active positions (which are shown shaded in grey) and are listed in Table 12. In this example each 3×3 filter will be divided into four 2×2 sub-filters as shown in FIG. 24, thus each sub-window will be a 2×2 window and the sub-windows will be spaced apart by one element. Therefore in this example, each active position will belong to four 2×2 sub-windows. The bottom right position of each of the four sub-windows can be determined from the H, W position of the active position as follows: sub-window 1: (H, W), sub-window 2: (H, W+1), sub-window 3: (H+1, W), sub-window 4: (H+1, W+1). For example, active position (1,1) belongs to the four sub-windows with a last element (1,1), (1,2), (2,1) and (2,2). The sub-windows that each active position of the input tensor of FIG. 37 belongs to is shown in Table 12. Each of these identified sub-windows comprises at least one active position thus each of these sub-windows is a non-zero sub-window. The bottom-right position of each non-zero sub-window is identified by an ‘x’ in FIG. 37.

TABLE 12

| Active Positions of Input Tensor | Last Element of Each Sub-Window Active Position Forms Part of | Corresponding Positions of Output Tensor |
|---|---|---|
| (1, 1) | (1, 1) | Sub-Filter 1 - (2, 2)<br>Sub-Filter 2 - (2, 3)<br>Sub-Filter 3 - (3, 2)<br>Sub-Filter 4 - (3, 3) |
| | (1, 2) | Sub-Filter 1 - (2, 4)<br>Sub-Filter 2 - (2, 5)<br>Sub-Filter 3 - (3, 4)<br>Sub-Filter 4 - (3, 5) |
| | (2, 1) | Sub-Filter 1 - (4, 2)<br>Sub-Filter 2 - (4, 3)<br>Sub-Filter 3 - (5, 2)<br>Sub-Filter 4 - (5, 3) |
| | (2, 2) | Sub-Filter 1 - (4, 4)<br>Sub-Filter 2 - (4, 5)<br>Sub-Filter 3 - (5, 4)<br>Sub-Filter 4 - (5, 5) |
| (3, 5) | (3, 5) | Sub-Filter 1 - (6, 10)<br>Sub-Filter 2 - (6, 11)<br>Sub-Filter 3 - (7, 10)<br>Sub-Filter 4 - (7, 11) |
| | (3, 6) | Sub-Filter 1 - (6, 12)<br>Sub-Filter 2 - (6, 13)<br>Sub-Filter 3 - (7, 12)<br>Sub-Filter 4 - (7, 13) |
| | (4, 5) | Sub-Filter 1 - (8, 10)<br>Sub-Filter 2 - (8, 11)<br>Sub-Filter 3 - (9, 10)<br>Sub-Filter 4 - (9, 11) |
| | (4, 6) | Sub-Filter 1 - (8, 12)<br>Sub-Filter 2 - (8, 13)<br>Sub-Filter 3 - (9, 12)<br>Sub-Filter 4 - (9, 13) |
| (6, 2) | (6, 2) | Sub-Filter 1 - (12, 4)<br>Sub-Filter 2 - (12, 5)<br>Sub-Filter 3 - (13, 4)<br>Sub-Filter 4 - (13, 5) |
| | (6, 3) | Sub-Filter 1 - (12, 6)<br>Sub-Filter 2 - (12, 7)<br>Sub-Filter 3 - (13, 6)<br>Sub-Filter 4 - (13, 7) |
| | (7, 2) | Sub-Filter 1 - (14, 4)<br>Sub-Filter 2 - (14, 5)<br>Sub-Filter 3 - (15, 4)<br>Sub-Filter 4 - (15, 5) |
| | (7, 3) | Sub-Filter 1 - (14, 6)<br>Sub-Filter 2 - (14, 7)<br>Sub-Filter 3 - (15, 6)<br>Sub-Filter 4 - (15, 7) |
| (6, 7) | (6, 7) | Sub-Filter 1 - (12, 14)<br>Sub-Filter 2 - (12, 15)<br>Sub-Filter 3 - (13, 14)<br>Sub-Filter 4 - (13, 15) |
| | (6, 8) | Sub-Filter 1 - (12, 16)<br>Sub-Filter 2 - (12, 17)<br>Sub-Filter 3 - (13, 16)<br>Sub-Filter 4 - (13, 17) |
| | (7, 7) | Sub-Filter 1 - (14, 14)<br>Sub-Filter 2 - (14, 15)<br>Sub-Filter 3 - (15, 14)<br>Sub-Filter 4 - (15, 15) |
| | (7, 8) | Sub-Filter 1 - (14, 16)<br>Sub-Filter 2 - (14, 17)<br>Sub-Filter 3 - (15, 16)<br>Sub-Filter 4 - (15, 17) |

Once the non-zero sub-windows have been identified, the elements forming each unique non-zero sub-window may be extracted from the input tensor and placed in the input matrix. It is noted that more than one active position may belong to the same non-zero sub-window, but the elements of that sub-window only need to be placed in the input matrix once. This may be implemented by, for example, indexing each unique non-zero sub-window (e.g. from 0 to the number of unique non-zero sub-windows) and, for each non-zero sub-window, identifying the elements in that non-zero sub-window using one or more nested loops. There may be one loop for each dimension of the sub-window. For example, where the sub-window is a 2D window with height and width dimensions there may be a height loop and a width loop. Specifically, when the deconvolution is a 2D deconvolution and the sub-windows are 2D, an offset may be created for the height and the width dimensions that is equal to $$\left\lceil \frac{k-1}{2} \right\rceil$$

where k is the size of the sub-kernel in that dimension, and then the height loop may be configured to loop from Y-offset_y to Y, the width loop may be configured to loop from X-offset_x to X where Y,X is the bottom right corner of the sub-window. If the sub-windows are 3D and have more than one channel, a channel loop may be configured to loop through the channels. The element at each identified position is then copied into the appropriate position of the input matrix.

For example, as described above, the bottom right corner of each non-zero sub-window is identified in FIG. 37 by an ‘x’. Accordingly, for each ‘x’ identified in the input tensor 3702, the elements forming a 2×2 window where the bottom right corner of the window is that ‘x’ position are extracted and placed in a column of the input matrix 3704. For example, for the first ‘x’ at (1,1), the elements forming a 2×2 sub-window 3706 with the bottom right corner at (1,1) are extracted from the input tensor 3702 and are placed in the first column 3708 of the input matrix 3704. In this example the elements in a sub-window are unrolled from left to right and top to bottom, such that the element in the top left corner of the sub-window is placed in the first row and the element in the bottom right of the sub-window is placed in the last or fourth row. However, it will be evident to a person of skill in the art that this is an example only. Since in this example, there are sixteen non-zero sub-windows (4 per active position of the input tensor 3702), the input matrix 3704 comprises sixteen columns.

In some cases, in addition to receiving the input tensor in dense format, the active positions, and one or more deconvolution parameters, the indexed unfold operation may also receive a zeroed input matrix with the desired shape (e.g. height=elements per sub-kernel×number of channels of input tensor, width=number of non-zero sub-windows) and the GPU may be configured to write the non-zero sub-window elements to the appropriate location in the input matrix.

Once the GPU has performed an indexed unfold operation on the input tensor to generate an input matrix with the elements of each unique non-zero sub-window of the input tensor, the method 3600 proceeds to block 3608.

At block 3608, the GPU performs a matrix multiplication operation (which may be referred to as a MatMul operation) between a weight matrix and the input matrix generated in block 3606 to generate an output matrix.

Figure 38:
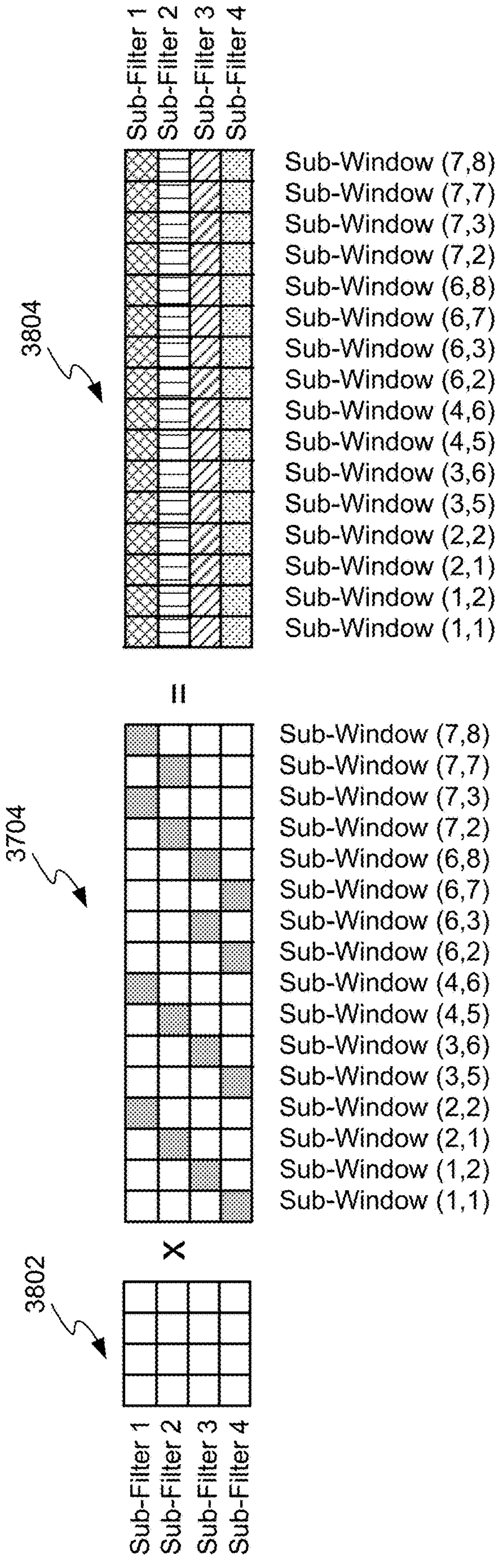
FIG. 38 is a schematic diagram illustrating a matrix multiplication between the input matrix of FIG. 37 and a weight matrix to perform an example deconvolution.

FIG. 38 illustrates an example matrix multiplication between an example weight matrix 3802 and the input matrix 3704 of FIG. 37. The weight matrix may comprise a row for each sub-filter, and a column for each weight in a sub-filter. In the example shown in FIGS. 37-39 there are four 2×2 sub-filters (so 4 weights per sub-filter). Therefore the weight matrix 3802 comprises four rows and four columns. Each column corresponds to a position in a sub-filter and the weights of a sub-filter are placed in the columns in accordance with their place in the sub-filter. In the example shown in FIG. 38 the weights in a sub-filter are unrolled from left to right and top to bottom, such that the weight in the top left corner of a sub-filter is placed in the first column, and the weight in the bottom right of the sub-filter is placed in the last column. It will be evident to a person of skill in the art that this is an example only and the weights can be placed in any order in the weight matrix so long as their order corresponds to the order of the elements of each sub-window in the input matrix. Specifically, if element at position (−1,−1) of a sub-window is placed in row 0 of the input matrix, then the weight at position (−1,−1) of the sub-filter would be placed in column 0 of the weight matrix.

The matrix multiplication between the weight matrix 3802 and the input matrix 3704 generates an output matrix 3804 which comprises, for each non-zero sub-window, an output element for each sub-filter. The output matrix 3804 may have a column for each non-zero sub-window and a row for each sub-filter such that each column comprises an output element for the corresponding non-zero sub-window for each sub-filter. In the example shown in FIG. 38 there are sixteen non-zero sub-windows, four sub-filters (per filter) and one output channel (i.e. one filter), so the example output matrix 3804 has fifteen columns and four rows. The matrix multiplication may be parallelised on the GPU, by, for example, processing each column of the input matrix in a separate thread.

Once the GPU has performed the matrix multiplication the method 3600 may end or the method 3600 may proceed to block 3610. Specifically, the output matrix 3804 generated in block 3608 comprises all of the non-zero elements of the output tensor and thus the output matrix 3804 may be simply output, or an output tensor in dense format may be first generated from the output matrix 3804.

At block 3610, the GPU performs an indexed fold operation on the output matrix generated in block 3608 to generate an output tensor in dense format. The indexed fold operation is the opposite of the indexed unfold operation. Specifically, each non-zero sub-window can be mapped to a plurality of positions of the output tensor (one per sub-filter of a filter) and the indexed fold operation uses this information to generate an output tensor in dense format (e.g. a densified output tensor) from the output matrix generated in block 3608. In other words, the indexed fold operation uses this information to generate an output tensor with each element in the output matrix in the correct position and zeros elsewhere.

As described above, a standard fold operation (e.g. a col2im operation) receives an output matrix in dense format—i.e. an output matrix that comprises a row per output channel with an output element for each element of that channel—and converts each row of the received matrix to a plane of the output tensor in accordance with the size of a channel of the output tensor.

In contrast to a standard fold operation, an indexed fold operation receives an output matrix in sparse format—i.e., the received matrix does not comprise a value or element for each element of the output tensor. An indexed fold operation also receives information indicating the plurality of positions of the output tensor associated with each non-zero sub-window. This information may comprise information identifying the active positions in the input tensor (from which the positions of the output tensor associated with each non-zero sub-window can be determined), information identifying the non-zero sub-windows (from which the positions of the output tensor associated with each non-zero sub-window may be determined), or information explicitly identifying the co-ordinates of the positions of the output tensor associated with each non-zero window (which may, for example, be determined as part of block 3606). The received information is then used to place the elements of the sparse output matrix in the correct location of the output tensor in dense format. The elements at all other positions may then be set to zero.

Figure 39:
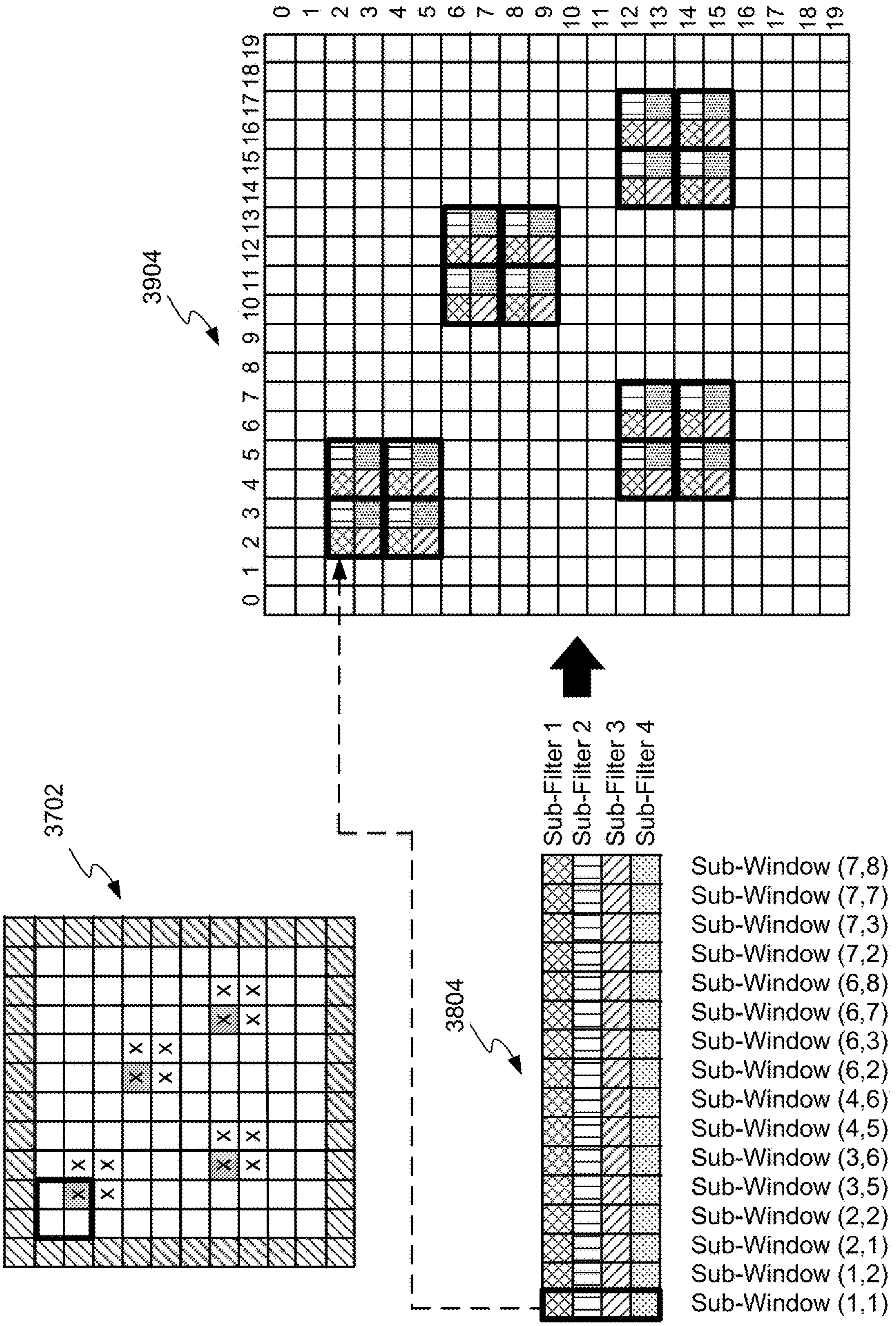
FIG. 39 is a schematic diagram illustrating an indexed fold operation performed on the output matrix of FIG. 38 to perform an example deconvolution.

For example, as described above, the non-zero sub-windows can be identified from the active positions and the deconvolution parameters (e.g. strides, kernel size etc.). Each non-zero sub-window can then be mapped to multiple positions in the output tensor, one for each sub-filter. For example, as shown in FIG. 39 each sub-window of the input tensor 3702 maps to a 2×2 block of positions in the output tensor 3904 (i.e. one position per sub-filter). The top-left position in the 2×2 block corresponds to sub-filter 1, the top-right position in the 2×2 block corresponds to sub-filter 2, the bottom left position of the 2×2 block corresponds to sub-filter 3, and the bottom right position in the 2×2 block corresponds to sub-filter 4. Each sub-window can be mapped to its corresponding 2×2 block in the output tensor based on the position of the sub-window in the input tensor and the deconvolution parameters. In the example shown in FIG. 39 a sub-window with a bottom right position of Y,X is mapped to a 2×2 block of the output where the top-left corner of the 2×2 block in the output is at (stride*Y, stride*X), the top-right corner of the 2×2 block in the output is at (stride*Y, stride*X+1), the bottom left corner of the 2×2 block in the output is at (stride*Y+1, stride*X), and the bottom right corner of the 2×2 block in the output is at (stride*Y+1, stride*X+1). For example, with a stride of 2, a sub-window with a bottom right position of (1,1) is mapped to a 2×2 block of the output tensor comprising positions (2,2), (2,3), (3,2) and (3,3).

Table 12 illustrates a mapping between each of the non-zero sub-windows and the corresponding 2×2 block in the output tensor, and FIG. 39 shows the final output tensor in dense format 3904 that is generated from the output matrix 3804 of FIG. 38 in accordance with those sub-window-output position mappings. Although it has been described that a sub-window is identified by the bottom right (or last) position of the sub-window, it will be evident to a person of skill in the art that this is an example only, and other positions in a sub-window (e.g. the first or middle positions) may be used to (i) identify that sub-window; and (ii) identify the corresponding positions in the output tensor. This mapping between non-zero sub-windows and positions in the output tensor may be performed as part of block 3606 or as part of block 3610.

The indexed fold operation may be implemented on the GPU by, for example, creating an index for each non-zero sub-window (e.g. from 0 to n where there are n+1 non-zero sub-windows). For each non-zero sub-window, the GPU may then be configured to determine the associated locations in the output tensor from a location in that sub-window (e.g. the bottom right of the sub-window) and the deconvolution parameters, then loop through each sub-filter and place or copy the element of the output matrix corresponding to that sub-filter in the determined location of the output tensor.

Each non-zero sub-window may get its own thread so that the indexed fold operation can be performed in parallel on the GPU.

In some cases, in addition to receiving information indicating the positions of the output tensor associated with each non-zero sub-window, the deconvolution parameters and the output matrix generated in block 3608, the indexed fold operation may also receive a zeroed output tensor of the appropriate dimensions and may write the elements of the received matrix to the received output tensor. In these cases, a zero does not have to be explicitly placed in the positions of the output tensor not associated with a non-zero sub-window.

Once the indexed fold operation has been performed, the method 3600 may end.

GPU Implementations of Sparse Submanifold Deconvolutions

A sparse submanifold deconvolution is similar to a sparse submanifold convolution in that not all of the elements of the output tensor are generated. However, where the outputs that are generated for a sparse submanifold convolution are driven by the active positions in the input tensor, the outputs that are generated for a sparse submanifold deconvolution are driven by the desired active positions in the output tensor, which may be referred to as the scatter positions or the target positions.

The inventors have determined that sparse submanifold 2D and 3D deconvolutions can be performed efficiently on a GPU by using similar indexed unfold and fold operations as those described above with respect to the method 500 of FIG. 5 to implement a sparse submanifold convolution on a GPU.

Figure 40:
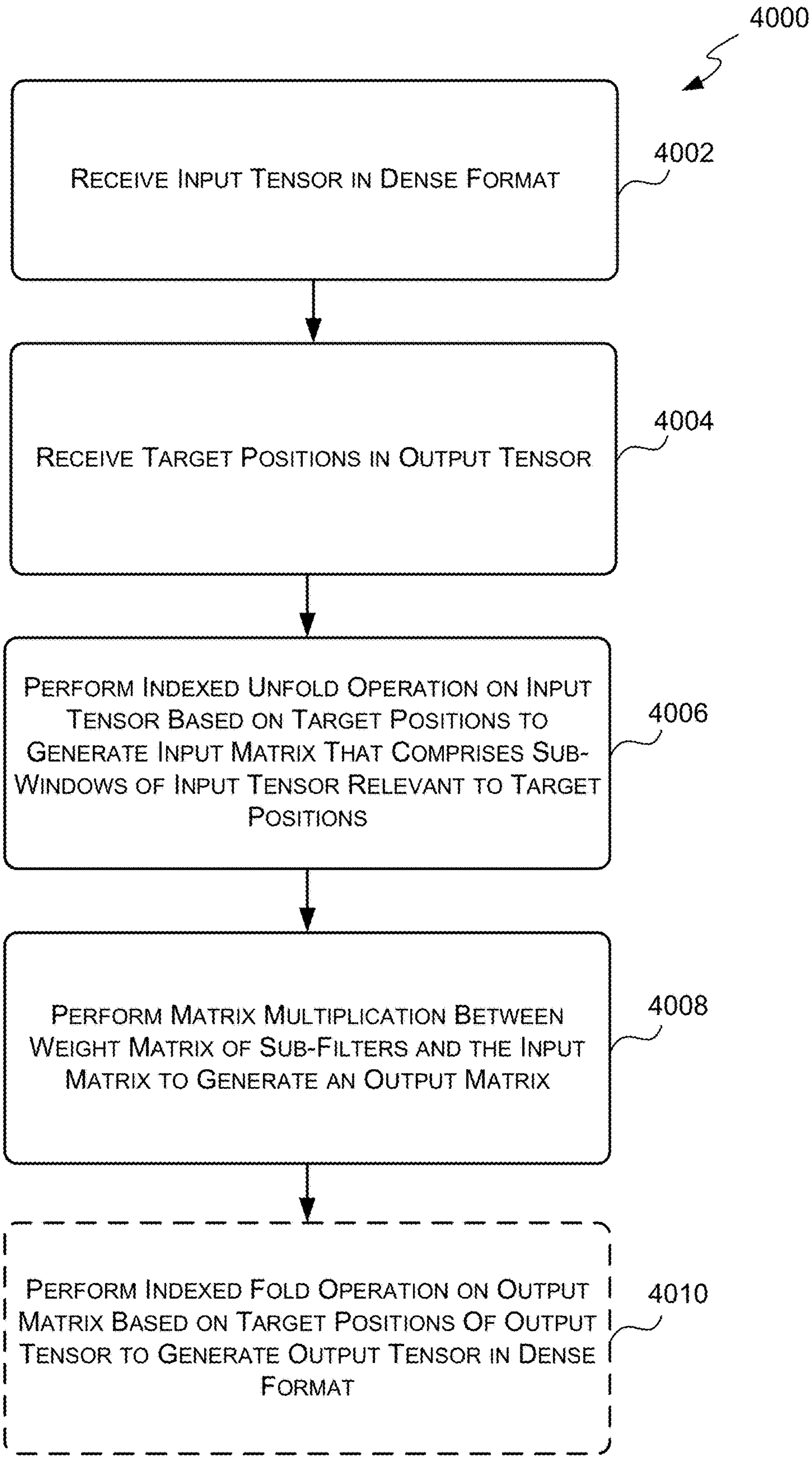
FIG. 40 is a flow diagram of an example method of implementing a sparse submanifold deconvolution using a GPU.

Reference is now made to FIG. 40 which illustrates an example method 4000 of implementing a sparse submanifold deconvolution on a GPU. The method 4000 begins at block 4002 where an input tensor in dense format is received at the GPU. As described above, an input tensor in dense format, which may also be referred to as a densified input tensor, comprises every element of the complete input tensor, regardless of whether that element is at an active position. In contrast, an input tensor in sparse format only comprises the elements of the input tensor in dense format that are at an active position. Once the input tensor in dense format has been received, the method 4000 proceeds to block 4004.

At block 4004, the GPU receives information identifying the active positions of the output tensor, which may be referred to as the target positions of the output tensor or the scatter positions. Each active location or position may be identified by a set or pair of indices-a height or row index, and a width or column index.

Figure 41:
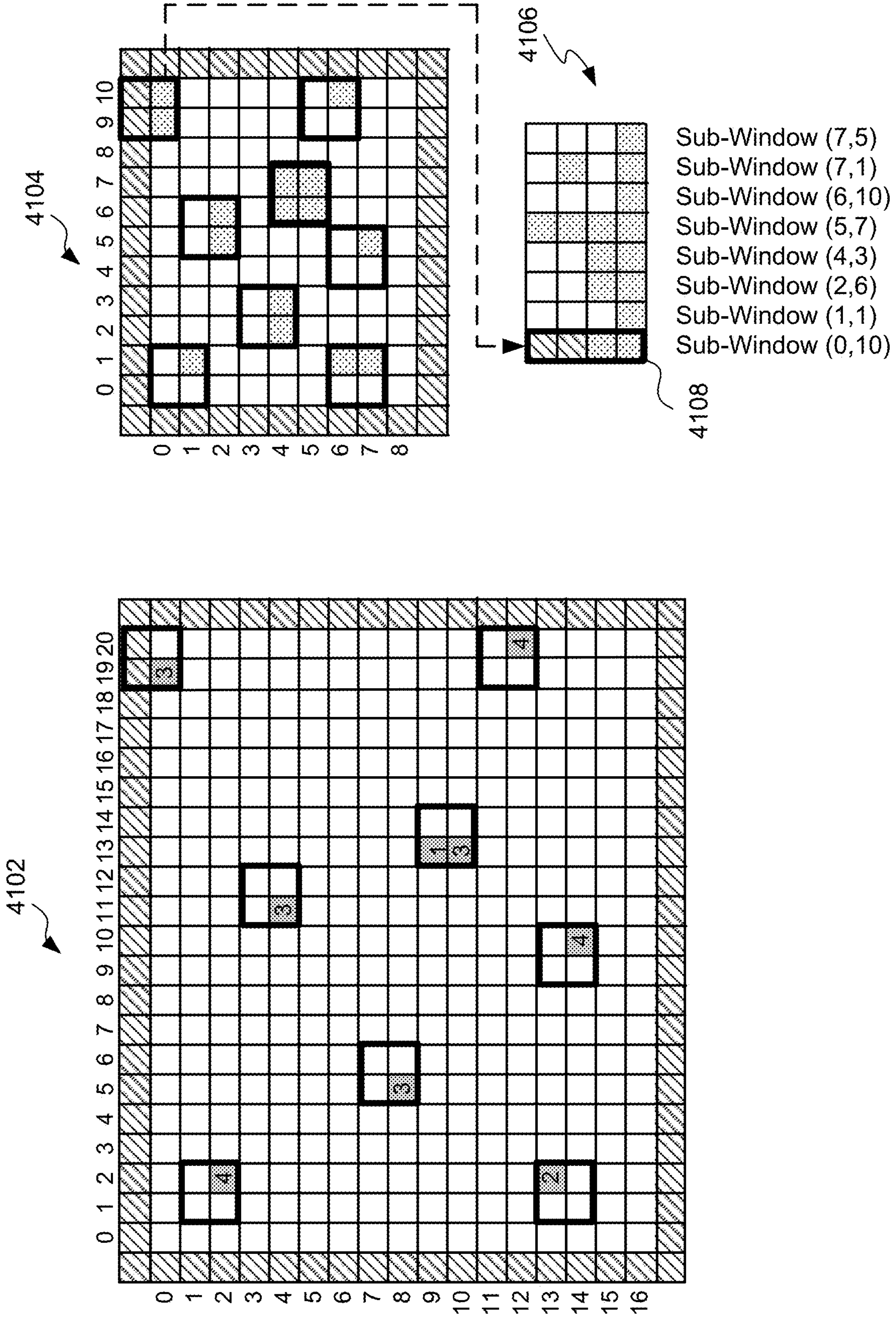
FIG. 41 is a schematic diagram illustrating an example indexed unfold operation performed on an input tensor to generate an input matrix to implement an example sparse submanifold deconvolution.

For example, the GPU may receive information indicating that the nine positions of the output tensor 4102 of a 3×3 deconvolution with strides of 2 shown in grey in FIG. 41 are to be generated. These target positions are listed below in Table 13.

Once the active locations or positions in the output tensor have been received, the method 4000 proceeds to block 4006.

At block 4006, the GPU performs an indexed unfold operation (which may also be referred to as a sparse submanifold deconvolution unfold operation) on the received input tensor based on the active locations or positions of the output tensor identified in block 4004 to generate an input matrix that comprises the elements of the sub-windows of the input tensor that generate the identified output positions. As described above, a deconvolution can be implemented by performing a direct convolution between the input tensor and each of a plurality of sub-filters and interleaving the results of the direct convolutions. The sub-windows for a deconvolution are based on the size of the sub-filters. As described above, the size of the sub-filters is based on the size of the filters and the strides of the deconvolution. For example, as described above with respect to FIG. 34, a 3×3 deconvolution with a stride of two in both the width and height dimensions has four 2×2 sub-filters per filter. Therefore, in that example, each sub-window of the input tensor is a 2×2 window.

Performing an indexed unfold operation may comprise, identifying, from the active locations or positions of the output tensor identified in block 4004 and the deconvolution parameters (e.g. strides, dilation, kernel size), the sub-window of the input tensor and the sub-filter used to generate each active position of the output tensor; and, for each identified sub-window, extracting the elements of that sub-window from the input tensor and placing them in the input matrix. In some cases, the input matrix may comprise a column for each identified sub-window and a row for each position in a sub-window and all of the elements that form a sub-window are placed in the same column. In some cases, the elements in a sub-window are unrolled from left to right and top to bottom, such that the element in the top left corner of the sub-window is placed in the first row, and the element in the bottom right of the sub-window is placed in the last row. However, it will be evident to a person of skill in the art that this is an example only.

The indexed unfold operation may be implemented on the GPU in any suitable manner. In one example, the GPU may be configured to, for each identified active position in the output, determine from the parameters of the deconvolution (kernel dimensions, strides, dilation), which sub-window of the input tensor and which sub-filter of the plurality of sub-filters are used to generate the element(s) at that output position. Each sub-window may be identified by a particular location in the sub-window, such as, but not limited to, the first (e.g. top-left) element of the sub-window, middle element of the sub-window, or the last (e.g. the bottom right) element of the sub-window.

For example, FIG. 41 illustrates an example padded input tensor 4104 from which the identified active positions in the output tensor 4102 are to be generated. In this example each 3×3 filter will be divided into four 2×2 sub-filters as shown in FIG. 24, thus each sub-window will be a 2×2 window and the sub-windows will be spaced apart by one element in the height and width dimensions. Each sub-window of the input tensor 4102 will generate a 2×2 block of output elements (one element for each sub-filter). The element related to the first sub-filter will be in the top left corner of the 2×2 block of output elements, the element related to the second sub-filter will be in the top right corner of the 2×2 block of output elements, the element related to the third sub-filter will be in the bottom left corner of the 2×2 block of output elements, and the element related to the fourth sub-filter will be in the bottom right corner of the 2×2 block of output elements. Thus the output tensor can be divided into 2×2 blocks wherein each element within a block is generated by the same sub-window of the input, but a different sub-filter.

If each 2×2 block of the output tensor is defined by its bottom right position, then the 2×2 block that an active position in the output tensor belongs to will have a bottom right position defined by the nearest multiple of two greater than or equal to the indices. For example, the active position (2,2) has two even indices so the relevant 2×2 block has a bottom right position of (2,2); and the active position (4,11)

has one even index and one odd index so the relevant 2×2 block has a bottom right position of (4, 12). The 2×2 block of the output to which each active position of the output belongs is shown in FIG. 41 and listed in Table 13.

TABLE 13

| Active Positions of Output Tensor | Relevant 2 × 2 Block of Output Tensor (bottom-right element) | Relevant 2 × 2 Sub-Window of Input Tensor (bottom-right element) | Sub-Filter |
|---|---|---|---|
| (0, 19) | (0, 20) | (0, 10) | 3 |
| (2, 2) | (2, 2) | (1, 1) | 4 |
| (4, 11) | (4, 12) | (2, 6) | 3 |
| (8, 5) | (8, 6) | (4, 3) | 3 |
| (9, 13) | (10, 14) | (5, 7) | 1 |
| (10, 13) | (10, 14) | (5, 7) | 3 |
| (12, 20) | (12, 20) | (6, 10) | 4 |
| (13, 2) | (14, 2) | (7, 1) | 2 |
| (14, 10) | (14, 10) | (7, 5) | 4 |

The relevant 2×2 sub-window of the input tensor can then be identified from the relevant 2×2 block of the output tensor by dividing the indices of the relevant 2×2 block of the output tensor by the stride (e.g. 2) in this example. For example, the relevant 2×2 sub-window of the tensor for an element that belongs to a 2×2 block of the output defined by (0,20) is the 2×2 sub-window of the input tensor defined by (0, 10). The 2×2 sub-window of the input tensor relevant to each active position in the output tensor is shown in FIG. 41 and listed in Table 13.

The sub-filter that is relevant to an active position of the output tensor is based on where that active position is located within its relevant 2×2 block of the output tensor. If an active position is in the upper left corner of a block of the output tensor then sub-filter 1 is relevant, if an active position is the upper right corner of a block of the output tensor then sub-filter 2 is relevant, if an active position is in the lower left corner of a block of the output tensor then sub-filter 3 is relevant, and if an active position is in the lower right corner of a block of the output tensor then sub-filter 4 is relevant. The sub-filter relevant to each active position in the output tensor is shown in FIG. 41 and listed in Table 13.

Once the relevant sub-windows and sub-filters have been identified, the elements forming each identified sub-window are extracted from the input tensor and placed in the input matrix. This may be implemented by, for example, indexing each unique relevant sub-window (e.g. from 0 to the number of relevant sub-windows) and, for each unique relevant sub-window, identifying the elements in that sub-window using a plurality of nested loops, one for each dimension of the sub-windows. Where the for example, the sub-window is two dimensional with a height dimension and a width dimension there may be one offset loop for the height dimension and another for the width dimension. Specifically, for a 2D sparse submanifold deconvolution with 2D sub-filters with a height dimension and a width dimension an offset may be created for each of the height and width dimensions that is equal to $$\left\lceil \frac{k-1}{2} \right\rceil$$

where k is the size of the sub-filter in that dimension, and then the height loop may be configured to loop from Y-offset_y to Y, and the width loop may be configured to loop from X-offset_x to X where Y,X is the bottom right corner of the sub-window. Where the sub-windows are 3D and comprise more than one channel, there may also be a channel loop that loops through the channels. The element of the input tensor at each identified position is then copied into the appropriate position of the input matrix.

For example, for each relevant sub-window of the input tensor 4104 identified in FIG. 41 and Table 13, the elements forming that sub-window are extracted from the input tensor 4104 and placed in a column of the input matrix 4106. For example, the sub-window relevant to the first active position (0,19) of the output tensor 4102 is the sub-window of the input tensor 4104 with a bottom-right position of (0,10), so the elements forming that 2×2 sub-window are extracted from the input tensor 4104 and placed in the first column 4108 of the input matrix 4106. In this example the elements in a sub-window are unrolled from left to right and top to bottom, such that the element in the top left corner of the sub-window is placed in the first row and the element in the bottom right of the sub-window is placed in the last or fourth row. However, it will be evident to a person of skill in the art that this is an example only. Since in this example, there are eight unique relevant sub-windows, the input matrix 4106 comprises eight columns.

In some cases, in addition to receiving the input tensor in dense format, and the active positions of the output tensor, the indexed unfold operation may also receive a zeroed input matrix with the desired shape (e.g. height=elements per sub-kernel×number of input channels, width=number of unique relevant sub-windows) and the GPU may be configured to write the sub-window elements to the appropriate location in the input matrix.

Once the GPU has performed an indexed unfold operation on the input tensor to generate an input matrix with the elements of each relevant sub-window of the input tensor, the method 4000 proceeds to block 4008.

At block 4008, the GPU performs a matrix multiplication operation (which may be referred to as a MatMul operation) between a weight matrix and the input matrix generated in block 4006 to generate an output matrix.

Figure 42:
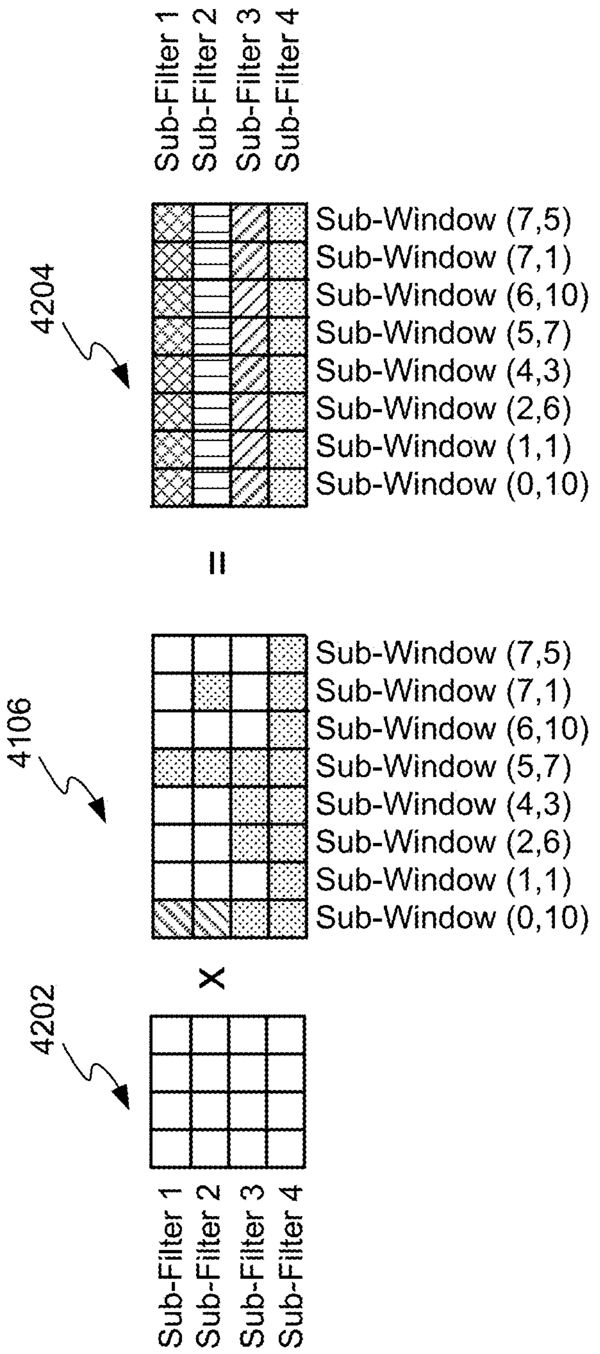
FIG. 42 is a schematic diagram illustrating a matrix multiplication between the input matrix of FIG. 41 and a weight matrix to implement an example sparse submanifold deconvolution.

FIG. 42 illustrates an example matrix multiplication between an example weight matrix 4202 and the input matrix 4106 of FIG. 41. The weight matrix may comprise a row for each relevant sub-filter, and a column for each weight in a sub-filter. In the example shown in FIGS. 41-43 there are four 2×2 sub-filters (so 4 weights per sub-filter) and each sub-filter is relevant to at least one target position of the output tensor. Therefore the weight matrix 4202 comprises four rows and four columns. Each column corresponds to a position in a sub-filter and the weights of a filter are placed in the columns in accordance with their place in the sub-filter. In the example shown in FIG. 42 the weights in a sub-filter are unrolled from left to right and top to bottom, such that the weight in the top left corner of a sub-filter is placed in the first column, and the weight in the bottom right of the sub-filter is placed in the last column. It will be evident to a person of skill in the art that this is an example only and the weights can be placed in any order in the weight matrix so long as their order corresponds to the order of the elements of each sub-window in the input matrix. Specifically, if element at position (−1,−1) of a sub-window is placed in row 0 of the input matrix, then the weight at position (−1,−1) of the sub-filter would be placed in column 0 of the weight matrix.

The matrix multiplication between the weight matrix 4202 and the input matrix 4106 generates an output matrix

4204 which comprises, for each relevant sub-window, an output element for each relevant sub-filter. The output matrix 4204 may have a column for each relevant sub-window and a row for each sub-filter such that each column comprises an output element for the corresponding relevant sub-window for each relevant sub-filter. In the example shown in FIG. 42 there are eight relevant sub-windows and four relevant sub-filters, so the example output matrix 4204 has eights columns and four rows. The matrix multiplication may be parallelised on the GPU, by, for example, processing each column of the input matrix in a separate thread.

Once the GPU has performed the matrix multiplication the method 4000 may end or the method 4000 may proceed to block 4010. Specifically, the output matrix 4204 generated in block 4008 comprises all of the elements at the target positions of the output tensor and thus the output matrix 4204 may be simply output, or an output tensor in dense format may be first generated from the output matrix 4204.

At block 4010, the GPU performs an indexed fold operation on the output matrix generated in block 4008 to generate an output tensor in dense format. The indexed fold operation is the opposite of the indexed unfold operation. Specifically, the indexed fold operation uses the target output positions, and the relevant sub-filter information to generate an output tensor in dense format (e.g. a densified output tensor) from the output matrix generated in block 4008. In other words, the indexed fold operation generates an output tensor with the desired elements from the output matrix in the correct position and zeros elsewhere.

As described above, a standard fold operation (e.g. a col2im operation) receives an output matrix in dense format—i.e. an output matrix that comprises a row per output channel with an output element for each element of that channel—and converts each row of the received matrix to a plane of the output tensor in accordance with the size of a channel of the output tensor.

In contrast to a standard fold operation, an indexed fold operation receives an output matrix in sparse format—i.e., the received matrix does not necessarily comprise a value or element for each element of the output tensor. An indexed fold operation to implement a sparse submanifold deconvolution also receives information (e.g. indices) indicating the target positions in the output tensor and information indicating the relevant sub-filter for each desired position in the output tensor (this may be the relevant sub-filter, if computed in block 4006, or information (such as the deconvolution parameters (e.g. kernel size, strides etc.)) which can be used to determine the relevant sub-filter for an active position in the output tensor). The target location/position information and the information indicating the sub-filter relevant to each target position are used to identify the desired elements of the sparse output matrix and place them in the correct location of the output tensor in dense format. The elements at all other positions may then be set to zero.

Figure 43:
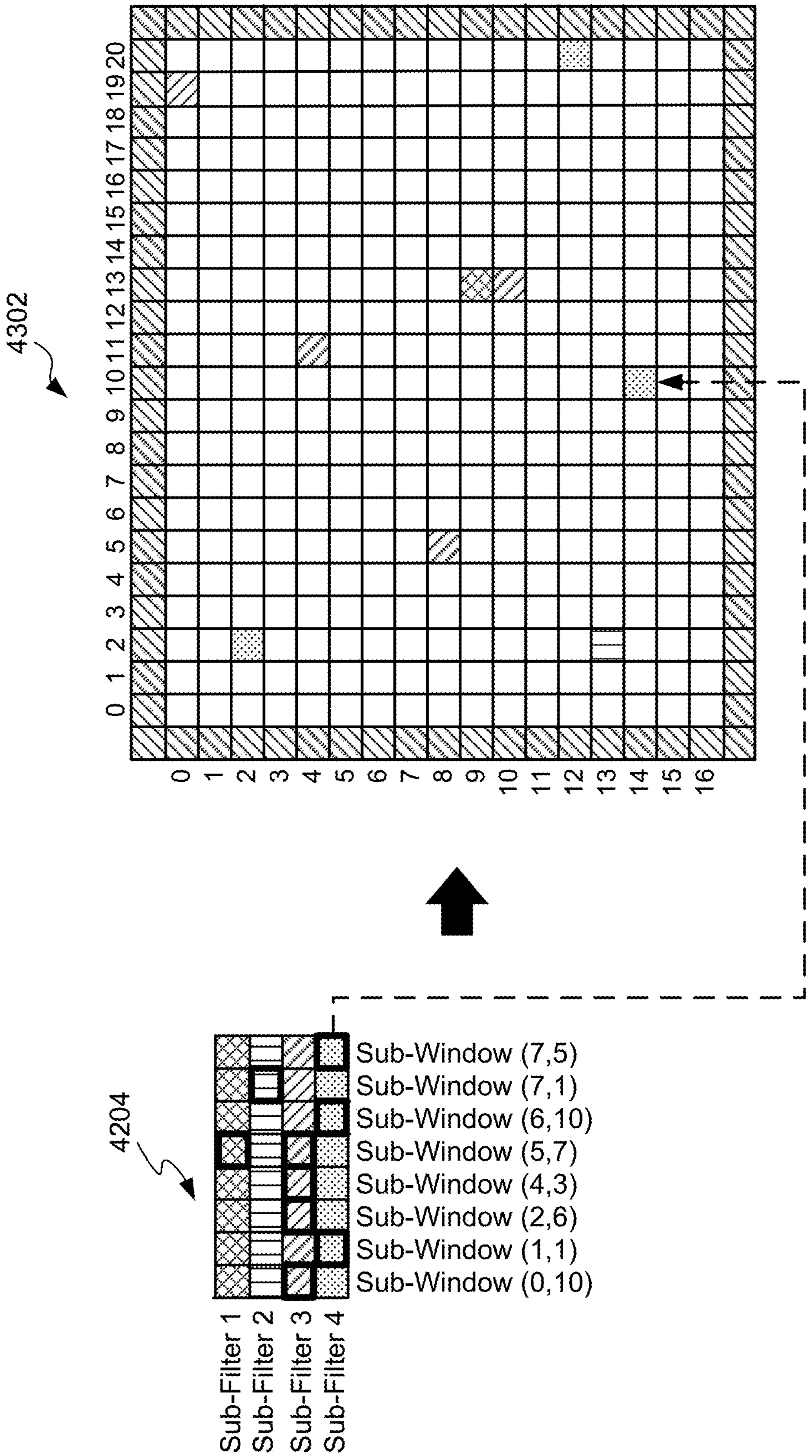
FIG. 43 is a schematic diagram illustrating an indexed fold operation performed on the output matrix of FIG. 42 to implement an example sparse submanifold deconvolution.

The indexed fold operation may be implemented on the GPU by, for example, creating an index for each active position in the output tensor (e.g. from 0 to n where there are n+1 active positions in the output tensor). For each active position in the output tensor, the GPU may then be configured to select the appropriate element from the output tensor and place it at that active position in a channel of the output tensor. For example, FIG. 43 illustrates which elements are selected from the output matrix 4204 and where they are placed in the final output tensor 4302.

In some cases, in addition to receiving the target output positions, and information indicating the relevant sub-filters, the deconvolution parameters and the output matrix generated in block 4008, the indexed fold operation may also receive a zeroed output tensor of the appropriate dimensions and may write the elements of the received output matrix to the received output tensor. In such cases, a zero may not be explicitly placed at the non-target positions of the output tensor.

Once the indexed fold operation has been performed, the method 4000 may end.

Neural Network

Any of the methods described above for implementing a convolution or a deconvolution may be implemented as part of processing data in accordance with a neural network to, for example, perform a signal processing task such as, but not limited to, an image processing task or a computer vision task. For example, the method of FIG. 5 or the method of FIG. 13 may be used to implement a sparse submanifold 2D or 2D convolution layer of a neural network; the method of FIG. 21 may be used to implement a standard 2D or 3D convolution layer of a neural network; the method of FIG. 36 may be used to implement a standard 2D or 3D deconvolution layer; and the method of FIG. 40 may be used to implement a sparse submanifold 2D or 3D deconvolution layer. The method of FIG. 36 may also be used in performing a backward pass of a neural network to implement the reverse operation of a 2D or 3D convolution layer in the neural network. Similarly, the method of FIG. 40 may also be used in performing a backward pass of a neural network to implement the reverse operation of a 2D or 3D sparse submanifold convolution layer in the neural network.

The methods described above have proven particularly efficient, in terms of time and computing resources, at performing convolutions and deconvolutions on highly sparse input data (e.g. above 80% sparsity).

Example NNA

Figure 44:
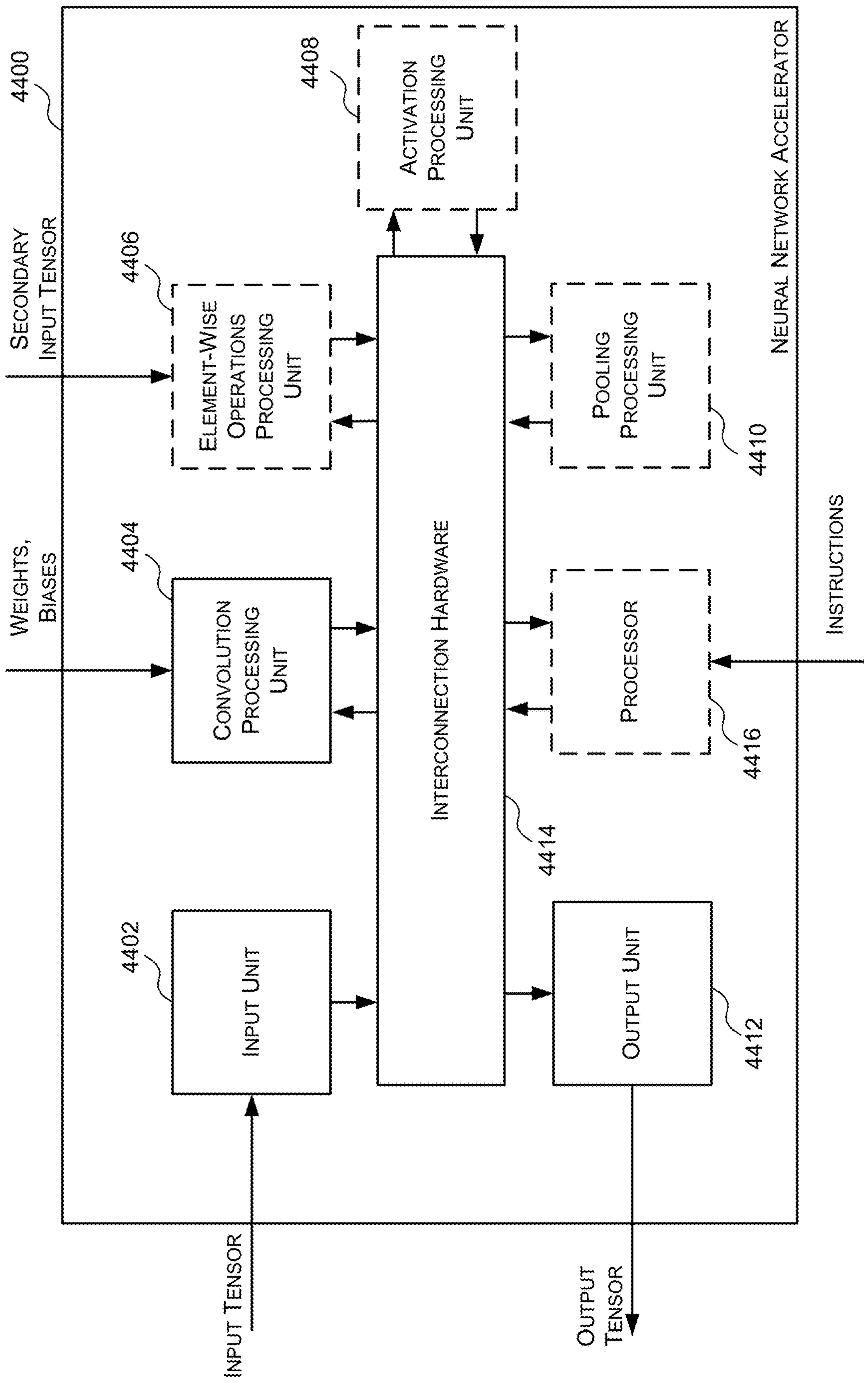
FIG. 44 is a block diagram of an example neural network accelerator for implementing any of the NNA-based methods described herein.

Reference is now made to FIG. 44 which illustrates an example neural network accelerator (NNA) 4400 suitable for implementing the NNA-based methods described herein (e.g. the methods described with respect to FIG. 13). The neural network accelerator 4400 comprises an input unit 4402, a plurality of processing units 4404, 4406, 4408, 4410, an output unit 4412, and interconnection hardware 4414 which statically or dynamically connects the other units (e.g. the input unit 4402, the processing units 4404, 4406, 4408, 4410 and the output unit 4412). The NNA 4400 is configured to: receive input data (an input tensor), implement all or a portion of one or more layers of a neural network by processing the input data (input tensor) using one or more of the processing units to generate output data (an output tensor), and output the output data (output tensor) from the NNA. The receiving of input data at the NNA and processing it using one or more processing units is referred to as a hardware pass of the NNA. It may take one or more hardware passes of an NNA to implement a neural network. For example, in a first hardware pass input data may be input to the NNA for processing in accordance with a convolution layer by the convolution processing unit, and then the output of the first hardware pass may be input to the NNA in a second hardware pass and processed in accordance with a pooling layer by the pooling processing unit. A neural network may be mapped to hardware passes of an NNA in any suitable manner.

The input unit 4402 is hardware configured to receive and store the input data to the neural network accelerator 4400. The input data may be received from external memory (i.e., memory external to the NNA 4400). In some examples, the input unit 4402 may comprise one or more buffers to store the received input data. Although the example NNA 4400 of FIG. 44 comprises a single input unit 4402, other example NNAs may comprise multiple input units. The term "input data to the NNA" is used herein to mean the input data to be processed by one or more processing units (which may or may not be equivalent to the input data to a layer of a neural network) and may be distinguished from other parameters used in a neural network such as weights, biases, etc. In some cases, the other input parameters may be input to the NNA in another manner (e.g. loaded into an internal or external storage unit associated with a specific processing unit). For example, the weights and biases for a convolution layer may be loaded into a buffer linked to, or forming part of, the convolution processing unit 4404.

Each processing unit 4404, 4406, 4408, 4410, is itself an accelerator configured to accelerate performing one or more neural network operations on input data. Specifically, each processing unit 4404, 4406, 4408, 4410 is configured to receive an input tensor and perform, via hardware logic, one or more operations on the input tensor to generate an output tensor. The NNA 4400 of FIG. 44 comprises a convolution processing unit 4404 that is configured to accelerate convolution operations. An example implementation of a convolution processing unit 4404 is described with respect to FIGS. 45 and 46. However, the NNA 4400 may comprise one or more other processing units. For example, the NNA 4400 may additionally comprise one or more of an element-wise operations processing unit 4406 which is configured to accelerate performing per-element operations on an input tensor such as addition, multiplication etc and may receive a secondary input tensor which can be used to implement the per-element operation, an activation processing unit 4408 which is configured to accelerate non-linear operations, and a pooling processing unit 4410 which is configured to accelerate a pooling operation.

The element-wise operations processing unit 4406 is hardware configured to receive input data (e.g. an input tensor) and perform an element-wise operation on the input data (e.g. input tensor), optionally with another data set (e.g. another tensor) which may be obtained or retrieved from external memory (e.g. memory external to the NNA). An element-wise operation is a same operation that is performed on each element of the input data/tensor (e.g. each input data value or each tensel). Element-wise operations which may be performed on the input data include, but are not limited to, add, multiply, maximum, and minimum.

The other data set/tensor may be the same size (e.g. have the same dimensions) as the input data/tensor such that corresponding elements of the two tensors are combined using an element-wise operation. Alternatively, the other data set/tensor and the input data/tensor may have a different size or dimensions. If, for example, the mismatching dimension of one of the tensors is of size 1, an element-wise operation may be performed between the input data/tensor and the other data set/tensor using a broadcast technique wherein the smaller tensor is broadcast (or expanded) to the size of the other tensor. For example, a tensor of size [N, H, W, C]=[1, 10, 1, 10] can be combined element-wise with a tensor of size [N, H, W, C]=[1, 10, 10, 10] by expanding the W dimension of the first tensor It will be evident to a person of skill in the art that this is just an example set of processing units and that other NNAs may have additional processing units, fewer processing units and/or different processing units depending, for example, on the type of neural networks they are intended to process. In some cases, one or more of the processing units may be combined.

The output unit 4412 is hardware configured to receive the output tensor generated by processing the input data via one or more processing units 4404, 4406, 4408, 4410. In some cases, the output unit 4412 may have a buffer or other storage for temporarily storing all or a portion the output tensor prior to outputting the output tensor from the NNA 4400. In some cases, the output unit 4412 may be configured to save the output tensor in external memory (i.e., memory that is external to the neural network accelerator).

The interconnection hardware 4414 statically or dynamically connects the input unit, one or more processing units, and the output unit to allow input data to the neural network accelerator to flow through (e.g. be processed by) one or more processing units and then be output from the neural network accelerator. In some cases, the interconnection hardware 4414 may comprise fixed hardware connections between the input unit 4402, the processing units 4404, 4406, 4408, 4410 and the output unit 4412 that allow data to flow through the units in a limited number of ways. However, in other cases, the interconnection hardware 4414 may comprises hardware that can dynamically connect the units 4402-4412 of the neural network accelerator in a plurality of different ways in response to one or more control signals. For example, the interconnection hardware 4414 may comprise a crossbar and the units 4402-4412 may be connected to the crossbar in such a manner that the crossbar can dynamically connect the units in a plurality of different ways in response to one or more control signals. For example, in one hardware pass the crossbar may connect the output of the input unit 4402 to the input of the convolution processing unit 4404, connect the output of the convolution processing unit 4404 to the input of the element-wise operations processing unit 4406, and then connect the output of the element-wise operations processing unit 4406 to the input of the output unit 4412 so that the input data for the hardware pass is processed by the convolution processing unit 4404 then the element-wise operations processing unit 4406. In another hardware pass, the crossbar may connect the output of the input unit 4402 to the input of the convolution processing unit 4404, and then the output of the convolution processing unit 4404 to the input of the output unit 4412 so that the input data for the hardware pass is processed only by the convolution processing unit 4404. Accordingly, in these cases the connections between the units 4402-4412 of the neural network accelerator (and thus the manner in which data may flow through the units of the NNA) are not fixed or static.

Although, not shown, the units 4402-4412 and the interconnection hardware 4414 of the NNA may receive control information for each hardware pass indicating which units are to be active or used in the hardware pass and how each active unit and the interconnection hardware 4414 are to be configured for that hardware pass. The control information may also indicate other information such as the formats of the input and output data of the units.

In some cases, the neural network accelerator 4400 may also comprise an embedded processor 4416 which can receive control instructions to perform more complicated operations (such as a scatter-add operations).

Figure 45:
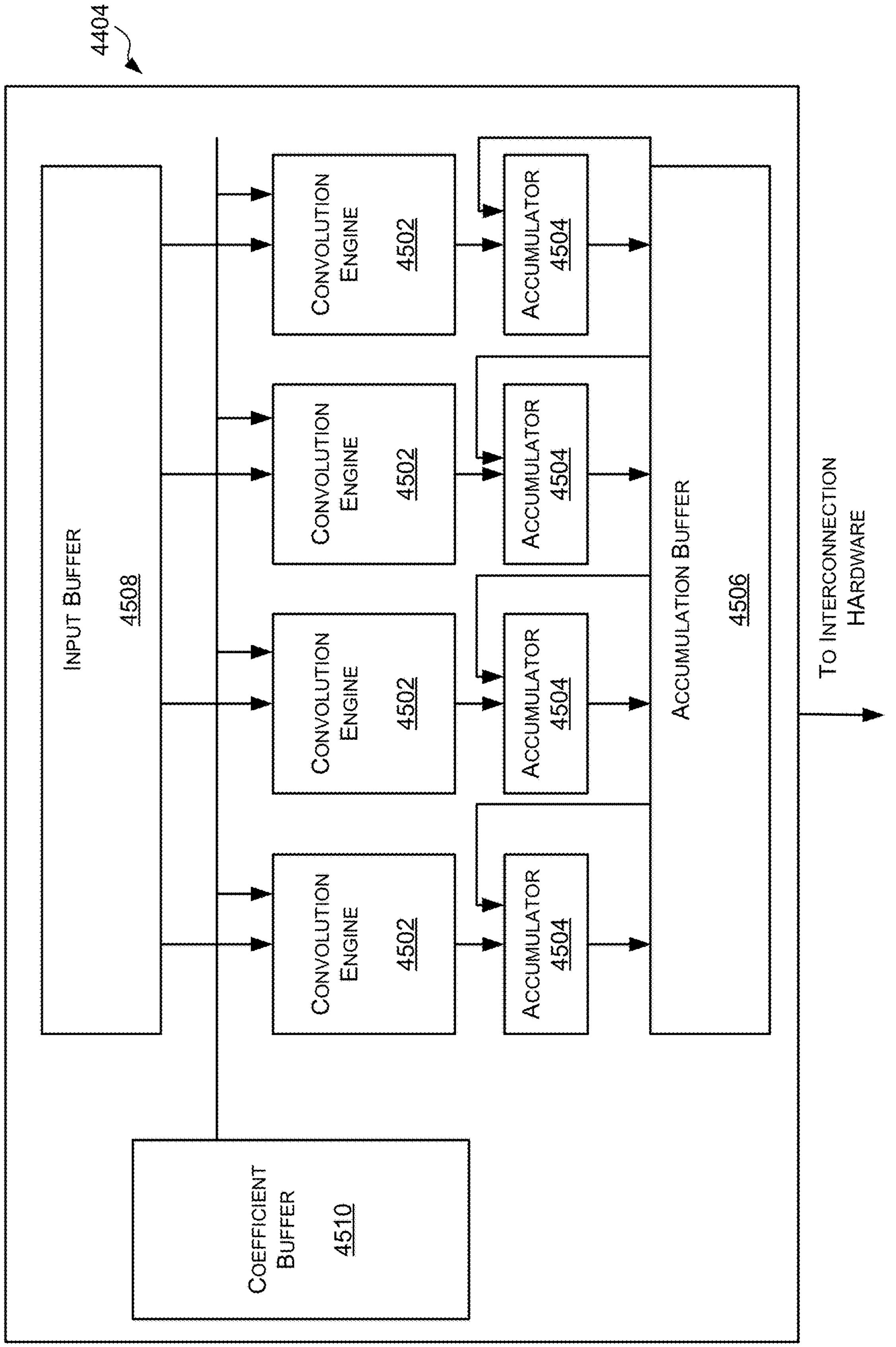
FIG. 45 is a block diagram of an example implementation of the convolution processing unit of FIG. 44.

Reference is now made to FIG. 45 which illustrates an example implementation of the convolution processing unit 4404 of FIG. 44. In this example, the convolution processing unit 4404 comprises a plurality of convolution engines 4502, a plurality of accumulators 4504 and an accumulation buffer 4506.

Figure 46:
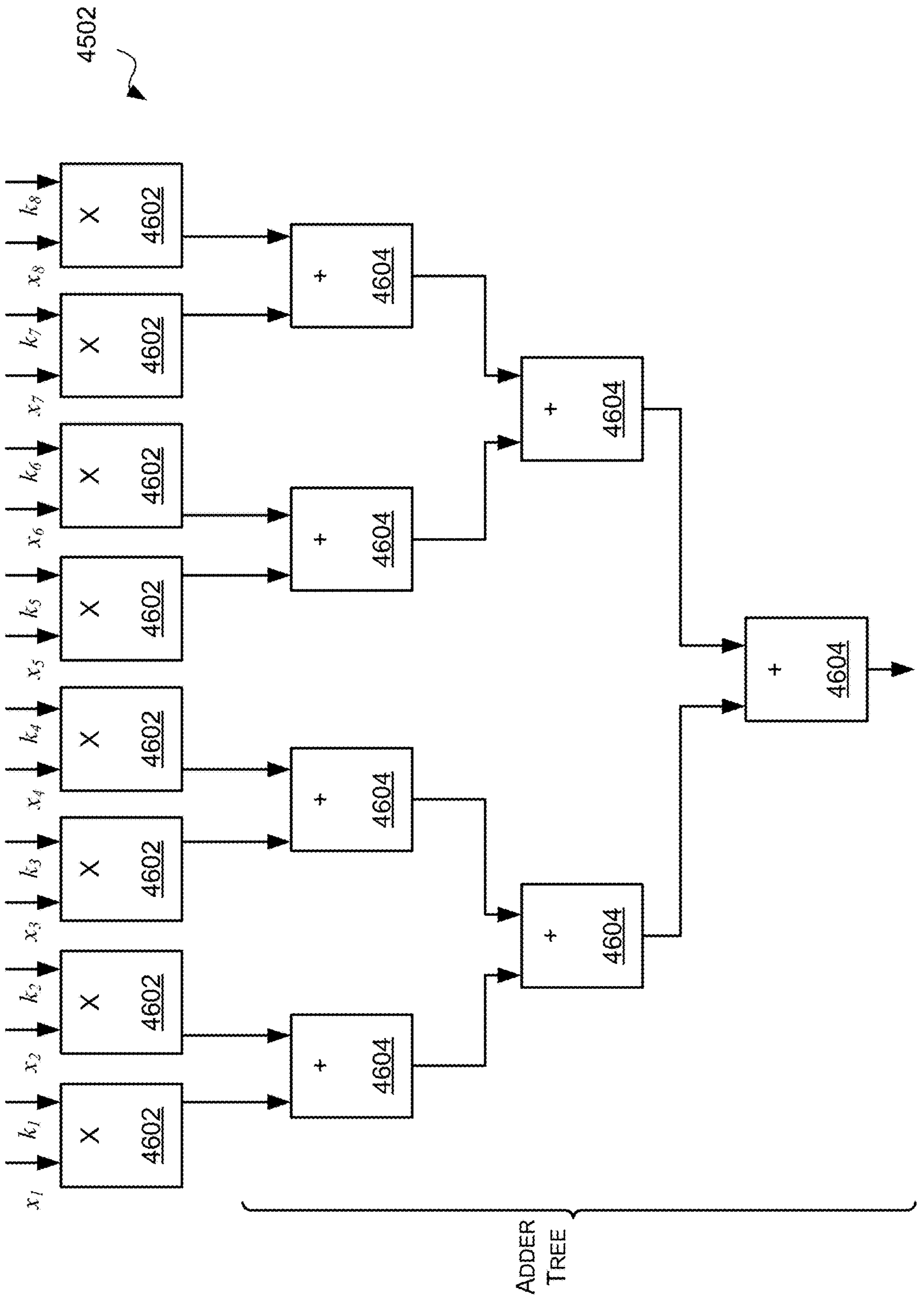
FIG. 46 is a block diagram of an example implementation of a convolution engine of FIG. 45.

Each convolution engine 4502 comprises hardware logic configured to receive a set of weights $\{k_1, k_2 \ldots, k_8\}$ that represent all or a portion of a filter, and a set of input data values $\{x_1, x_2, \ldots, x_8\}$ that represent all or a portion of a window of the input data, and perform a multiply-accumulate calculation on the received weights and input data values. In some examples, as shown in FIG. 46, each convolution engine 4502 may comprise a plurality of multipliers 4602, each of which is configured to multiple a weight ($k_i$) and a corresponding input data value ($x_i$)) to produce a multiplication output value. The multipliers 4602 are followed by a plurality of adders 4604. The adders may form an adder tree to calculate the sum of the multiplication outputs. In the example of FIG. 46 the convolution engine 4502 comprises eight multipliers 4602, but in other examples there may be more or fewer multipliers. For example, in some cases there may be 128 multipliers. Generally, if there are Z multipliers, the adder tree comprises Z−1 adders. The example convolution processing unit 4404 of FIG. 45 comprises four convolution engines 4502, however, it will be evident to a person of skill in the art that this is an example only and there may be only one convolution engine, there may be two convolution engines, or there may be more than two convolution engines.

Since it may take more than one hardware pass of the convolution engines 4502 to generate a complete filter result (e.g. because a convolution engine may only receive and process a portion of the weights of a filter and/or a portion of the input data values of a window in a cycle), the convolution processing unit 4404 may comprise a plurality of accumulators 4504. A pass of the convolution engines comprises receiving a set of weights and a set of input data values and performing a multiply-accumulate operation thereon. Each accumulator 4504 receives the output of one convolution engine 4502 and adds the output to previous convolution engine outputs that relates to the same filter. Since a convolution engine 4502 may not generate or produce outputs that relate to the same filter in consecutive cycles the partial results of one or more filters may be stored in an accumulation buffer 4506 and then the appropriate partial results may be provided to the accumulators 4504 each cycle by the accumulation buffer 4506.

In some cases, the convolution processing unit 4404 may comprise or have access to an input buffer 4508 for storing the elements of the input tensor and a coefficient buffer 4510 for storing the weights of the convolution. In some cases the input buffer 4508 may be implemented as a plurality of banks of memory. In these cases, there may be a multiplexor (not shown) for each convolution engine 4502 that is coupled to each of bank of the input buffer to allow the data stored in any of the banks to be selectively directed to any of the convolution engines 4502.

Figure 47:
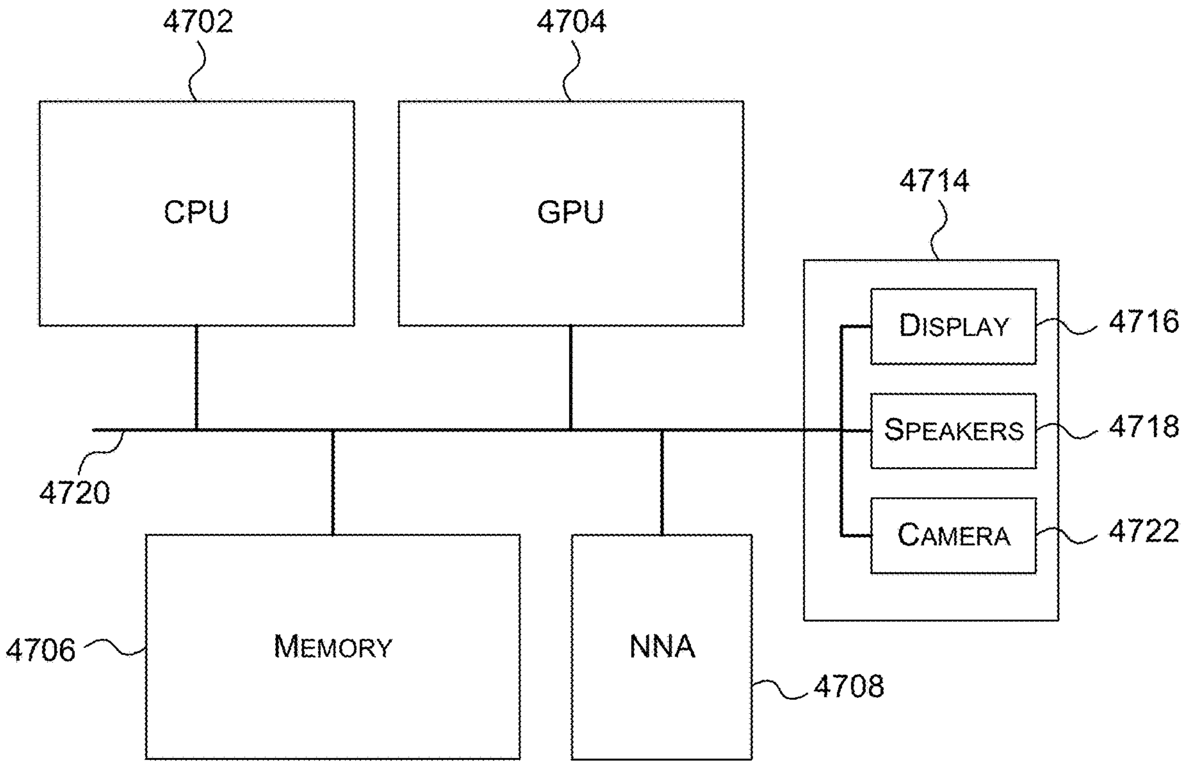
FIG. 47 is a block diagram of an example computer system in which a graphics processing unit and/or a neural network accelerator described herein may be implemented.

FIG. 47 shows an example computer system in which the neural network accelerators and/or graphics processing units described herein may be implemented. The computer system comprises a CPU 4702, a GPU 4704, a memory 4706, a neural network accelerator (NNA) 4708 (which may be any of the neural network accelerators described herein) and other devices 4714, such as a display 4716, speakers 4718 and a camera 4722. The components of the computer system can communicate with each other via a communications bus 4720. In other examples, the GPU 4704 may itself be an NNA, or the GPU 4704 may comprise an NNA.

The neural network accelerator, convolution processing unit, and convolution engine of FIGS. 44-46 are shown as comprising a number of functional blocks. This is schematic only and is not intended to define a strict division between different logic elements of such entities. Each functional block may be provided in any suitable manner. It is to be understood that intermediate values described herein as being formed by a neural network accelerator or graphics processing unit need not be physically generated by the neural network accelerator or the graphics processing unit at any point and may merely represent logical values which conveniently describe the processing performed by the neural network accelerator or graphics processing unit between its input and output.

The neural network accelerators and graphics processing units described herein may be embodied in hardware on an integrated circuit. The neural network accelerators or graphics processing units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e., run) in an integrated circuit manufacturing system configures the system to manufacture a neural network accelerator or graphics processing unit configured to perform any of the methods described herein, or to manufacture a neural network accelerator or a graphics processing unit comprising any apparatus described herein. An integrated circuit definition dataset may be, for example, an integrated circuit description.

Therefore, there may be provided a method of manufacturing, at an integrated circuit manufacturing system, a neural network accelerator or a graphics processing unit as described herein. Furthermore, there may be provided an integrated circuit definition dataset that, when processed in an integrated circuit manufacturing system, causes the method of manufacturing a neural network accelerator or a graphics processing unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g., providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a neural network accelerator or a graphics processing unit will now be described with respect to FIG. 48.

Figure 48:
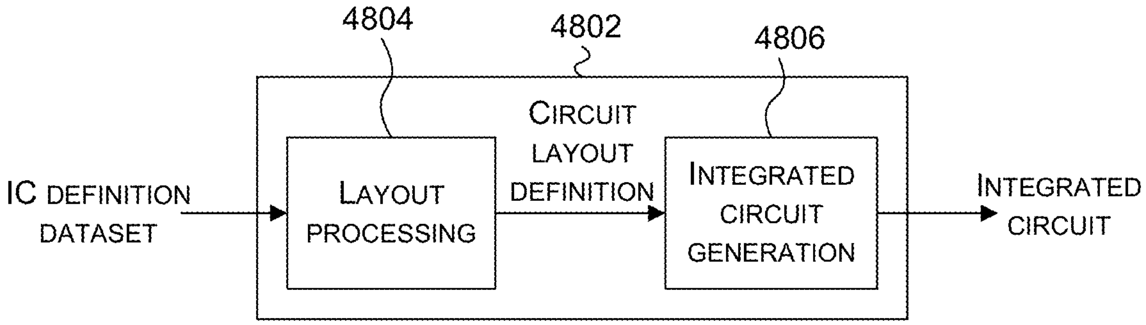
FIG. 48 is a block diagram of an integrated circuit manufacturing system for generating an integrated circuit embodying a graphics processing unit, a neural network accelerator, a convolution processing unit or a convolution engine described herein.

FIG. 48 shows an example of an integrated circuit (IC) manufacturing system 4802 which is configured to manufacture a neural network accelerator, or a graphics processing unit as described in any of the examples herein. In particular, the IC manufacturing system 4802 comprises a layout processing system 4804 and an integrated circuit generation system 4806. The IC manufacturing system 4802 is configured to receive an IC definition dataset (e.g., defining a neural network accelerator or a graphics processing unit as described in any of the examples herein), process the IC definition dataset, and generate an IC according to the IC definition dataset (e.g., which embodies a neural network accelerator or a graphics processing unit as described in any of the examples herein). The processing of the IC definition dataset configures the IC manufacturing system 4802 to manufacture an integrated circuit embodying a neural network accelerator or a graphics processing unit as described in any of the examples herein.

The layout processing system 4804 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g., in terms of logical components (e.g., NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 4804 has determined the circuit layout it may output a circuit layout definition to the IC generation system 4806. A circuit layout definition may be, for example, a circuit layout description.

The IC generation system 4806 generates an IC according to the circuit layout definition, as is known in the art. For example, the IC generation system 4806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 4806 may be in the form of computer-readable code which the IC generation system 4806 can use to form a suitable mask for use in generating an IC.

The different processes performed by the IC manufacturing system 4802 may be implemented all in one location, e.g., by one party. Alternatively, the IC manufacturing system 4802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a neural network accelerator without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g., by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 48 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 48, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g., in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of implementing a sparse submanifold convolution on a graphics processing unit, the method comprising:

receiving, at the graphics processing unit, an input tensor in a dense format;

identifying, at the graphics processing unit, active positions of the input tensor;

for each identified position of the input tensor: performing, by a separate thread at the graphics processing unit, an indexed unfold operation on the input tensor based on the identified active position of the input tensor to generate a column of an input matrix, thereby obtaining an input matrix comprising a column for each active window of the input tensor in which each column comprises elements of the input tensor in the corresponding active window of the input tensor; and performing, at the graphics processing unit, a matrix multiplication between a weight matrix and the input matrix to generate an output matrix wherein the matrix multiplication is performed by processing each column of the input matrix in a separate thread of the graphics processing unit, the output matrix comprising elements of an output tensor of the sparse submanifold convolution based on the active windows.

2. The method of claim 1, wherein the input tensor has at least a height dimension, a width dimension and a channel dimension and an active position of the input tensor is a height and width position in which at least one channel of the input tensor has a non-zero element.

3. The method of claim 2, wherein identifying the active positions of the input tensor comprises:

identifying a height, width, and channel position of each non-zero element in the input tensor;

identifying unique height and width pairs from the identified height, width and channel positions; and identifying the unique height and width pairs as the active positions.

4. The method of claim 1, wherein an active window of the input tensor is a window of the input tensor, used to generate an element of the output tensor of the sparse submanifold convolution, in which one or more predetermined positions within the window are active positions.

5. The method of claim 1, wherein performing the indexed unfold operation on the input tensor comprises identifying, from the identified active positions and one or more parameters of the sparse submanifold convolution, the active windows of the input tensor.

6. The method of claim 5, wherein identifying, from the identified active positions and the one or more parameters of the sparse submanifold convolution, the active windows of the input tensor comprises, for each identified active position:

determining if the active position is at a predetermined position within a window of the input tensor for the sparse submanifold convolution; and in response to determining that the active position is at the predetermined position within a window of the input tensor for the sparse submanifold convolution, identifying the window as an active window.

7. The method of claim 5, wherein the active windows of the input tensor are based on a version of the input tensor that is padded such that when the sparse submanifold convolution has a stride of one in each sparse submanifold convolution dimension there is an active window for each active position, and identifying, from the identified active positions and the one or more parameters of the sparse submanifold convolution, the active windows of the input tensor comprises identifying the active window corresponding to each active position.

8. The method of claim 1, wherein performing the indexed unfold operation on the input tensor comprises identifying the elements of the input tensor in each active window.

9. The method of claim 8, wherein identifying the elements of the input tensor in an active window comprises implementing a series of nested loops, the series of nested loops comprising a loop for each dimension of an active window that loops from a predetermined position within the window through the elements of the active window in that dimension.

10. The method of claim 1, wherein performing the indexed unfold operation on the input tensor comprises storing the elements of each active window in the input matrix.

11. The method of claim 10, further comprising receiving a zeroed input matrix, and the elements of each active window of the input tensor are stored in the received input matrix.

12. The method of claim 1, further comprising performing, at the graphics processing unit, an indexed fold operation on the output matrix based on the active windows to generate the output tensor of the sparse submanifold convolution in a dense format.

13. The method of claim 12, wherein there is an active window for each active position of the input tensor, and performing the indexed fold operation on the output matrix comprises placing each element in the output matrix at the corresponding active position in a channel of the output tensor.

14. The method of claim 13, wherein performing the indexed fold operation on the output matrix comprises, for each active window, looping through each channel of the output tensor and placing the element of the output matrix corresponding to that active position and that channel at the active position of that channel in the output tensor.

15. The method of claim 12, wherein performing the indexed fold operation on the output matrix comprises identifying a position in the output tensor of each element in the output matrix, based on the active windows and one or more parameters of the sparse submanifold convolution, and placing each element of the output matrix in the corresponding identified position in the output tensor.

16. The method of claim 12, further comprising receiving a zeroed output tensor, and the elements of the output matrix are stored in the received output tensor.

17. The method of claim 12, wherein performing the indexed fold operation on the output matrix further comprises storing zeroes at each position of the output tensor that does not comprise an element of the output matrix.

18. The method of claim 1, wherein the weight matrix comprises a row for each filter to be applied to the input tensor and each row of the weight matrix comprises all weights forming the corresponding filter.

19. A graphics processing unit configured to perform the method as set forth in claim 1.

20. A non-transitory computer readable storage medium having stored thereon computer readable code configured to cause a graphics processing unit to perform the method as set forth in claim 1 when the code is run.

* * * * *